(12) United States Patent
Shabtay et al.

(10) Patent No.: US 12,066,683 B2
(45) Date of Patent: Aug. 20, 2024

(54) FOLDED CAMERA LENS DESIGNS

(71) Applicant: Corephotonics Ltd., Tel Aviv (IL)

(72) Inventors: Gal Shabtay, Tel Aviv (IL); Ephraim Goldenberg, Tel Aviv (IL); Michael Dror, Tel Aviv (IL); Itay Yedid, Tel Aviv (IL); Gil Bachar, Tel Aviv (IL)

(73) Assignee: Corephotonics Ltd., Tel Aviv (IL)

( * ) Notice: Subject to any disclaimer, the term of this patent is extended or adjusted under 35 U.S.C. 154(b) by 0 days.

(21) Appl. No.: 18/350,773

(22) Filed: Jul. 12, 2023

(65) Prior Publication Data

US 2023/0350153 A1 Nov. 2, 2023

Related U.S. Application Data

(63) Continuation of application No. 18/314,866, filed on May 10, 2023, which is a continuation of application
(Continued)

(51) Int. Cl.
*G02B 7/02* (2021.01)
*G02B 7/08* (2021.01)
(Continued)

(52) U.S. Cl.
CPC ............... *G02B 7/021* (2013.01); *G02B 7/08* (2013.01); *G02B 13/004* (2013.01);
(Continued)

(58) Field of Classification Search
CPC .......... G02B 7/02; G02B 7/021; G02B 7/022; G02B 7/023; G02B 7/025; G02B 7/026;
(Continued)

(56) References Cited

U.S. PATENT DOCUMENTS

| | | | |
|---|---|---|---|
| 2,106,752 | A | 2/1938 | Land |
| 2,354,503 | A | 7/1944 | Arthur |

(Continued)

FOREIGN PATENT DOCUMENTS

| | | |
|---|---|---|
| CN | 101634738 A | 1/2010 |
| CN | 102147519 A | 8/2011 |

(Continued)

OTHER PUBLICATIONS

A compact and cost effective design for cell phone zoom lens, Chang et al., Sep. 2007, 8 pages.
(Continued)

*Primary Examiner* — Ephrem Z Mebrahtu
(74) *Attorney, Agent, or Firm* — Nathan & Associates; Menachem Nathan

(57) ABSTRACT

Digital cameras, optical lens modules for such digital cameras and methods for assembling lens elements in such lens modules. In various embodiments, the digital cameras comprise an optical lens module including $N \geq 3$ lens elements $L_i$, each lens element comprising a respective front surface $S_{2i-1}$ and a respective rear surface $S_{2i}$. In various embodiments the first lens element toward the object side, $L_1$ and its respective front surfaces $S_1$ have optical and/or mechanical properties, such as a clear aperture, a clear height and a mechanical height that are larger than respective properties of following lens elements and surfaces. This is done to achieve a camera with large aperture stop, given a lens and/or camera height.

12 Claims, 28 Drawing Sheets

Related U.S. Application Data

No. 17/665,495, filed on Feb. 5, 2022, now Pat. No. 11,668,894, which is a continuation of application No. 16/851,475, filed on Apr. 17, 2020, now Pat. No. 11,347,020, which is a continuation of application No. 16/392,754, filed on Apr. 24, 2019, now Pat. No. 10,670,827, which is a continuation of application No. 16/252,608, filed on Jan. 19, 2019, now Pat. No. 10,571,644, which is a continuation of application No. 16/077,477, filed as application No. PCT/IB2018/050988 on Feb. 18, 2018, now Pat. No. 11,347,016.

(60) Provisional application No. 62/483,422, filed on Apr. 9, 2017, provisional application No. 62/478,783, filed on Mar. 30, 2017, provisional application No. 62/462,438, filed on Feb. 23, 2017.

(51) Int. Cl.
  *G02B 13/00* (2006.01)
  *G02B 13/02* (2006.01)
  *G02B 27/01* (2006.01)
  *H04N 23/55* (2023.01)
  *H04N 23/58* (2023.01)

(52) U.S. Cl.
  CPC ....... *G02B 13/0065* (2013.01); *G02B 13/009* (2013.01); *G02B 13/02* (2013.01); *G02B 27/0149* (2013.01); *H04N 23/55* (2023.01); *H04N 23/58* (2023.01)

(58) Field of Classification Search
  CPC G02B 13/004; G02B 13/009; G02B 13/0065; G02B 13/02; G02B 7/08; H04N 23/55
  See application file for complete search history.

(56) References Cited

U.S. PATENT DOCUMENTS

| | | |
|---|---|---|
| 2,378,170 A | 6/1945 | Aklin |
| 2,441,093 A | 5/1948 | Aklin |
| 3,388,956 A | 6/1968 | Eggert et al. |
| 3,524,700 A | 8/1970 | Eggert et al. |
| 3,558,218 A | 1/1971 | Grey |
| 3,864,027 A | 2/1975 | Harada |
| 3,942,876 A | 3/1976 | Betensky |
| 4,134,645 A | 1/1979 | Sugiyama et al. |
| 4,338,001 A | 7/1982 | Matsui |
| 4,465,345 A | 8/1984 | Yazawa |
| 4,792,822 A | 12/1988 | Akiyama et al. |
| 5,000,551 A | 3/1991 | Shibayama |
| 5,327,291 A | 7/1994 | Baker et al. |
| 5,331,465 A | 7/1994 | Miyano |
| 5,969,869 A | 10/1999 | Hirai et al. |
| 6,014,266 A | 1/2000 | Obama et al. |
| 6,035,136 A | 3/2000 | Hayashi et al. |
| 6,147,702 A | 11/2000 | Smith |
| 6,169,636 B1 | 1/2001 | Kreitzer |
| 6,654,180 B2 | 11/2003 | Ori |
| 7,187,504 B2 | 3/2007 | Horiuchi |
| 7,206,136 B2 | 4/2007 | Labaziewicz et al. |
| 7,515,351 B2 | 4/2009 | Chen et al. |
| 7,564,635 B1 | 7/2009 | Tang |
| 7,643,225 B1 | 1/2010 | Tsai |
| 7,660,049 B2 | 2/2010 | Tang |
| 7,684,128 B2 | 3/2010 | Tang |
| 7,688,523 B2 | 3/2010 | Sano |
| 7,692,877 B2 | 4/2010 | Tang et al. |
| 7,697,220 B2 | 4/2010 | Iyama |
| 7,738,186 B2 | 6/2010 | Chen et al. |
| 7,777,972 B1 | 8/2010 | Chen et al. |
| 7,813,057 B2 | 10/2010 | Lin |
| 7,821,724 B2 | 10/2010 | Tang et al. |
| 7,826,149 B2 | 11/2010 | Tang et al. |
| 7,826,151 B2 | 11/2010 | Tsai |
| 7,869,142 B2 | 1/2011 | Chen et al. |
| 7,898,747 B2 | 3/2011 | Tang |
| 7,916,401 B2 | 3/2011 | Chen et al. |
| 7,918,398 B2 | 4/2011 | Li et al. |
| 7,957,075 B2 | 6/2011 | Tang |
| 7,957,076 B2 | 6/2011 | Tang |
| 7,957,079 B2 | 6/2011 | Tang |
| 7,961,406 B2 | 6/2011 | Tang et al. |
| 8,000,031 B1 | 8/2011 | Tsai |
| 8,004,777 B2 | 8/2011 | Sano et al. |
| 8,077,400 B2 | 12/2011 | Tang |
| 8,149,523 B2 | 4/2012 | Ozaki |
| 8,218,253 B2 | 7/2012 | Tang |
| 8,228,622 B2 | 7/2012 | Tang |
| 8,233,224 B2 | 7/2012 | Chen |
| 8,253,843 B2 | 8/2012 | Lin |
| 8,279,537 B2 | 10/2012 | Sato |
| 8,363,337 B2 | 1/2013 | Tang et al. |
| 8,395,851 B2 | 3/2013 | Tang et al. |
| 8,400,717 B2 | 3/2013 | Chen et al. |
| 8,451,549 B2 | 5/2013 | Yamanaka et al. |
| 8,503,107 B2 | 8/2013 | Chen et al. |
| 8,514,502 B2 | 8/2013 | Chen |
| 8,570,668 B2 | 10/2013 | Takakubo et al. |
| 8,718,458 B2 | 5/2014 | Okuda |
| 8,780,465 B2 | 7/2014 | Chae |
| 8,810,923 B2 | 8/2014 | Shinohara |
| 8,854,745 B1 | 10/2014 | Chen |
| 8,958,164 B2 | 2/2015 | Kwon et al. |
| 9,185,291 B1 | 11/2015 | Shabtay |
| 9,229,194 B2 | 1/2016 | Yoneyama et al. |
| 9,235,036 B2 | 1/2016 | Kato et al. |
| 9,279,957 B2 | 3/2016 | Kanda et al. |
| 9,438,792 B2 | 9/2016 | Nakada et al. |
| 9,488,802 B2 | 11/2016 | Chen et al. |
| 9,568,712 B2 | 2/2017 | Dror et al. |
| 9,678,310 B2 | 6/2017 | Iwasaki et al. |
| 9,817,213 B2 | 11/2017 | Mercado |
| 2002/0118471 A1 | 8/2002 | Imoto |
| 2003/0048542 A1 | 3/2003 | Enomoto |
| 2005/0041300 A1 | 2/2005 | Oshima et al. |
| 2005/0062346 A1 | 3/2005 | Sasaki |
| 2005/0128604 A1 | 6/2005 | Kuba |
| 2005/0141103 A1 | 6/2005 | Nishina |
| 2005/0168840 A1 | 8/2005 | Kobayashi et al. |
| 2005/0270667 A1 | 12/2005 | Gurevich et al. |
| 2006/0092524 A1 | 5/2006 | Konno |
| 2006/0238902 A1 | 10/2006 | Nakashima et al. |
| 2006/0275025 A1 | 12/2006 | Labaziewicz et al. |
| 2007/0229983 A1 | 10/2007 | Saori |
| 2007/0247726 A1 | 10/2007 | Sudoh |
| 2007/0253689 A1 | 11/2007 | Nagai et al. |
| 2008/0056698 A1 | 3/2008 | Lee et al. |
| 2008/0094730 A1 | 4/2008 | Toma et al. |
| 2008/0094738 A1 | 4/2008 | Lee |
| 2008/0291531 A1 | 11/2008 | Heimer |
| 2008/0304161 A1 | 12/2008 | Souma |
| 2009/0002839 A1 | 1/2009 | Sato |
| 2009/0067063 A1 | 3/2009 | Asami et al. |
| 2009/0122423 A1 | 5/2009 | Park et al. |
| 2009/0135245 A1 | 5/2009 | Luo et al. |
| 2009/0141365 A1 | 6/2009 | Jannard et al. |
| 2009/0147368 A1 | 6/2009 | Oh et al. |
| 2009/0225438 A1 | 9/2009 | Kubota |
| 2009/0279191 A1 | 11/2009 | Yu |
| 2009/0303620 A1 | 12/2009 | Abe et al. |
| 2010/0026878 A1 | 2/2010 | Seo |
| 2010/0033844 A1 | 2/2010 | Katano |
| 2010/0060995 A1 | 3/2010 | Yumiki et al. |
| 2010/0165476 A1 | 7/2010 | Eguchi |
| 2010/0214664 A1 | 8/2010 | Chia |
| 2010/0277813 A1 | 11/2010 | Ito |
| 2011/0001838 A1 | 1/2011 | Lee |
| 2011/0032409 A1 | 2/2011 | Rossi et al. |
| 2011/0080655 A1 | 4/2011 | Mori |
| 2011/0102667 A1 | 5/2011 | Chua et al. |
| 2011/0102911 A1 | 5/2011 | Iwasaki |

(56) References Cited

U.S. PATENT DOCUMENTS

| | | |
|---|---|---|
| 2011/0115965 A1 | 5/2011 | Engelhardt et al. |
| 2011/0149119 A1 | 6/2011 | Matsui |
| 2011/0157430 A1 | 6/2011 | Hosoya et al. |
| 2011/0188121 A1 | 8/2011 | Goring et al. |
| 2011/0249347 A1 | 10/2011 | Kubota |
| 2012/0062783 A1 | 3/2012 | Tang et al. |
| 2012/0069455 A1 | 3/2012 | Lin et al. |
| 2012/0092777 A1 | 4/2012 | Tochigi et al. |
| 2012/0105708 A1 | 5/2012 | Hagiwara |
| 2012/0147489 A1 | 6/2012 | Matsuoka |
| 2012/0154929 A1 | 6/2012 | Tsai et al. |
| 2012/0194923 A1 | 8/2012 | Um |
| 2012/0229920 A1 | 9/2012 | Otsu et al. |
| 2012/0262806 A1 | 10/2012 | Lin et al. |
| 2013/0002933 A1 | 1/2013 | Topliss et al. |
| 2013/0057971 A1 | 3/2013 | Zhao et al. |
| 2013/0088788 A1 | 4/2013 | You |
| 2013/0176479 A1 | 7/2013 | Wada |
| 2013/0208178 A1 | 8/2013 | Park |
| 2013/0271852 A1 | 10/2013 | Schuster |
| 2013/0279032 A1 | 10/2013 | Suigetsu et al. |
| 2013/0286488 A1 | 10/2013 | Chae |
| 2014/0022436 A1 | 1/2014 | Kim et al. |
| 2014/0063616 A1 | 3/2014 | Okano et al. |
| 2014/0092487 A1 | 4/2014 | Chen et al. |
| 2014/0139719 A1 | 5/2014 | Fukaya et al. |
| 2014/0146216 A1 | 5/2014 | Okumura |
| 2014/0160581 A1 | 6/2014 | Cho et al. |
| 2014/0204480 A1 | 7/2014 | Jo et al. |
| 2014/0240853 A1 | 8/2014 | Kubota et al. |
| 2014/0285907 A1 | 9/2014 | Tang et al. |
| 2014/0293453 A1 | 10/2014 | Ogino et al. |
| 2014/0362274 A1 | 12/2014 | Christie et al. |
| 2015/0022896 A1 | 1/2015 | Cho et al. |
| 2015/0029601 A1 | 1/2015 | Dror et al. |
| 2015/0116569 A1 | 4/2015 | Mercado |
| 2015/0138431 A1 | 5/2015 | Shin et al. |
| 2015/0153548 A1 | 6/2015 | Kim et al. |
| 2015/0168667 A1 | 6/2015 | Kudoh |
| 2015/0205068 A1 | 7/2015 | Sasaki |
| 2015/0244942 A1 | 8/2015 | Shabtay et al. |
| 2015/0253532 A1 | 9/2015 | Lin |
| 2015/0253543 A1 | 9/2015 | Mercado |
| 2015/0253647 A1 | 9/2015 | Mercado |
| 2015/0323757 A1 | 11/2015 | Bone |
| 2015/0373252 A1 | 12/2015 | Georgiev |
| 2015/0373263 A1 | 12/2015 | Georgiev et al. |
| 2016/0007008 A1 | 1/2016 | Molgaard et al. |
| 2016/0033742 A1 | 2/2016 | Huang |
| 2016/0044250 A1* | 2/2016 | Shabtay .............. G02B 7/102 348/240.3 |
| 2016/0062084 A1 | 3/2016 | Chen et al. |
| 2016/0062136 A1 | 3/2016 | Nomura et al. |
| 2016/0070088 A1 | 3/2016 | Koguchi |
| 2016/0085089 A1 | 3/2016 | Mercado |
| 2016/0105616 A1 | 4/2016 | Shabtay et al. |
| 2016/0187631 A1 | 6/2016 | Choi et al. |
| 2016/0202455 A1 | 7/2016 | Aschwanden et al. |
| 2016/0212333 A1 | 7/2016 | Liege et al. |
| 2016/0241756 A1 | 8/2016 | Chen |
| 2016/0291295 A1 | 10/2016 | Shabtay et al. |
| 2016/0306161 A1 | 10/2016 | Harada et al. |
| 2016/0313537 A1 | 10/2016 | Mercado |
| 2016/0341931 A1 | 11/2016 | Liu et al. |
| 2016/0349504 A1 | 12/2016 | Hun-Kim et al. |
| 2016/0353008 A1 | 12/2016 | Osborne |
| 2017/0023778 A1 | 1/2017 | Inoue |
| 2017/0094187 A1 | 3/2017 | Sharma et al. |
| 2017/0102522 A1 | 4/2017 | Jo |
| 2017/0115471 A1 | 4/2017 | Shinohara |
| 2017/0153422 A1 | 6/2017 | Tang et al. |
| 2017/0160511 A1 | 6/2017 | Kim et al. |
| 2017/0199360 A1 | 7/2017 | Chang |
| 2017/0276911 A1 | 9/2017 | Huang |
| 2017/0310952 A1 | 10/2017 | Adomat et al. |
| 2017/0329108 A1 | 11/2017 | Hashimoto |
| 2017/0337703 A1 | 11/2017 | Wu et al. |
| 2018/0024319 A1 | 1/2018 | Lai et al. |
| 2018/0059365 A1 | 3/2018 | Bone et al. |
| 2018/0059376 A1 | 3/2018 | Lin et al. |
| 2018/0081149 A1 | 3/2018 | Bae et al. |
| 2018/0120674 A1 | 5/2018 | Avivi et al. |
| 2018/0149835 A1 | 5/2018 | Park |
| 2018/0196236 A1 | 7/2018 | Ohashi et al. |
| 2018/0196238 A1 | 7/2018 | Goldenberg et al. |
| 2018/0217475 A1 | 8/2018 | Goldenberg et al. |
| 2018/0218224 A1 | 8/2018 | Olmstead et al. |
| 2018/0224630 A1 | 8/2018 | Lee et al. |
| 2018/0268226 A1 | 9/2018 | Shashua et al. |
| 2019/0025549 A1 | 1/2019 | Hsueh et al. |
| 2019/0025554 A1 | 1/2019 | Son |
| 2019/0075284 A1 | 3/2019 | Ono |
| 2019/0086638 A1 | 3/2019 | Lee |
| 2019/0107651 A1 | 4/2019 | Sade |
| 2019/0121216 A1 | 4/2019 | Shabtay et al. |
| 2019/0155002 A1 | 5/2019 | Shabtay et al. |
| 2019/0170965 A1 | 6/2019 | Shabtay et al. |
| 2019/0187486 A1 | 6/2019 | Goldenberg et al. |
| 2019/0196148 A1 | 6/2019 | Yao et al. |
| 2019/0215440 A1 | 7/2019 | Rivard et al. |
| 2019/0222758 A1 | 7/2019 | Goldenberg et al. |
| 2019/0353874 A1 | 11/2019 | Yeh et al. |
| 2020/0084358 A1 | 3/2020 | Nadamoto |
| 2020/0192069 A1 | 6/2020 | Makeev et al. |
| 2020/0221026 A1 | 7/2020 | Fridman et al. |
| 2020/0241233 A1 | 7/2020 | Shabtay et al. |
| 2020/0333691 A1 | 10/2020 | Shabtay et al. |
| 2020/0400926 A1 | 12/2020 | Bachar |
| 2021/0048628 A1 | 2/2021 | Shabtay et al. |
| 2021/0263276 A1 | 8/2021 | Huang et al. |
| 2021/0364746 A1 | 11/2021 | Chen |
| 2021/0396974 A1 | 12/2021 | Kuo |
| 2022/0046151 A1 | 2/2022 | Shabtay et al. |
| 2022/0066168 A1 | 3/2022 | Shi |
| 2022/0113511 A1 | 4/2022 | Chen |
| 2022/0232167 A1 | 7/2022 | Shabtay et al. |

FOREIGN PATENT DOCUMENTS

| | | |
|---|---|---|
| CN | 102193162 A | 9/2011 |
| CN | 102466865 A | 5/2012 |
| CN | 102466867 A | 5/2012 |
| CN | 102147519 B | 1/2013 |
| CN | 103576290 A | 2/2014 |
| CN | 103698876 A | 4/2014 |
| CN | 104297906 A | 1/2015 |
| CN | 104407432 A | 3/2015 |
| CN | 105467563 A | 4/2016 |
| CN | 105657290 A | 6/2016 |
| CN | 106680974 A | 5/2017 |
| CN | 104570280 B | 6/2017 |
| JP | S54157620 A | 12/1979 |
| JP | S59121015 A | 7/1984 |
| JP | 6165212 A | 4/1986 |
| JP | S6370211 A | 3/1988 |
| JP | H0233117 A | 2/1990 |
| JP | 406059195 A | 3/1994 |
| JP | H07325246 A | 12/1995 |
| JP | H07333505 A | 12/1995 |
| JP | H09211326 A | 8/1997 |
| JP | H11223771 A | 8/1999 |
| JP | 3210242 B2 | 9/2001 |
| JP | 2004334185 A | 11/2004 |
| JP | 2006195139 A | 7/2006 |
| JP | 2007133096 A | 5/2007 |
| JP | 2007164065 A | 6/2007 |
| JP | 2007219199 A | 8/2007 |
| JP | 2007306282 A | 11/2007 |
| JP | 2008111876 A | 5/2008 |
| JP | 2008191423 A | 8/2008 |
| JP | 2010032936 A | 2/2010 |
| JP | 2010164841 A | 7/2010 |
| JP | 2011145315 A | 7/2011 |
| JP | 2012203234 A | 10/2012 |

(56) References Cited

FOREIGN PATENT DOCUMENTS

| | | | |
|---|---|---|---|
| JP | 2013003317 A | 1/2013 | |
| JP | 2013003754 A | 1/2013 | |
| JP | 2013101213 A | 5/2013 | |
| JP | 2013105049 A | 5/2013 | |
| JP | 2013106289 A | 5/2013 | |
| JP | 2013148823 A | 8/2013 | |
| JP | 2014142542 A | 8/2014 | |
| JP | 2017116679 A | 6/2017 | |
| JP | 2018059969 A | 4/2018 | |
| JP | 2019113878 A | 7/2019 | |
| KR | 20090019525 A | 2/2009 | |
| KR | 20090131805 A | 12/2009 | |
| KR | 20110058094 A | 6/2011 | |
| KR | 20110115391 A | 10/2011 | |
| KR | 20120068177 A | 6/2012 | |
| KR | 20140135909 A | 5/2013 | |
| KR | 20140023552 A | 2/2014 | |
| KR | 20160000759 A | 1/2016 | |
| KR | 101632168 B1 | 6/2016 | |
| KR | 20160115359 A | 10/2016 | |
| TW | M602642 U | 10/2020 | |
| WO | 2013058111 A1 | 4/2013 | |
| WO | 2013063097 A1 | 5/2013 | |
| WO | 2018130898 A1 | 7/2018 | |

OTHER PUBLICATIONS

Consumer Electronic Optics: How small a lens can be? The case of panomorph lenses, Thibault et al., Sep. 2014, 7 pages.
Optical design of camera optics for mobile phones, Steinich et al., 2012, pp. 51-58 (8 pages).
The Optics of Miniature Digital Camera Modules, Bareau et al., 2006, 11 pages.
Modeling and measuring liquid crystal tunable lenses, Peter P. Clark, 2014, 7 pages.
Mobile Platform Optical Design, Peter P. Clark, 2014, 7 pages.
Boye et al., "Ultrathin Optics for Low-Profile Innocuous Imager", Sandia Report, 2009, pp. 56-56.
"Cheat sheet: how to understand f-stops", Internet article, Digital Camera World, 2017.
Office action in related Israeli patent application No. 302577, dated Jul. 5, 2023.

\* cited by examiner

FOLDED CAMERA LENS DESIGNS

CROSS REFERENCE TO RELATED APPLICATIONS

This application is a continuation application of U.S. patent application Ser. No. 18/314,866 filed May 10, 2023, which was a continuation application of U.S. patent application Ser. No. 17/665,495 filed Feb. 5, 2022 (now U.S. Pat. No. 11,668,894), which was a continuation application of U.S. patent application Ser. No. 16/851,475 filed Apr. 17, 2020 (now U.S. Pat. No. 11,347,020), which was a continuation application of U.S. patent application Ser. No. 16/392,754 filed Apr. 24, 2019 (now U.S. Pat. No. 10,670,827), which was a continuation application of U.S. patent application Ser. No. 16/252,608 filed Jan. 19, 2019 (now U.S. Pat. No. 10,571,644), which was a continuation application of U.S. patent application Ser. No. 16/077,477 filed Aug. 12, 2018 (now U.S. Pat. No. 11,347,016), which was a 371 application from international patent application No. PCT/IB2018/050988 filed Feb. 18, 2018 and claims the benefit of U.S. Provisional patent applications No. 62/462,438 filed Feb. 23, 2017, 62/478,783 filed Mar. 30, 2017, and 62/483,422 filed Apr. 9, 2017, all of which are incorporated herein by reference in their entirety.

TECHNICAL FIELD

The presently disclosed subject matter is generally related to the field of digital cameras.

BACKGROUND

Dual-aperture zoom cameras (also referred to as dual-cameras), in which one camera (also referred to as "sub-camera") has a Wide FOV ("Wide sub-camera") and the other has a narrow FOV ("Tele sub-camera"), are known.

International patent publication WO 2016/024192, which is incorporated herein by reference in its entirety, discloses a "folded camera module" (also referred to simply as "folded camera") that reduces the height of a compact camera. In the folded camera, an optical path folding element (referred to hereinafter as "OPFE") e.g. a prism or a mirror (otherwise referred to herein collectively as "reflecting element") is added in order to tilt the light propagation direction from perpendicular to the smart-phone back surface to parallel to the smart-phone back surface. If the folded camera is part of a dual-aperture camera, this provides a folded optical path through one lens assembly (e.g. a Tele lens). Such a camera is referred to herein as "folded-lens dual-aperture camera". In general, the folded camera may be included in a multi-aperture camera, for example together with two "non-folded" (upright) camera modules in a triple-aperture camera.

SUMMARY

A small height of a folded camera is important to allow a host device (e.g. a smartphone, tablets, laptops or smart TV) that includes it to be as thin as possible. The height of the camera is often limited by the industrial design. In contrast, increasing the optical aperture of the lens results in an increase in the amount of light arriving at the sensor and improves the optical properties of the camera.

Therefore, there is a need for, and it would be advantageous to have a folded camera in which the height of the lens optical aperture is maximal for a given camera height and/or for a lens module height.

According to some aspects of the presently disclosed subject matter, there are provided digital cameras comprising an optical lens module including $N \geq 3$ lens elements $L_i$ having a first optical axis, each lens element comprising a respective front surface $S_{2i-1}$ and a respective rear surface $S_{2i}$, the lens element surfaces marked $S_k$ where $1 \leq k \leq 2N$, an image sensor, and a reflecting element, inclined with respect to the first optical axis so as to provide a folded optical path between an object and the lens elements, wherein each lens element surface has a clear height value $CH(S_k)$ and wherein a clear height value $CH(S_1)$ of surface $S_1$ is greater than a clear height value of each of surfaces $S_2$ to $S_{2N}$.

In an exemplary embodiment, the N lens elements have an axial symmetry.

In an exemplary embodiment, $CH(S_1) \geq 1.1 \times CH(S_2)$.

In an exemplary embodiment, $CH(S_1) \geq 1.2 \times CH(S_k)$ for $3 \leq k \leq 2N$.

In an exemplary embodiment, the digital camera has a total track length TTL and a focal back length BFL and wherein $BFL \geq 0.3 \times TTL$.

In an exemplary embodiment, $L_1$ is made of glass.

In an exemplary embodiment, $L_1$ is made of plastic.

In an exemplary embodiment, $L_1$ is made of plastic for any $2 \leq i \leq N$.

In an exemplary embodiment, the optical lens module is a front aperture lens module.

In an exemplary embodiment, $CH(S_1) < 7$ mm.

In some exemplary embodiments, each respective lens element surface $S_k$ has a clear aperture value $CA(S_k)$. In an exemplary embodiment, clear aperture value $CA(S_1)$ of surface $S_1$ is greater than a clear aperture value of each of surfaces $S_2$ to $S_{2N}$. In an exemplary embodiment, $CA(S_1)$ is equal to clear aperture value $CA(S_{2N})$, and $CA(S_1)$ is greater than $CA(S_k)$ for $2 \leq k \leq 2N-1$.

In an exemplary embodiment, $CA(S_1)$ is substantially equal to $CH(S_1)$.

In an exemplary embodiment, $CA(S_1) \geq 1.1 \times CA(S_2)$.

In an exemplary embodiment, $CA(S_1) \geq 1.2 \times CH(S_k)$ for $3 \leq k \leq 2N$.

1. In an exemplary embodiment, at least some of the lens elements have a width $W_L$ greater than their height $H_L$ In some exemplary embodiments, the optical lens module includes a cavity that holds the plurality of lens elements, wherein the cavity comprises a first portion in which the first lens element $L_1$ is located and a second portion in which a least one of the other lens elements are located, wherein the height of the first portion is greater than the height of the second portion.

In some exemplary embodiments, the optical lens module includes a cavity that holds at least some of lens elements $L_2$ to $L_N$, wherein first lens element $L_1$ is located outside of the optical lens module.

In some exemplary embodiments, the image sensor is a rectangular sensor or a circular sensor.

In some exemplary embodiments, $N \leq 6$.

According to an aspect of the presently disclosed subject matter, there is provided a digital dual-camera comprising a camera of any of the embodiment mentioned above, wherein the camera is a Tele sub-camera configured to provide a Tele image, and a Wide sub-camera configured to provide a Wide image.

According to some aspects of the presently disclosed subject matter, there is provided a digital camera comprising an optical lens module including $N \geq 3$ lens elements $L_1$ having a first optical axis, each lens element comprising a respective front surface $S_{2i-1}$ and a respective rear surface $S_{2i}$, the lens element surfaces marked $S_k$ where $1 \leq k \leq 2N$, an image sensor, and a reflecting element inclined with respect to the first optical axis so as to provide a folded optical path between an object and the lens elements, wherein each lens element surface has a clear aperture value $CA(S_k)$ and wherein clear aperture value $CA(S_1)$ is greater than $CA(S_k)$ for $2 \leq k \leq 2N$.

In an exemplary embodiment, $CA(S_1) \geq 1.1 \times CA(S_2)$.

In an exemplary embodiment, $CA(S_1) \geq 1.2 \times CH(S_k)$, for $3 \leq k \leq 2N$.

In some exemplary embodiments, the optical lens module includes a cavity that holds the plurality of lens elements, wherein a height of cavity, measured along an axis orthogonal to the first optical axis, is variable along the first optical axis.

In some exemplary embodiments, the cavity comprises a first portion in which the first lens element $L_1$ is located and a second portion at which at least one of the other lens elements is located, and wherein the height of the first portion of the cavity is greater than the height of the second portion of the cavity.

In some exemplary embodiments, the optical lens module further comprises a lens barrel (or simply "barrel") with a cavity in which at least some of lens elements $L_2$ to $L_N$ are held and wherein lens element $L_1$ is located outside of the barrel.

According to another aspect of the presently disclosed subject matter, a camera described above is a Tele sub-camera configured to provide a Tele image and is included together with a Wide sub-camera configured to provide a Wide image in a dual-camera.

According to another aspect of the presently disclosed subject matter, there is provided a digital camera comprising N lens elements having a symmetry along a first optical axis, wherein N is equal to or greater than 3, an image sensor, a reflecting element operative to provide a folded optical path between an object and the image sensor, and a barrel with a cavity in which the plurality of lens elements are held, wherein a height of cavity, measured along an axis orthogonal to the first optical axis, is variable along the first optical axis, wherein the cavity comprises a first portion in which the first lens element $L_1$ is located and a second portion at which at least one of the other lens elements is located, and wherein the height of the first portion of the cavity $H_1$ is greater than the height of the second portion of the cavity $H_2$, so that $H_1 > 1.1 \times H_2$.

According to another aspect of the presently disclosed subject matter, there is provided a digital camera comprising N lens elements $L_1$ to $L_N$ having axial symmetry along a first optical axis, wherein N is equal to or greater than 3, an image sensor, a reflecting element operative to provide a folded optical path between an object and the image sensor, and a barrel with a cavity in which at least some of the lens elements $L_2$ to $L_N$ are held, and wherein the lens element $L_1$ is located outside of barrel.

In an exemplary embodiment, $L_N$ is located outside the barrel.

According to some aspects of the presently disclosed subject matter, there is provided an optical lens module comprising a barrel having a cavity surrounded by walls and N lens elements $L_1$ to $L_N$, wherein N is equal to or greater than 3, wherein $L_1$ has a portion which is not completely surrounded by the cavity and wherein walls of the cavity are aligning a center of lens element $L_1$ with the first optical axis.

In an exemplary embodiment, $L_N$ has a portion which is not completely surrounded by the cavity and wherein walls of the cavity are aligning a center of lens element $L_N$ with the first optical axis.

In an exemplary embodiment, at least one of an extremity of the walls and an extremity of lens element $L_1$ is shaped so that the extremity of the walls acts a stop for at least a portion of lens element $L_1$, thereby substantially aligning a center of lens element $L_1$ with the first optical axis.

In an exemplary embodiment, a first portion of lens element $L_1$ is located in the cavity between the extremity of the walls and a second portion of lens element $L_1$ is located outside the barrel and wherein a thickness of the second portion of lens element $L_1$ along the first optical axis is greater than a thickness of the first portion of lens element $L_1$ along the first optical axis.

In an exemplary embodiment, a cross-section of the extremity of the walls has a stepped shape.

In an exemplary embodiment, a cross-section of the extremity of lens element $L_1$ has a stepped shape.

In an exemplary embodiment, a cross-section of the extremity of the walls has a sloping shape.

In an exemplary embodiment, the extremity of the walls comprises a chamfer.

In an exemplary embodiment, the lens module further comprises a cover for protecting the lens, the cover covering lens element $L_1$.

In an exemplary embodiment, the cover has an extreme point beyond lens element $L_1$.

In an exemplary embodiment, the cover blocks light from entering a mechanical part of lens element $L_1$.

According to some aspects of the presently disclosed subject matter, there is provided an optical lens module comprising a plurality $N \geq 3$ of lens elements $L_i$ wherein $1 \leq i \leq N$, each lens element comprising a respective front surface $S_{2i-1}$ and a respective rear surface $S_{2i}$, the lens element surfaces marked $S_k$ where $1 \leq k \leq 2N$, wherein each lens element surface has a clear aperture value $CA(S_k)$, wherein $CA(S_1)$ is substantially equal to $CA(S_{2N})$ and wherein $CA(S_1)$ is greater $CA(S_k)$ for $2 \leq k \leq 2N-1$.

According to some aspects of the presently disclosed subject matter, there is provided an optical lens module comprising a plurality $N \geq 3$ of lens elements $L_i$ wherein $1 \leq i \leq N$, each lens element comprising a respective front surface $S_{2i-1}$ and a respective rear surface $S_{2i}$, the lens element surfaces marked $S_k$ where $1 \leq k \leq 2N$, wherein each lens element surface has a clear aperture value $CA(S_k)$ and wherein $CA(S_1)$ is greater $CA(S_k)$ for $2 \leq k \leq 2N$.

According to some aspects of the presently disclosed subject matter, there is provided a digital camera comprising an image sensor, a reflecting element operative to provide a folded optical path between an object and the image sensor, and an optical lens module as described above.

According to another aspect of the presently disclosed subject matter, there is provided an optical lens module comprising a barrel having a barrel height H and N lens elements $L_1$ to $L_N$, wherein N is equal to or greater than 3 and wherein a height $H_{L1}$ of lens element $L_1$ satisfies or fulfills $H_{L1} \geq H$. In an exemplary embodiment, $H_{LN} \geq H$. In an exemplary embodiment, $H_{LN} = H_{L1}$.

According to another aspect of the presently disclosed subject matter, there is provided an optical lens module comprising N lens elements $L_1$ to $L_N$, wherein $N \geq 3$, wherein each lens element $L_1$ has a height $H_{Li}$ for $1 \leq i \leq N$ and wherein $H_{L1} \geq H_{LN} > H_{L2}$.

In an exemplary embodiment, $H_{L1} > H_{Li}$ for $3 \leq i \leq N-1$.

According to another aspect of the presently disclosed subject matter, there is provided a method for assembling an optical lens module, comprising: inserting a first lens element $L_1$ of N lens elements into a barrel from an object side of the barrel, fixedly attaching lens element Li to the barrel, inserting other lens elements $L_2$ to $L_N$ and spacers $R_1$ to $R_N$ that separate respective lens elements from an image side of the barrel in an insertion order $R_1, L_2 \ldots R_{N-1}, L_N$, and fixedly attaching lens element $L_N$ to the lens module.

According to another aspect of the presently disclosed subject matter, there is provided a mobile electronic device comprising an internal digital camera integrated inside a housing of the mobile electronic device, wherein the digital camera is in accordance with any one of the aspects mentioned above, or comprises any of the optical lens module described above.

According to another aspect of the presently disclosed subject matter there is provided a multiple-aperture camera comprising at least one Wide sub-camera and at least one Tele sub-camera, which is in accordance with any one of the aspects mentioned above, or comprises any of the optical lens module described above.

According to another aspect of the presently disclosed subject matter, the reflecting element is a rotating reflecting element capable of being rotated around one or two axes in order to move the position of a field of view (FOV) of the digital camera and capture a plurality of adjacent non-overlapping or partially overlapping images at a plurality of respective positions, and the digital camera is configured to generate from the plurality of images a composite image having an overall image FOV greater than an FOV of the digital camera.

In some exemplary embodiment, the digital camera according to the above aspect further comprises an actuator configured to apply rotational movement around one or two axes to the rotating reflecting element, the actuator operatively connected to a controller configured to control the actuator to cause the camera to scan an area corresponding to a requested zoom factor, the area being greater than the FOV of the digital camera, and to capture the plurality of images where each image is captured at a different position in the scanned area.

In an exemplary embodiment, the size of the composite image is generated by the stitching of 4 Tele images.

In an exemplary embodiment, the size of the composite image is generated by the stitching of 6 Tele images.

In an exemplary embodiment, the size of the composite image is generated by the stitching of 9 Tele images.

In an exemplary embodiment, a combined size of the plurality of image is greater than the size of the composite image.

BRIEF DESCRIPTION OF THE DRAWINGS

Non-limiting examples of embodiments disclosed herein are described below with reference to figures attached hereto that are listed following this paragraph. The drawings and descriptions are meant to illuminate and clarify embodiments disclosed herein, and should not be considered limiting in any way. Like elements in different drawings may be indicated by like numerals. Elements in the drawings are not necessarily drawn to scale. In the drawings.

DETAILED DESCRIPTION

In the following detailed description, numerous specific details are set forth in order to provide a thorough understanding. However, it will be understood by those skilled in the art that the presently disclosed subject matter may be practiced without these specific details. In other instances, well-known methods have not been described in detail so as not to obscure the presently disclosed subject matter.

It is appreciated that certain features of the presently disclosed subject matter, which are, for clarity, described in the context of separate embodiments, may also be provided in combination in a single embodiment. Conversely, various features of the presently disclosed subject matter, which are, for brevity, described in the context of a single embodiment, may also be provided separately or in any suitable sub-combination.

The term "processing unit" as disclosed herein should be broadly construed to include any kind of electronic device with data processing circuitry, which includes for example a computer processing device operatively connected to a computer memory (e.g. digital signal processor (DSP), a microcontroller, a field programmable gate array (FPGA), an application specific integrated circuit (ASIC), etc.) capable of executing various data processing operations.

Furthermore, for the sake of clarity the term "substantially" is used herein to imply the possibility of variations in values within an acceptable range. According to one example, the term "substantially" used herein should be interpreted to imply possible variation of up to 10% over or under any specified value. According to another example, the term "substantially" used herein should be interpreted to imply possible variation of up to 5% over or under any specified value. According to a further example, the term "substantially" used herein should be interpreted to imply possible variation of up to 2.5% over or under any specified value.

Figure 1A:
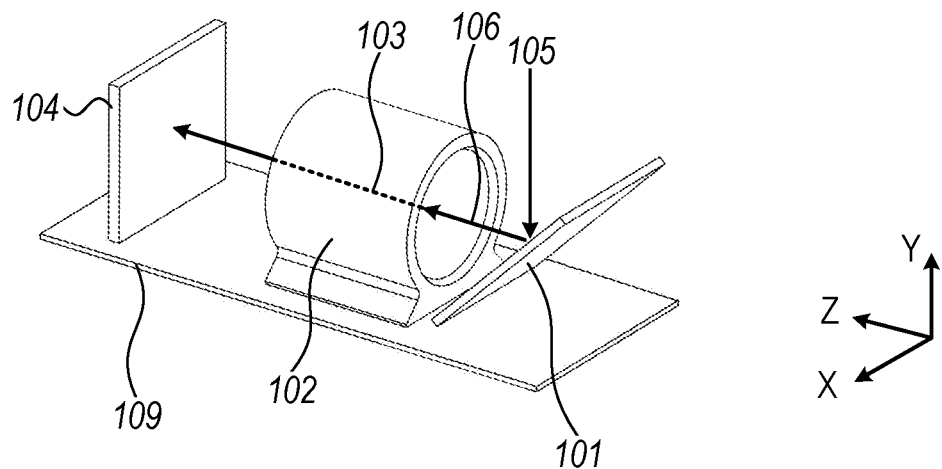
FIG. 1A is a general isometric view of an example of a known folded camera.
Figure 1B:
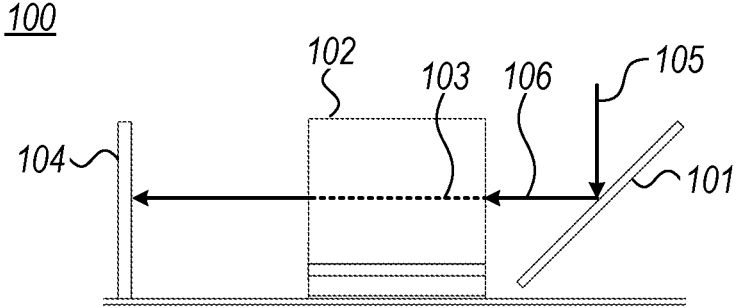
FIG. 1B is a side view of the camera of FIG. 1A.
Figure 1C:
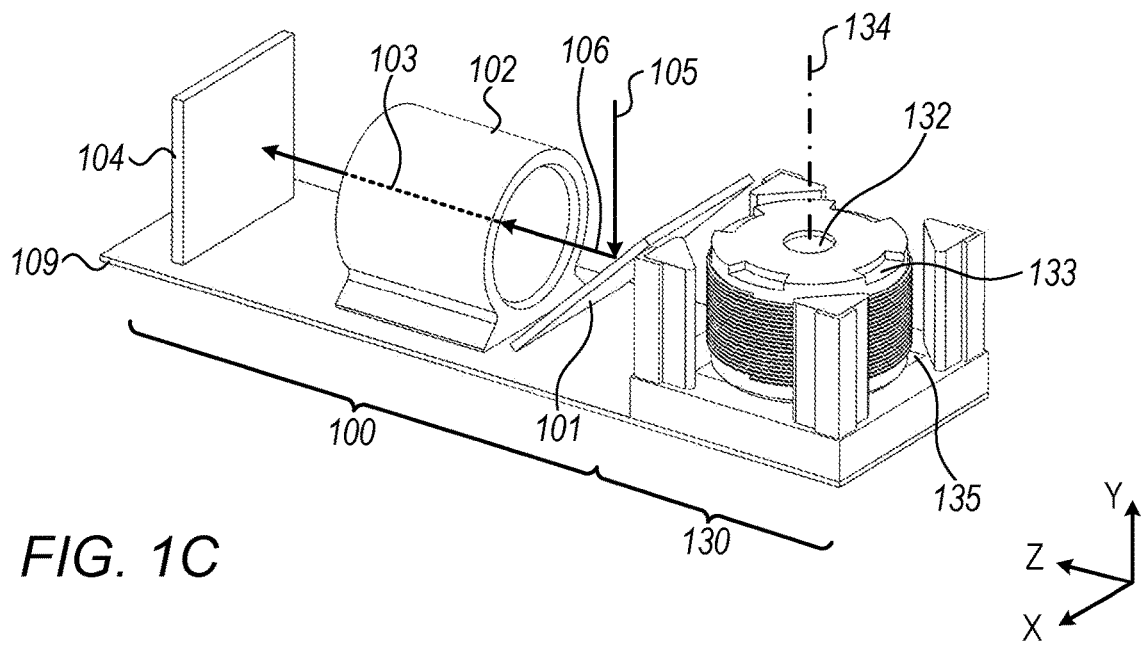
FIG. 1C is a general isometric view of an example of a known camera comprising a folded Tele sub-camera and a Wide sub-camera.
Figure 1D:
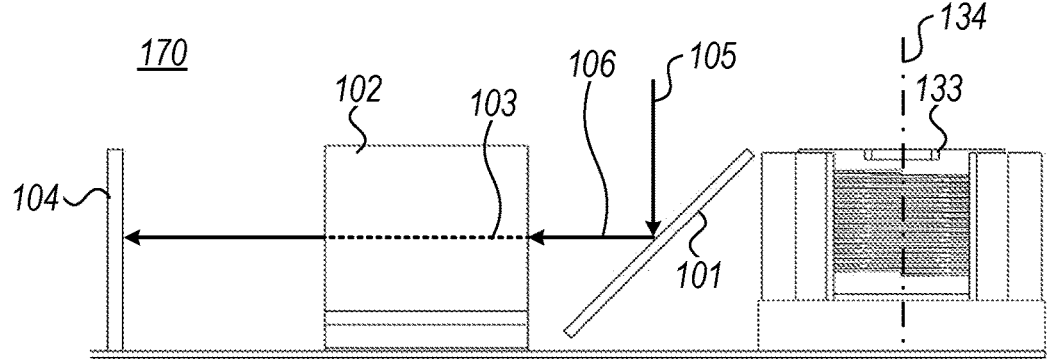
FIG. 1D is a side view of the camera of FIG. 1C.

FIGS. 1A and 1B illustrate a known digital folded camera 100, which may operate for example as a Tele camera. Digital camera 100 comprises a first reflecting element (e.g. mirror or prism, and also referred to sometimes as "optical path folding element" (OPFE)) 101, a plurality of lens elements (not visible in this representation, but visible e.g. in FIGS. 2A and 2B) and an image sensor 104. The lens elements (and also barrel, the optical lens module) may have axial symmetric along a first optical axis 103. At least some of the lens elements can be held by a structure called a "barrel" 102. An optical lens module comprises the lens elements and the barrel. The barrel can have a longitudinal symmetry along optical axis 103. In FIGS. 1A to 1D, the cross-section of this barrel is circular. This is however not mandatory and other shapes can be used.

The path of the optical rays from an object (not shown) to image sensor 104 defines an optical path (see optical paths 105 and 106, which represent portions of the optical path).

OPFE 101 may be a prism or a mirror. As shown in FIG. 1A, OPFE 101 can be a mirror inclined with respect to optical axis 103. In other cases (not shown, see for example PCT/IB2017/052383), OPFE 101 can be a prism with a back surface inclined with respect to optical axis 103. OPFE folds the optical path from a first optical path 105 to a second optical path 106. Optical path 106 is substantially parallel to the optical axis 103. The optical path is thus referred to as "folded optical path" (indicated by optical paths 105 and 106) and camera 100 is referred to as "folded camera". The lens module comprises the plurality of lens elements.

In particular, in some examples, OPFE 101 can be inclined at substantially 45° with respect to optical axis 103. In FIG. 1A, OPFE 101 is also inclined at substantially 45° with respect to optical path 105.

In some known examples, image sensor 104 lies in a X-Y plane substantially perpendicular to optical axis 103. This is however not limiting and the image sensor 104 can have a different orientation. For example, and as described in WO 2016/024192, image sensor 104 can be in the XZ plane. In this case, an additional OPFE can be used to reflect the optical rays towards image sensor 104.

According to some examples, image sensor 104 has a rectangular shape. According to some examples, image sensor 104 has a circular shape. These examples are however not limiting.

In various examples camera 100 may be mounted on a substrate 109, e.g. a printed circuit board (PCB), as known in the art.

Two sub-cameras, for example a regular Wide sub-camera 130 and a Tele sub-camera 100 may be included in a digital camera 170 (also referred to as dual-camera or dual-aperture camera). A possible configuration is described with reference to FIGS. 1C and 1D. In this example, Tele sub-camera 100 is according to the camera described with reference to FIGS. 1A and 1B. The components of Tele sub-camera 100 thus have the same reference numbers as in FIGS. 1A and 1B, and are not described again.

Wide camera 130 can include an aperture 132 (indicating object side of the camera) and an optical lens module 133 (or "Wide lens module" in short) with a symmetry (and optical) axis 134 in the Y direction, as well as a Wide image sensor 135. The Wide sub-camera comprises a Wide lens module configured to provide a Wide image, wherein the Wide sub-camera has a Wide field of view ($FOV_W$) and the Tele sub-camera has a Tele field of view ($FOV_T$) narrower than $FOV_W$. Notably, in other examples a plurality of Wide sub-cameras and/or a plurality of Tele sub-cameras can be incorporated and operative in a single digital camera.

According to one example, the Wide image sensor 135 lies in the X-Z plane, while image sensor 104 (which is in this example is a Tele image sensor) lies in a X-Y plane substantially perpendicular to optical axis 103.

In the examples of FIGS. 1A to 1D, camera 100 can further include (or be otherwise operatively connected to) a processing unit comprising one or more suitably configured processors (not shown) for performing various processing operations, for example processing the Tele image and the Wide image into a fused output image.

The processing unit may include hardware (HW) and software (SW) specifically dedicated for operating with the digital camera. Alternatively, a processor of an electronic device (e.g. its native CPU) in which the camera is installed can be adapted for executing various processing operations related to the digital camera (including, but not limited to, processing the Tele image and the Wide image into an output image).

Figure 2A:
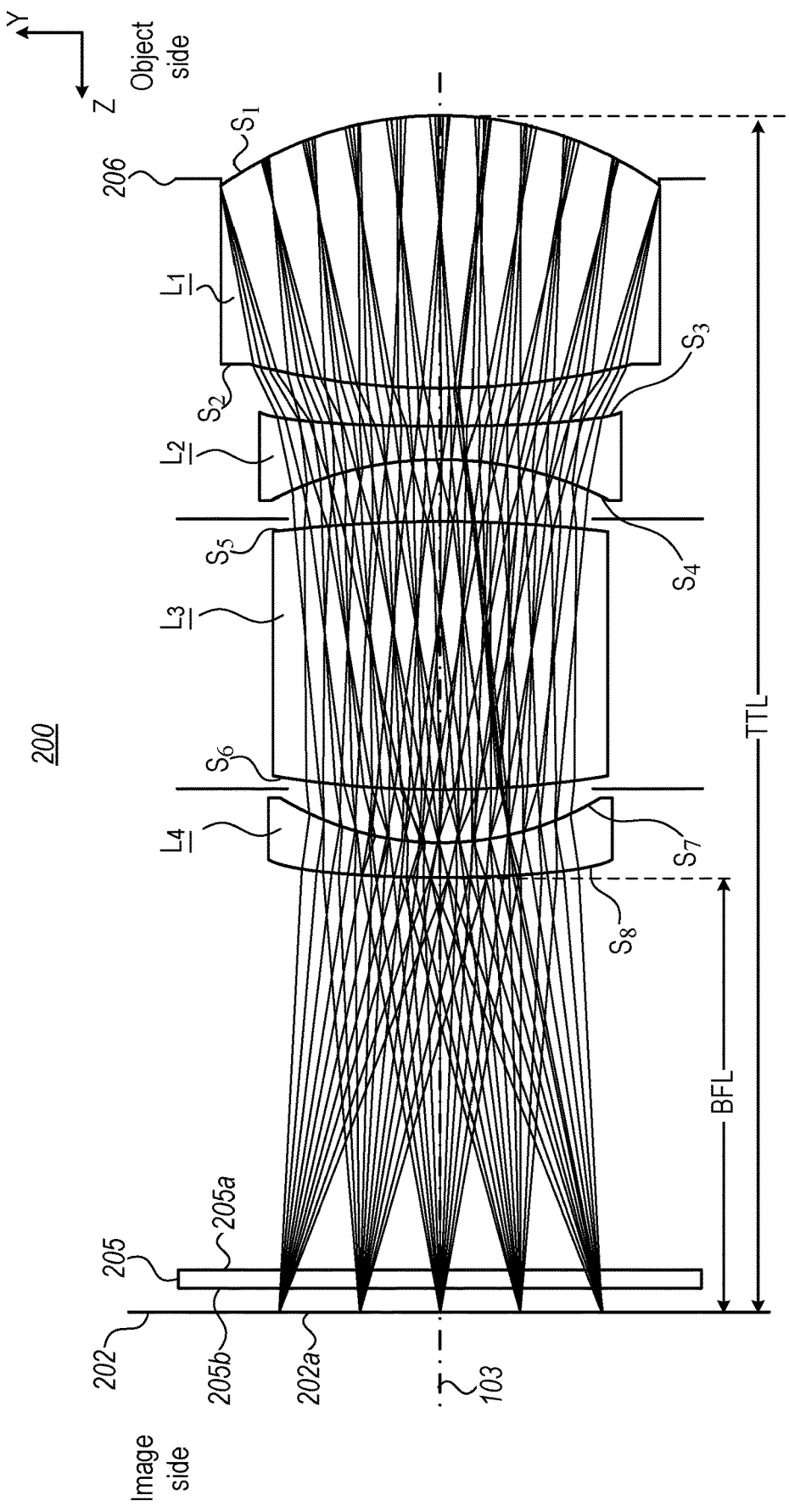
FIG. 2A is a schematic view of one embodiment of lens elements with light rays according to some examples of the presently disclosed subject matter.
Figure 2B:
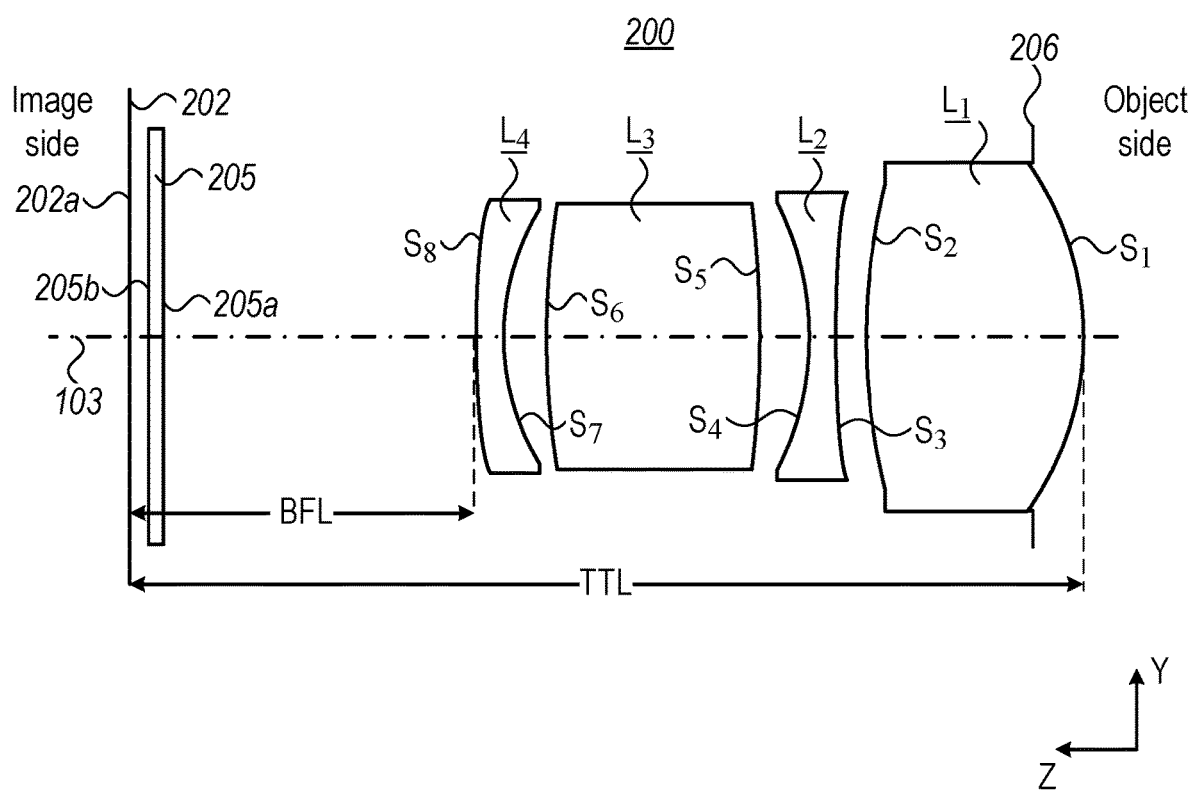
FIG. 2B is another schematic view of the lens elements of FIG. 2A.

Attention is now drawn to FIGS. 2A and 2B, which show schematic view of a lens module 200 having lens elements shown with optical rays according to some examples of the presently disclosed subject matter. Lens module 200 is shown without a lens barrel. FIG. 2A shows optical ray tracing of lens module 200 while FIG. 2B shows only the lens elements for more clarity. In addition, both figures show an image sensor 202 and an optical element 205.

Lens module 200 includes a plurality of N lens elements $L_i$ (wherein "i" is an integer between 1 and N). $L_1$ is the lens element closest to the object side and $L_N$ is the lens element closest to the image side, i.e. the side where the image sensor is located. This order holds for all lenses and lens elements disclosed herein. Lens elements $L_i$ can be used e.g. as lens elements of camera 100 represented in FIGS. 1A and 1B or as lens elements of the Tele sub-camera 100 of FIGS. 1C and 1D. As shown, the N lens elements are axial symmetric along optical axis 103.

In the examples of FIGS. 2A and 2B, N is equal to four. This is however not limiting and a different number of lens elements can be used. According to some examples, N is equal to or greater than 3. For example, N can be equal to 3, 4, 5, 6 or 7.

In the examples of FIGS. 2A and 2B, some of the surfaces of the lens elements are represented as convex, and some are represented as concave. The representation of FIGS. 2A and 2B is however not limiting and a different combination of convex and/or concave surfaces can be used, depending on various factors such as the application, the desired optical power, etc.

Optical rays (after their reflection by a reflecting element, such as OPFE 101) pass through lens elements $L_i$ and form an image on an image sensor 202. In the examples of FIGS. 2A and 2B, the optical rays pass through an optical element 205 (which comprises a front surface 205a and a rear surface 205b, and can be e.g. a cut-off filter) before impinging on image sensor 202. This is however not limiting, and in some examples, optical element 205 is not present. Optical element 205 may be for example infra-red (IR) filter, and\or a glass image sensor dust cover.

Each lens element $L_i$ comprises a respective front surface $S_{2i-1}$ (the index "2i−1" being the number of the front surface) and a respective rear surface $S_{2i}$ (the index "2i" being the number of the rear surface), where "i" is an integer between 1 and N. This numbering convention is used throughout the description. Alternatively, as done throughout this description, lens surfaces are marked as "$S_k$", with k running from 1 to 2N. The front surface and the rear surface can be in some cases aspherical. This is however not limiting.

As used herein the term "front surface" of each lens element refers to the surface of a lens element located closer to the entrance of the camera (camera object side) and the term "rear surface" refers to the surface of a lens element located closer to the image sensor (camera image side).

As explained below, a clear height value $CH(S_k)$ can be defined for each surface $S_k$ for 1≤k≤2N), and a clear aperture value $CA(S_k)$ can be defined for each surface $S_k$ for 1≤k≤2N). $CA(S_k)$ and $CH(S_k)$ define optical properties of each surface $S_k$ of each lens element.

Figure 6:
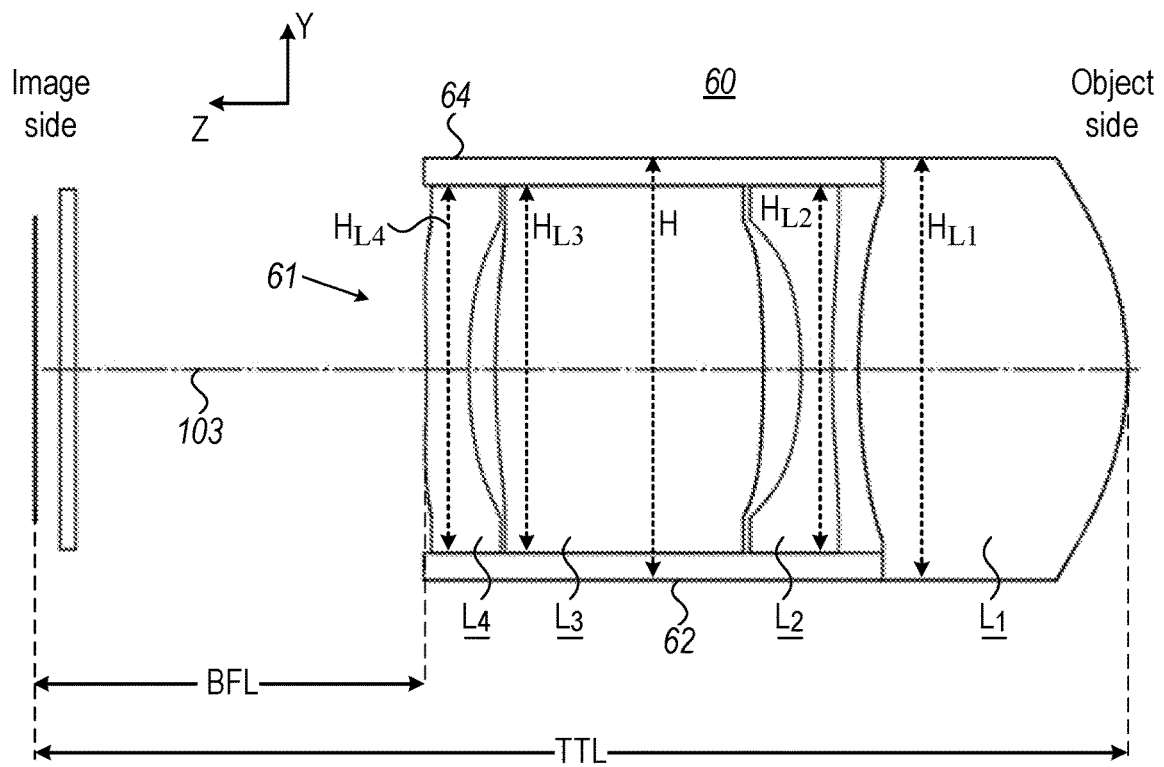
FIG. 6 is a schematic representation of a side view of an optical lens module for holding the lens elements, according to some examples of the presently disclosed subject matter.

In addition, and as shown e.g. in FIG. 6, a height ("$H_{Li}$", for 1≤i≤N) is defined for each lens element $L_i$. $H_{Li}$ corresponds, for each lens element $L_i$, to the maximal height of lens element $L_i$ measured along an axis perpendicular to the optical axis of the lens elements (in the example in FIG. 6, $H_{Li}$ is measured along optical path 105 which is perpendicular to optical axis 103). For a given lens element, the height is greater than, or equal to the clear height value CH and the clear aperture value CA of the front and rear surfaces of this given lens element. Typically, for an axial symmetric lens element, $H_{Li}$ is the diameter of lens element $L_1$ as seen in FIG. 11F. Typically, for an axial symmetric lens element, $H_{Li}$=max{$CA(S_{2i-1})$, $CA(S_{2i})$}+ mechanical part size. The mechanical part and its properties are defined below (FIGS. 11E, 11F and 17A-D). The mechanical part size contribution to $H_{Li}$ is typically 200 μm-1000 μm.

In addition, as also shown in FIG. 6, a height H is defined for the lens barrel. For any axis A which is perpendicular to the optical axis of a lens module, a diameter $D_A$ is defined as the maximal distance measured along axis A of the lens module. H is defined as the minimum of all $D_A$s for all possible axes A. In the example in FIG. 6, H corresponds to the maximal height of the barrel measured along an axis perpendicular to the optical axis 103 of the lens module and parallel to optical path 105.

Figure 7:
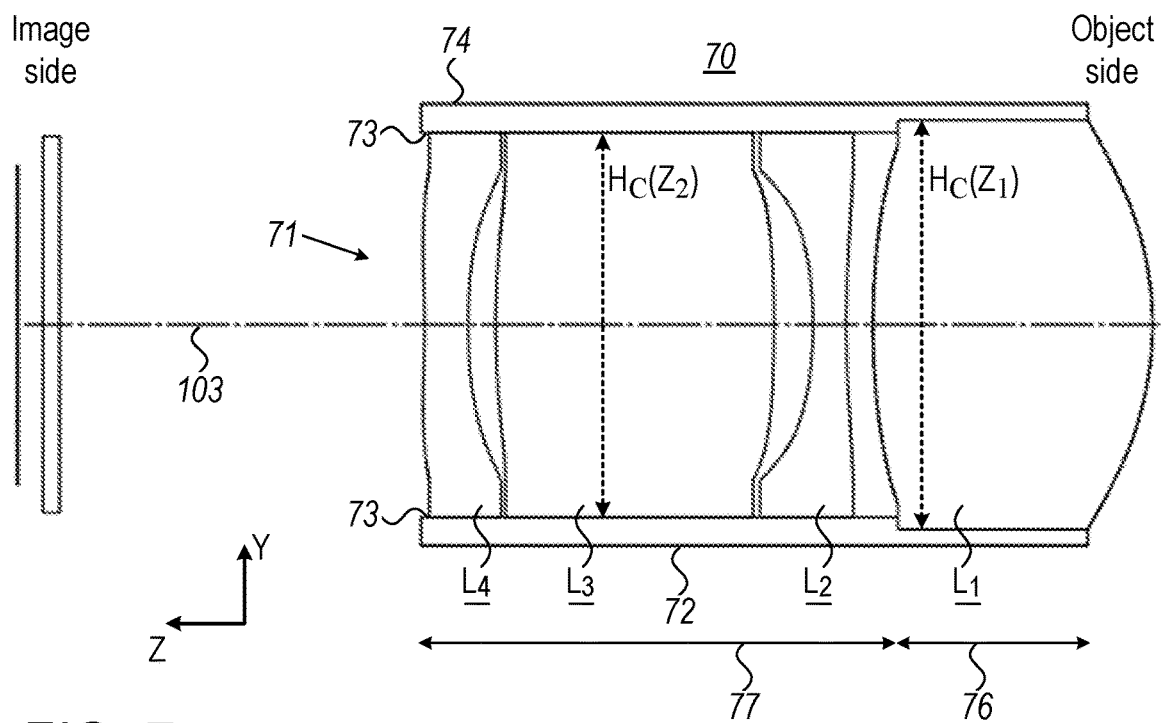
FIG. 7 is a schematic representation of a side view of an optical lens module for holding the lens elements, according to other examples of the presently disclosed subject matter.

In addition, as also shown in FIG. 7, a height $H_C$ is defined for the cavity of a lens barrel. $H_C$ corresponds to the height of the cavity barrel measured along an axis perpendicular to the optical axis of the lens module (in the example in FIG. 7, $H_C$ is measured along optical path 105 which is perpendicular to optical axis 103). In some examples, where the cavity barrel is axial-symmetric, $H_C$ is the internal diameter of the cavity barrel.

According to some examples of the presently disclosed subject matter, the closest lens element to the object side ($L_1$) has a height which is greater than the height of each of the other lens elements. A non-limiting example is shown in FIG. 6, where $H_{L1}$ is greater than $H_{L2}$, $H_{L3}$ and $H_{L4}$.

According to some examples of the presently disclosed subject matter, the closest lens element to the object side (Li) and the closest lens element to the image sensor ($L_N$) have a height which is substantially equal and is greater than the height of each of the other lens elements. A non-limiting example is shown in FIG. 21B, where $H_{L1}$ equal to $H_{L5}$ and are greater than $H_{L2}$, $H_{L3}$ and $H_{L4}$.

Figure 3A:
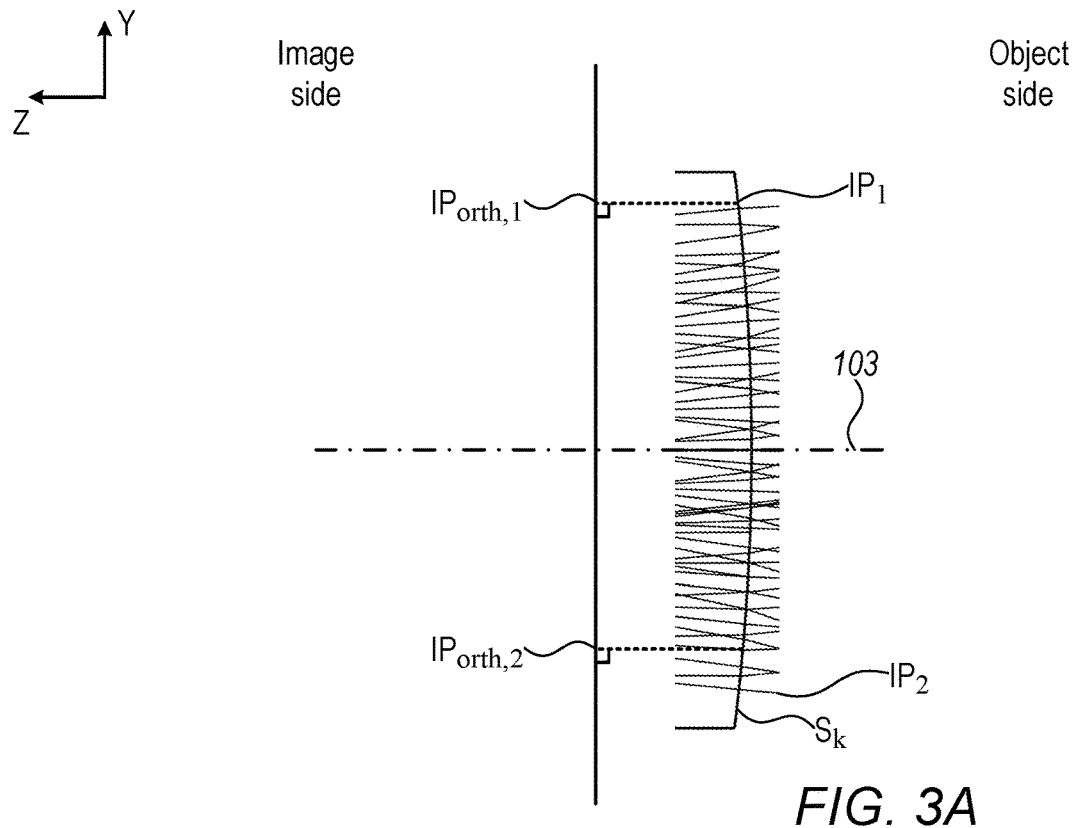
FIG. 3A is a schematic view of impact points of optical rays impinging a convex surface of a lens element, and a schematic view of the orthogonal projection of the impact points on a plane P, according to some examples of the presently disclosed subject matter.
Figure 3B:
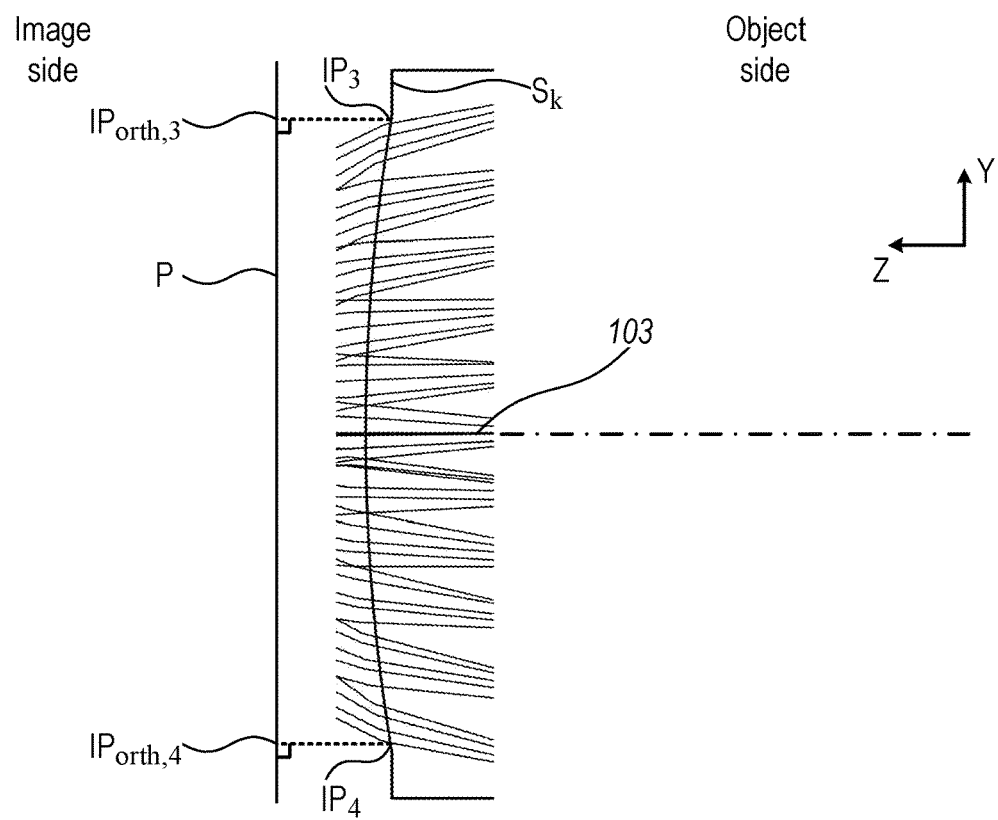
FIG. 3B is a schematic view of impact points of optical rays impinging a concave surface of a lens element, and a schematic view of the orthogonal projection of the impact points on a plane P, according to some examples of the presently disclosed subject matter.
Figure 4:
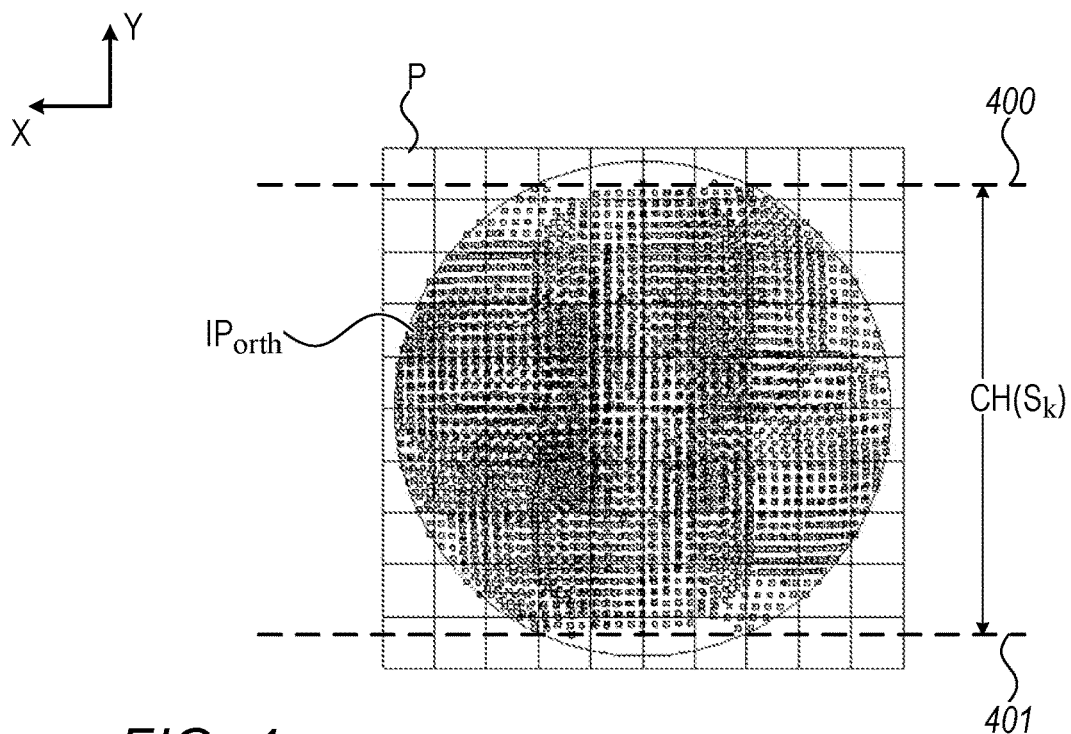
FIG. 4 is a schematic representation of the orthogonal projection of the impact points on a plane P, and of a clear height value ("CH"), according to some examples of the presently disclosed subject matter.

As shown in FIGS. 3A, 3B and 4, each optical ray that passes through a surface $S_k$ (for 1≤k≤2N) impinges this surface on an impact point IP. Optical rays enter lens module 200 from surface $S_1$, and pass through surfaces $S_2$ to $S_{2N}$ consecutively. Some optical rays can impinge on any surface $S_k$ but cannot/will not reach image sensor 202. For a given surface $S_k$, only optical rays that can form an image on image sensor 202 are considered forming a plurality of impact points IP are obtained. $CH(S_k)$ is defined as the distance between two closest possible parallel lines (see lines 400 and 401 in FIG. 4 located on a plane P orthogonal to the optical axis of the lens elements (in the representation of FIGS. 3A and 3B, plane P is parallel to plane X-Y and is orthogonal to optical axis 103), such that the orthogonal projection $IP_{orth}$ of all impact points IP on plane P is located between the two parallel lines. $CH(S_k)$ can be defined for each surface $S_k$ (front and rear surfaces, with 1≤k≤2N).

The definition of $CH(S_k)$ does not depend on the object currently imaged, since it refers to the optical rays that "can" form an image on the image sensor. Thus, even if the currently imaged object is located in a black background which does not produce light, the definition does not refer to this black background since it refers to any optical rays that "can" reach the image sensor to form an image (for example optical rays emitted by a background which would emit light, contrary to a black background).

For example, FIG. 3A illustrates the orthogonal projections $IP_{orth,1}$, $IP_{orth,2}$ of two impact points $IP_1$ and $IP_2$ on plane P which is orthogonal to optical axis 103. By way of example, in the representation of FIG. 3A, surface $S_k$ is convex.

FIG. 3B illustrates the orthogonal projections $IP_{orth,3}$, $IP_{orth,4}$ of two impact points $IP_3$ and $IP_4$ on plane P. By way of example, in the representation of FIG. 3B, surface $S_k$ is concave.

In FIG. 4, the orthogonal projection $IP_{orth}$ of all impact points IP of a surface $S_k$ on plane P is located between parallel lines 400 and 401. $CH(S_k)$ is thus the distance between lines 400 and 401.

Figure 5:
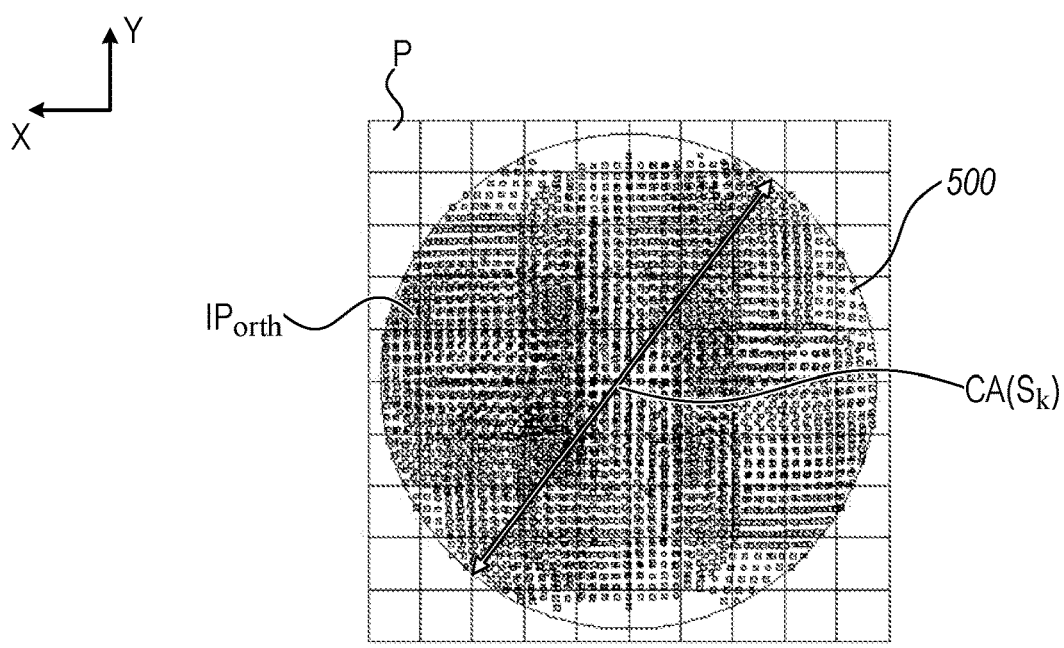
FIG. 5 is a schematic representation of the orthogonal projection of the impact points on a plane P, and of a clear aperture value ("CA"), according to some examples of the presently disclosed subject matter.

Attention is drawn to FIG. 5. According to the presently disclosed subject matter, a clear aperture $CA(S_k)$ is defined for each given surface $S_k$ (for 1≤k≤2N), as the diameter of a circle, wherein the circle is the smallest possible circle located in a plane P orthogonal to the optical axis 103 and encircling all orthogonal projections $IP_{orth}$ of all impact points on plane P. As mentioned above with respect to $CH(S_k)$, it is noted that the definition of $CA(S_k)$ also does not depend on the object which is currently imaged.

As shown in FIG. 5, the circumscribed orthogonal projection $IP_{orth}$ of all impact points IP on plane P is circle 500. The diameter of this circle 500 defines $CA(S_k)$.

Detailed optical data and surface data are given in Tables 1-2 for the example of the lens elements in FIG. 2A-2B, in Tables 3 and 4 for the example of the lens elements in FIGS. 6-9, in Tables 5 and 6 for the example of the lens elements in FIG. 20 and in Tables 7 and 8 for the example of the lens elements in FIG. 21A-21B (see below). The values provided for these examples are purely illustrative and according to other examples, other values can be used.

In the tables below, the units of the radius of curvature ("R"), the lens element thickness ("Thickness") and the clear aperture ("CA") are expressed in millimeters.

Line "0" of Tables 1, 3 and 5 and 7 describes parameters associated to the object (not visible in the figures); the object is being placed at 1 km from the system, considered to be an infinite distance.

Lines "1" to "8" of Tables 1 to 4 describe respectively parameters associated to surfaces $S_1$ to $S_8$. Lines "1" to "10" of Tables 5 to 8 describe respectively parameters associated with surfaces $S_1$ to $S_{10}$.

Lines "9", "10" and "11" of Tables 1 and 3, and lines "11", "12" and "13" in Tables 5 and 7 describe respectively parameters associated to surfaces 205a, 205b of optical element 205 and of a surface 202a of the image sensor 202.

In lines "i" of Tables 1, 3 and 5 (with i between 1 and 10 in tables 1 and 3 and i between 1 and 12 in Table 5), the thickness corresponds to the distance between surface $S_1$ and surface $S_{i+1}$, measured along the optical axis 103 (which coincides with the Z axis).

In line "11" of Tables 1, 3 (line "13" in Tables 5 and 7), the thickness is equal to zero, since this corresponds to the last surface 202a.

"BK7", "K26R", "EP6000" and "H-ZK3" are conventional materials which are known to a person skilled in the art and which are mentioned by way of example.

"BK7" is characterized by the approximate following parameters:
Refractive index of 1.5168, and
Abbe number of 64.16733.

"K26R" is a material manufactured by Zeon Corporation, and is characterized by the approximate following parameters:
Refractive index of 1.534809, and
Abbe number of 55.663857.

"EP6000" is a material manufactured by Mitsubishi, and is characterized by the approximate following parameters:
Refractive index of 1.6397, and
Abbe number of 23.5288.

"H-ZK3" is a type of glass characterized by the approximate following parameters:
Refractive index of 1.5891, and
Abbe number of 61.25.

In Table 7, the properties of each surface material are given, with "Nd" as refractive index and "Vd" as Abbe number.

The equation of the surface profiles of each surface $S_k$ (for k between 1 and 2N) is expressed by:

$$z = \frac{cr^2}{1+\sqrt{1-(1+k)c^2r^2}} + A_1 r^4 + A_2 r^6 + A_3 r^8 + A_4 r^{10} + A_5 r^{12} + A_6 r^{14} + A_7 r^{16}$$

where "z" is the position of the profile of the surface $S_k$ measured along optical axis 103 (coinciding with the Z axis, wherein z=0 corresponds to the intersection of the profile of the surface $S_k$ with the Z axis), "r" is the distance from optical axis 103 (measured along an axis which is perpendicular to optical axis 103), "K" is the conic coefficient, c=1/R where R is the radius of curvature, and A, (n from 1 to 7) are coefficients given in Tables 2 and 4 for each surface $S_k$. The maximum value of r, "max r", is equal to D/2.

In the example of FIGS. 2A and 2B, the following optical properties are achieved:
TTL=13.6 mm.
BFL=4.93 mm.
EFL (effective focal length)=13.8 mm.
$CA(S_1)=CH(S_1)$=5 mm.
$CA(S_2)=CH(S_2)$=4.4 mm.
For k between 3 and 8, $CA(S_k) \leq 3.8$ mm, $CH(S_k) \leq CA(S_k)$.
f/#=2.76
Focal length of $L_1$: $f_1$=5.57 mm, $f_1$/EFL=0.4
Sensor diagonal (SD) 5.86 mm, last surface clear aperture $CA(S_{2N})$=3.8 mm, $CA(S_{2N})$/SD=0.65.

In the example of FIG. 6, the following optical properties are achieved:
TTL=11.1 mm,
BFL=4.3 mm,
EFL (effective focal length)=11.2 mm,
$CA(S_1)=CH(S_1)$=4.32 mm,
$CA(S_2)=CH(S_2)$=3.52 mm, and
For k between 3 and 8, $CA(S_k) \leq 3.2$ mm, $CH(S_k) \leq CA(S_k)$.
f/#=2.5
Focal length of $L_1$: $f_1$=4.54 mm, $f_1$/EFL=0.4
Sensor diagonal (SD) 5.24 mm, last surface clear aperture $CA(S_{2N})$=3.2 mm, $CA(S_{2N})$/SD=0.61.

Figure 20:
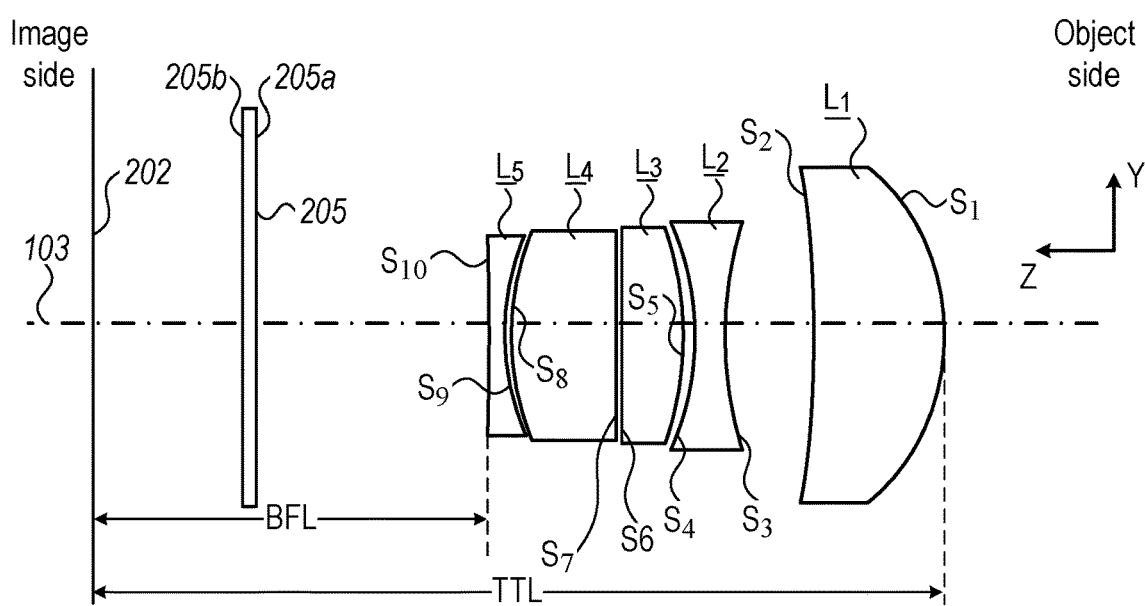
FIG. 20 shows a side cut of yet another embodiment of a barrel with lens elements, according to the presently disclosed subject matter.

In the example of FIG. 20, the following optical properties are achieved:
TTL=15 mm.
BFL=6.9 mm.
EFL=16 mm.
$CA(S_1)=CH(S_1)$=5.92 mm.
$CA(S_2)=CH(S_2)$=5.1 mm.
For k between 3 and 10, $CA(S_k) \leq 4.0$ mm, $CH(S_k) \leq CA(S_k)$.
f/#=2.7
Focal length of $L_1$: $f_1$=8.1 mm, $f_1$/EFL=0.506
Sensor diagonal (SD) 5.86 mm, last surface clear aperture $CA(S_{2N})$=3.52 mm, $CA(S_{2N})$/SD=0.6

Figure 21A:
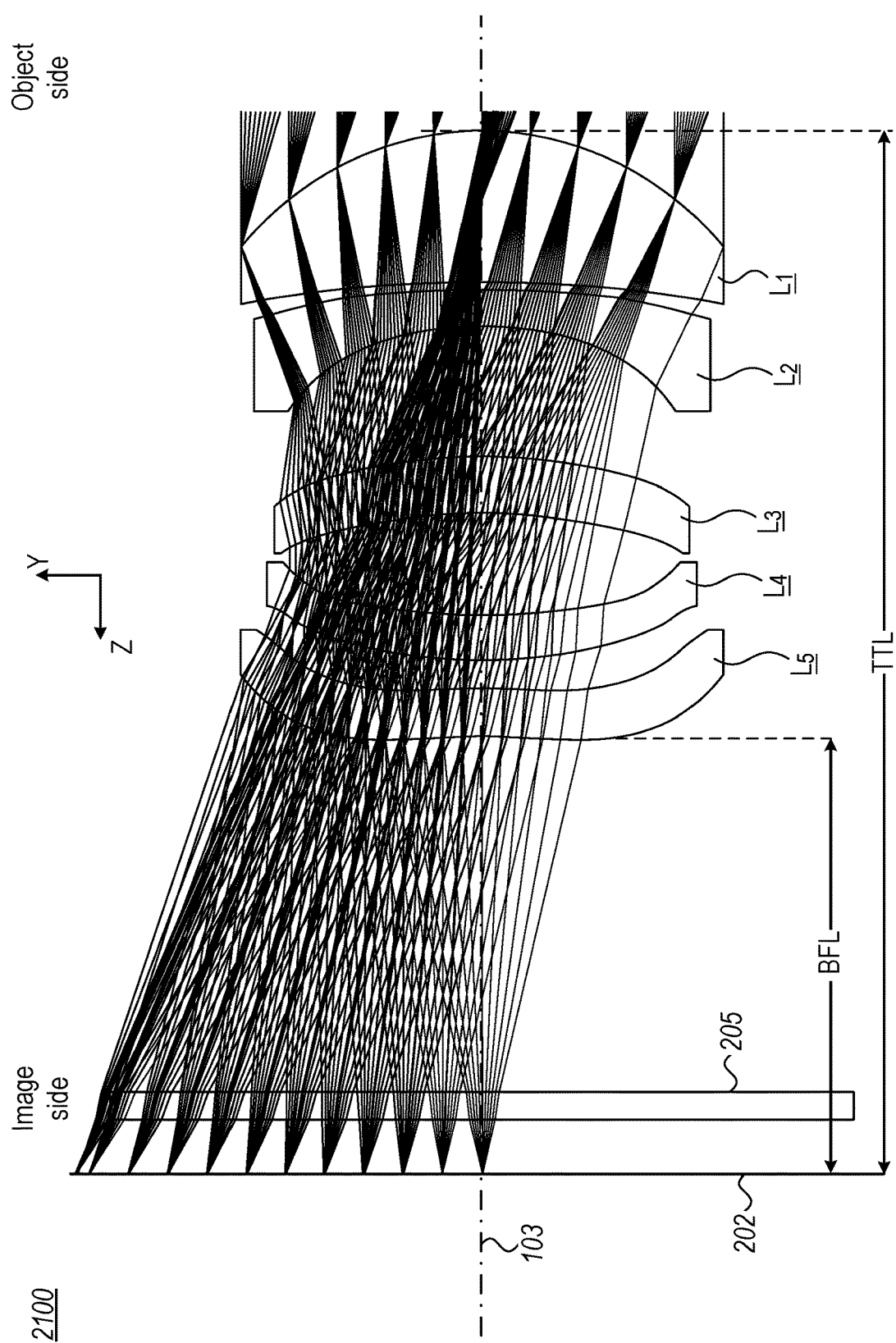
FIG. 21A is a schematic view of another embodiment of lens elements showing light rays, according to another example of the presently disclosed subject matter.
Figure 21B:
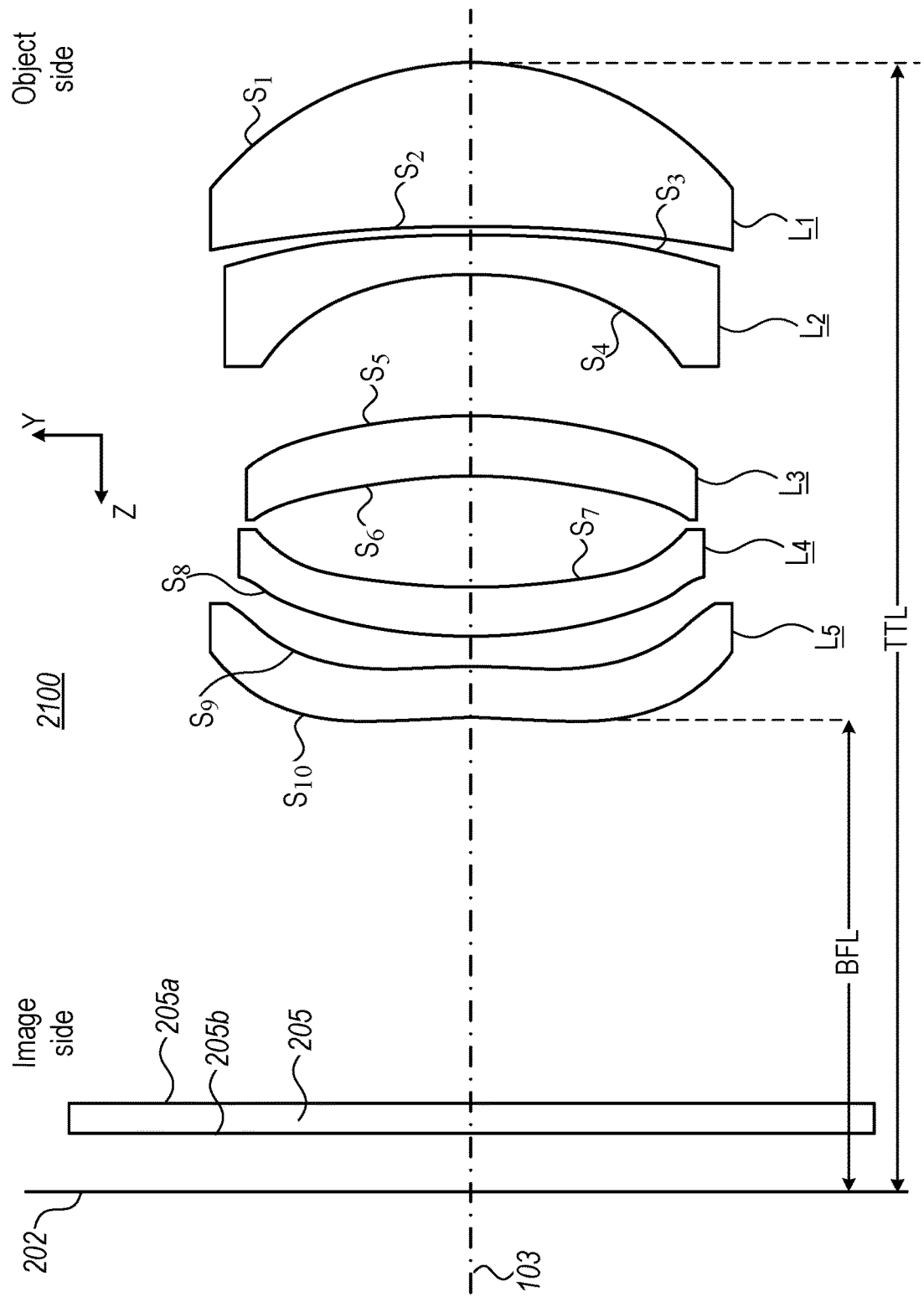
FIG. 21B is another schematic view of the lens elements of FIG. 21A.

In the example of FIGS. 21A and 21B, the following optical properties are achieved:
TTL=7.78 mm.
BFL=3.23 mm.
EFL (effective focal length)=7.97 mm.
$CA(S_1)=CH(S_1)$=3.6 mm.
$CA(S_2)=CH(S_2)$=3.45 mm.
For k between 3 and 8, $CA(S_k) \leq 3.4$ mm, $CH(S_k) \leq CA(S_k)$.
$CA(S_{2N-1})$=3.36 mm, $CH(S_{2N-1})$=2.842 mm
$CA(S_{2N})$=3.6 mm, $CH(S_{2N-1})$=3.064 mm
f/#=2.2
Focal length of $L_1$: $f_1$=3.972 mm, $f_1$/EFL=0.498
Sensor diagonal (SD) 5.86 mm, $CA(S_{2N})$/SD=0.615.

In this application and for the properties above, the following symbols and abbreviations are used, all of which are terms known in the art:

TTL: The "total track length" is defined as the maximal distance, measured along an axis parallel to the optical axis, between a point of the front surface $S_1$ of the first lens element $L_1$ and the image sensor, when the system is focused to an infinity object distance.

BFL: The "focal back length" is defined as the minimal distance, measured along an axis parallel to the first optical axis, between a point of the rear surface $S_{2N}$ of the last lens element $L_N$ and the image sensor, when the system is focused to an infinity object distance.

EFL: Effective focal length of a lens module (assembly of lens elements $L_1$ to $L_N$)

f/#: f-number, the ratio of the EFL to the aperture stop diameter.

Aperture stop: the opening which limits the amount of light which passes through an optical system.

TABLE 1

| # | R | Thickness | Material | CA/2 | Conic coefficient K |
|---|---|---|---|---|---|
| 0 | Infinity | 1.00E+06 | | | |
| 1 | 4.018 | 3.122 | K26R | 2.50 | −0.918 |
| 2 | −8.544 | 0.427 | | 2.20 | −13.319 |
| 3 | −11.602 | 0.383 | EP6000 | 1.90 | −68.256 |
| 4 | 4.252 | 0.668 | | 1.90 | 0.035 |
| 5 | 12.410 | 3.072 | EP6000 | 1.90 | 9.316 |
| 6 | −9.884 | 0.565 | | 1.90 | −50.842 |
| 7 | −5.080 | 0.434 | K26R | 1.90 | −30.682 |
| 8 | −57.279 | 4.429 | | 1.90 | −207.271 |
| 9 | Infinity | 0.210 | BK7 | | |
| 10 | Infinity | 0.289 | | | |
| 11 | Infinity | 0.000 | | | |

TABLE 2

| # | A1 | A2 | A3 | A4 | A5 | A6 | A7 |
|---|---|---|---|---|---|---|---|
| 1 | 1.0982E−03 | −5.6900E−05 | 3.0019E−06 | −3.0442E−07 | −2.0532E−07 | 2.1748E−08 | −2.5134E−09 |
| 2 | 1.4662E−03 | −6.8269E−04 | 3.6775E−05 | 1.2874E−07 | −1.5311E−06 | 1.6528E−07 | 0.0000E+00 |
| 3 | −4.4641E−03 | 2.3303E−03 | −6.0231E−04 | 5.0714E−05 | 2.4477E−06 | −3.4785E−07 | −1.2814E−08 |
| 4 | −4.6819E−03 | 2.7039E−03 | −4.9103E−04 | −6.1960E−05 | 4.4187E−05 | −5.1739E−06 | 0.0000E+00 |

TABLE 2-continued

| # | A1 | A2 | A3 | A4 | A5 | A6 | A7 |
|---|---|---|---|---|---|---|---|
| 5 | −8.9765E−04 | 2.5621E−04 | −1.2915E−04 | −5.1021E−06 | 9.6811E−06 | −1.2420E−06 | 0.0000E+00 |
| 6 | −2.6288E−03 | 8.0824E−04 | −4.4175E−05 | −1.8619E−05 | −1.2620E−05 | 4.5041E−06 | 0.0000E+00 |
| 7 | −4.3474E−02 | 8.7969E−03 | −7.7260E−03 | −2.7259E−04 | 1.8367E−05 | 9.9215E−06 | 0.0000E+00 |
| 8 | −1.9365E−02 | 1.5956E−03 | 3.4614E−04 | −1.1796E−04 | −1.3790E−05 | 5.9480E−06 | −2.5281E−07 |

TABLE 3

| # | R | Thickness | Material | CA/2 | Conic coefficient K |
|---|---|---|---|---|---|
| 0 | Infinity | 1.00E+06 | | | |
| 1 | 3.252 | 2.571 | K26R | 2.16 | −0.763 |
| 2 | −7.055 | 0.253 | | 1.76 | −17.097 |
| 3 | −10.672 | 0.444 | EP6000 | 1.60 | −75.529 |
| 4 | 3.302 | 0.309 | | 1.45 | −0.248 |
| 5 | 10.322 | 2.569 | EP6000 | 1.47 | 15.386 |
| 6 | −7.343 | 0.403 | | 1.46 | −43.555 |
| 7 | −4.066 | 0.282 | K26R | 1.45 | −22.400 |
| 8 | −39.758 | 3.804 | | 1.60 | −20.554 |
| 9 | Infinity | 0.210 | BK7 | | |
| 10 | Infinity | 0.290 | | | |
| 11 | Infinity | 0.000 | | | |

TABLE 4

| # | A1 | A2 | A3 | A4 | A5 | A6 | A7 |
|---|---|---|---|---|---|---|---|
| 1 | 1.6499E−03 | −1.0742E−04 | 5.7901E−06 | −8.6098E−08 | −1.7012E−06 | 1.8672E−07 | −2.7417E−08 |
| 2 | 3.0173E−03 | −1.4633E−03 | 7.0329E−05 | −1.5844E−05 | −3.5031E−06 | 8.0518E−07 | 0.0000E+00 |
| 3 | −6.8586E−03 | 5.5011E−03 | −1.6856E−03 | 2.1537E−04 | 1.2470E−05 | −1.0238E−05 | 9.8851E−07 |
| 4 | −8.1487E−03 | 5.6510E−03 | −7.1159E−04 | 1.4107E−05 | 3.5178E−04 | 1.6510E−05 | 0.0000E+00 |
| 5 | −4.9793E−04 | −4.5018E−04 | −2.6820E−04 | 3.0430E−04 | 2.0799E−04 | 1.9782E−05 | 0.0000E+00 |
| 6 | −2.4020E−03 | 1.2967E−03 | −2.1528E−04 | −1.8139E−04 | −2.3192E−05 | 6.9007E−05 | 0.0000E+00 |
| 7 | −6.5893E−02 | 1.4911E−02 | −4.1874E−03 | 8.7863E−05 | 3.9488E−05 | 7.0827E−05 | 0.0000E+00 |
| 8 | −3.4127E−02 | 2.0251E−03 | 1.8783E−03 | −1.2365E−03 | 2.2451E−04 | 3.2977E−05 | −1.1683E−05 |

TABLE 5

| # | R | Thickness | Material | CA/2 | Conic coefficient K |
|---|---|---|---|---|---|
| 0 | Infinity | 1.00E+06 | | | |
| 1 | 4.009 | 2.271 | H-ZK3 | 2.96 | 0 |
| 2 | 18.115 | 1.547 | | 2.55 | 0 |
| 3 | −5.167 | 0.562 | EP6000L | 2.00 | −2.296 |
| 4 | 6.968 | 0.162 | | 2.00 | 9.483 |
| 5 | 4.666 | 1.082 | K26R | 1.90 | −2.619 |
| 6 | 52.645 | 0.121 | | 1.90 | 10.398 |
| 7 | 28.168 | 1.851 | EP6000L | 1.83 | −367.355 |
| 8 | −5.062 | 0.101 | | 1.83 | −10.130 |
| 9 | −5.098 | 0.291 | K26R | 1.76 | −10.587 |
| 10 | 15.000 | 4.115 | | 1.76 | −9.745 |
| 11 | Infinity | 0.210 | BK7 | 2.44 | |
| 12 | Infinity | 2.673 | | 2.47 | |
| 13 | Infinity | | | 2.94 | |

TABLE 6

| # | A1 | A2 | A3 | A4 | A5 | A6 | A7 |
|---|---|---|---|---|---|---|---|
| 1 | 0 | 0 | 0 | 0 | 0 | 0 | 0 |
| 2 | 0 | 0 | 0 | 0 | 0 | 0 | 0 |
| 3 | 7.1296E−03 | −1.3791E−04 | −2.8926E−05 | 3.7349E−06 | 0 | 0 | 0 |
| 4 | −2.8741E−03 | 8.8769E−04 | −1.2786E−04 | 2.0275E−05 | 0 | 0 | 0 |
| 5 | −2.1504E−03 | −3.1621E−04 | −3.2758E−06 | −2.2831E−07 | 0 | 0 | 0 |
| 6 | 4.1139E−03 | −1.9087E−03 | 1.9639E−04 | −3.2249E−05 | 0 | 0 | 0 |
| 7 | −4.3880E−03 | −7.7699E−04 | 1.8992E−04 | −6.8854E−06 | 0 | 0 | 0 |
| 8 | −6.5726E−03 | −5.8651E−04 | 1.3315E−04 | −2.0025E−05 | 0 | 0 | 0 |
| 9 | −7.8205E−03 | −1.1425E−03 | 2.7014E−04 | −4.0371E−05 | 0 | 0 | 0 |
| 10 | −5.0642E−03 | 3.6557E−04 | −9.7321E−05 | 1.7319E−05 | 0 | 0 | 0 |

TABLE 7

| # | R | Thickness | Material refraction index | Material Abbe number | CA/2 | Conic coefficient K |
|---|---|---|---|---|---|---|
| 1 | 2.271 | 1.127 | 1.67 | 54.96 | 1.8 | 7.979E−07 |
| 2 | 11.822 | 0.06 | | | 1.725 | 2.410 |
| 3 | 14.756 | 0.27 | 1.64 | 23.52 | 1.7 | 13.805 |
| 4 | 2.728 | 0.974 | | | 1.45 | 2.902E−03 |
| 5 | 3.713 | 0.416 | 1.64 | 23.52 | 1.55 | −2.868 |
| 6 | 3.524 | 0.764 | | | 1.5 | −8.486 |

TABLE 7-continued

| # | R | Thickness | Material refraction index | Material Abbe number | CA/2 | Conic coefficient K |
|---|---|---|---|---|---|---|
| 7 | −5.301 | 0.338 | 1.64 | 23.52 | 1.48 | 2.743 |
| 8 | −4.321 | 0.212 | | | 1.6 | 2.578 |
| 9 | 4.327 | 0.352 | 1.53 | 55.66 | 1.68 | −9.755 |
| 10 | 3.771 | 2.656 | | | 1.8 | −6.534 |
| 11 | Infinity | 0.210 | 1.52 | 64.16 | 2.894 | |
| 12 | Infinity | 0.401 | | | 2.938 | |
| 13 | Infinity | — | | | 3.028 | |

TABLE 8

| # | A1 | A2 | A3 | A4 | A5 | A6 | A7 |
|---|---|---|---|---|---|---|---|
| 1 | 4.421E−05 | −2.009E−04 | −1.152E−04 | −6.051E−10 | | | |
| 2 | 6.027E−03 | −1.244E−03 | −5.380E−08 | | | | |
| 3 | 0.020 | 7.012E−04 | −1.081E−03 | −6.297E−08 | | | |
| 4 | 0.024 | 0.011 | 4.241E−04 | −9.114E−08 | | | |
| 5 | −0.022 | 8.939E−03 | 2.200E−03 | −1.002E−06 | | | |
| 6 | −0.012 | 6.756E−03 | −2.299E−03 | 1.314E−03 | 1.758E−04 | −1.030E−05 | |
| 7 | −0.017 | 0.053 | −0.044 | 7.968E−03 | −1.599E−03 | 6.117E−04 | 7.436E−09 |
| 8 | −0.086 | 0.159 | −0.117 | 0.041 | −9.090E−03 | 1.280E−03 | 2.793E−07 |
| 9 | −0.252 | 0.182 | −0.084 | 0.016 | −6.759E−04 | −1.940E−06 | |
| 10 | −0.175 | 0.095 | −0.040 | 8.597E−03 | −7.751E−04 | −8.160E−07 | |

The examples provided with reference to FIGS. 2A and 2B illustrate a case where $CA(S_1)=CH(S_1)$. In similar cases, $CA(S_1)$ may be substantially equal to $CH(S_1)$, for example with up to 5% difference.

In addition, an "aperture stop" 206 (which defines the lens aperture) is located before the first surface $S_1$. The aperture stop can be e.g. a mechanical piece. A lens module with an aperture stop located at or before the first surface $S_1$ is known in the art as a "front aperture lens". Lens module 200 is a front aperture lens.

Note that in other examples, the stop may be located at a different location or surface. In this case, this condition may not be true for the first surface $S_1$. For example (this example being not limiting), the aperture stop can be located at the second surface $S_2$. In this case, $CA(S_2)=CH(S_2)$. In similar cases $CA(S_2)$, may be substantially equal to $CH(S_2)$, for example with up to 5% difference.

According to some examples of the presently disclosed subject matter, there is provided an optical lens module comprising a plurality of lens elements where $CH(S_1)$ of surface $S_1$ of lens element $L_1$ (closest to the object side) is greater than $CH(S_k)$ of each of all other surfaces $S_k$ of the plurality of lens elements, with $2 \leq k \leq 2N$.

For example, if N=4 (as in FIGS. 2A, 2B and 6), $CH(S_1)$ is greater than $CH(S_2)$, $CH(S_3)$, $CH(S_4)$, $CH(S_5)$, $CH(S_6)$, $CH(S_7)$ and $CH(S_8)$. This applies to different values of N.

For example, if N=4 (as in FIGS. 2A, 2B and 6), $CH(S_2)$ is greater than $CH(S_3)$, $CH(S_4)$, $CH(S_5)$, $CH(S_6)$, $CH(S_7)$ and $CH(S_8)$. This applies to different values of N.

For example, if N=5 (as in FIG. 20), $CH(S_1)$ is greater than $CH(S_2)$, $CH(S_3)$, $CH(S_4)$, $CH(S_5)$, $CH(S_6)$, $CH(S_7)$, $CH(S_8)$, $CH(S_9)$ and $CH(S_{10})$. This applies to different values of N.

For example, if N=5 (as in FIG. 20), $CH(S_2)$ is greater than $CH(S_3)$, $CH(S_4)$, $CH(S_5)$, $CH(S_6)$, $CH(S_7)$, $CH(S_8)$, $CH(S_9)$ and $CH(S_{10})$. This applies to different values of N.

According to some examples, $CH(S_1) \geq X \times CH(S_2)$, wherein X is any value in the range [1.01; 2] (such as X=1.1 or any other value in this range).

According to some examples, the following conditions are fulfilled:
  $CH(S_1) \geq 1.1 \times CH(S_2)$, and
  $CH(S_1) \geq 1.2 \times CH(S_k)$, for each of all other surfaces $S_k$, with $3 \leq k \leq 2N$.

According to some examples, the following conditions are fulfilled:
  $CH(S_1) \geq 1.45 \times CH(S_k)$, for each of all other surfaces $S_k$, with $3 \leq k \leq 2N$.

According to some examples, the following condition is fulfilled:
  $CH(S_2) \geq 1.1 \times CH(S_k)$, for each of surfaces $S_k$, with $3 \leq k \leq 2N$.

According to some examples, the following conditions are fulfilled:
  $CH(S_1) \geq X \times CH(S_2)$, and
  $CH(S_1) \geq Y \times CH(S_k)$, for each of all other surfaces $S_k$, with $3 \leq k \leq 2N$, where Y>X. In some examples, X can be any value in the range [1.01; 2], and Y can be any value in the range [1.01; 2].

According to some examples, the following conditions are fulfilled:
  $CH(S_2) \geq Y \times CH(S_k)$, for each of all other surfaces $S_k$, with $3 \leq k \leq 2N$, where Y>X. In some examples, Y can be any value in the range [1.01; 2].

According to some examples, $CA(S_1)$ of surface $S_1$ of lens element $L_1$ is greater than $CA(S_k)$ of each of all other surfaces $S_k$ of the plurality of lens elements, with $2 \leq k \leq 2N$. According to some examples, $CA(S_2)$ of surface $S_2$ of lens element $L_1$ is greater than $CA(S_k)$ with $3 \leq k \leq 2N$.

For example, if N=4 (as in FIGS. 2A and 2B), $CA(S_1)$ is greater than $CA(S_2)$, $CA(S_3)$, $CA(S_4)$, $CA(S_5)$, $CA(S_6)$, $CA(S_7)$ and $CA(S_8)$. This applies to different values of N.

According to some examples, $CA(S_1) \geq X \times CA(S_2)$, wherein X is any value in the range [1.01; 2] (such as X=1.1 or any other value in this range).

According to some examples, the following conditions are fulfilled:
  $CA(S_1) \geq 1.1 \times CA(S_2)$, and
  $CA(S_1) \geq 1.2 \times CA(S_k)$, for each of all other surfaces $S_k$, with $3 \leq k \leq 2N$.

According to some examples, the following conditions are fulfilled:
  $CA(S_1) \geq 1.45 \times CA(S_k)$, for each of all other surfaces $S_k$, with $3 \leq k \leq 2N$.

According to some examples, the following condition is fulfilled:
  $CA(S_2) \geq 1.1 \times CA(S_k)$, for each of surfaces $S_k$, with $3 \leq k \leq 2N$.

According to some examples, the following conditions are fulfilled:
  $Y \times CA(S_1) \geq X \times CA(S_2)$, and
  $CA(S_1) \geq Y \times CA(S_k)$, for each of all other surfaces $S_k$, with $3 \leq k \leq 2N$, where Y>X. In some examples, X can be any value in the range [1.01; 2], and Y can be any value in the range [1.01; 2].

According to some examples, $CA(S_1)$ is substantially equal to $CA(S_{2N})$ and is greater than $CA(S_k)$ of each of all other surfaces $S_k$ of the plurality of lens elements, with $2 \leq k \leq 2N-1$. For example, if N=5 (as in FIGS. 21A and 21B), $CA(S_1)=CA(S_{10})$ is greater than $CA(S_2)$, $CA(S_3)$, $CA(S_4)$, $CA(S_5)$, $CA(S_6)$, $CA(S_7)$, $CA(S_8)$ and $CA(S_9)$. This applies to different values of N. In similar cases $CA(S_1)$ may be substantially equal to $CA(S_{10})$, for example with up to 5% difference.

According to some examples, the following conditions are fulfilled:

$CA(S_1) \geq 1.05 \times CA(S_2)$, and $CA(S_1) \geq 1.1 \times CA(S_k)$, for each of all other surfaces $S_k$, with $3 \leq k \leq 2N-1$.

According to some examples, the following condition is fulfilled:

$$BFL \geq X \times TTL,$$

In this equation, X is any value in the range [0.2; 0.5]. According to some examples, X=0.3 or X=0.4 where TTL and BFL are defined above.

In FIGS. 2A and 2B, the BFL is measured between the center of the surface $S_8$ and the image sensor 202.

In FIGS. 2A and 2B, the TTL is measured between the center of the surface $S_k$ and the image sensor 202.

This configuration of the relative values of BFL and TTL as disclosed above can improve the quality of the image formed on the image sensor.

Using a lens element $L_1$ with a front surface that has a greater CH value or CA value with respect to the other surfaces can help to increase the amount of incoming light which can be sensed by the image sensor of the camera or of the Tele sub-camera.

Advantageously, f/# (f-number) can be less than 3.

Advantageously, $S_1$ and\or $S_2$ can be spherical.

Advantageously, the ratio between the last lens element clear aperture $CA(S_{2N})$ and the sensor diagonal (SD) may be less than 0.8 or 0.7 or 0.65.

Advantageously, TTL may be smaller than EFL.

According to some examples of the presently disclosed subject matter (tables 1-4), all lens elements $L_1$ to $L_N$ may be made of plastic material. According to some examples of the presently disclosed subject matter (Tables 5-6), lens element $L_1$ may be made of glass material and all lens elements $L_2$ to $L_N$ may be made of plastic material. This is however non-limiting and lens elements $L_1$ to $L_N$ may all be made by either plastic or glass material. The selection of lens element material (plastic or glass) is influenced by various optical and mechanical demands. For example, and as known in the art, different materials (glass and/or plastic) have different refractive indexes, glass having typically a higher refractive index selection range than plastic. For example, different materials have different Abbe numbers, glass having typically a higher Abbe number selection range than plastic. An example for 3 materials, refractive indexes and Abbe numbers is given above, out of hundreds of materials with corresponding Abbe numbers and refractive indexes available. For example, the surface profiles of plastic lens elements may be approximated by a polynomial with many coefficients (4-7 in the examples in Tables 1-6), while surface profiles of glass lens elements can be approximated in a similar way when molded or may be limited to spherical shape when polished (0 coefficient in the examples in Tables 5-6). This limitation is driven from manufacturing limits known in the art. For example, the minimal thickness of a glass lens element may be smaller than that of a plastic element, as known in the art. For example, glass lens elements may be cut (or diced or sliced) to a non-circular shape, as demonstrated in FIGS. 13A-13C.

In addition to the fact that at least the first lens element can be of increased dimensions in order to increase light impinging on the sensor, according to some examples, the barrel that holds the lens elements has to be mechanically resilient to external stress while striving to maintain the module height (along an axis perpendicular to the optical axis of barrel, which corresponds to axis Y in the figures) as low as possible. This is advantageous for example when it is desired to fit a camera within the limited available space (e.g. thickness) of a computerized device such as a Smartphone.

Examples of an optical lens module which is designed to deal with these contradictory requirements are described with reference to FIGS. 6-11, 13, 17-19 and 22-25. The optical lens module is not limited to the examples described with reference to FIGS. 6-11, 13, 17-19 and 22-25.

In the example illustrated in FIG. 6, barrel 64 of optical lens module 60 comprises a cavity 61 surrounded by walls 62. In this example, a first subset of the lens elements is held in cavity 61, and a second subset of the lens elements is located externally to barrel.

In particular, according to the example shown in FIG. 6, lens elements $L_2$ to $L_N$ are held within cavity 61 and lens element $L_1$ is located outside of barrel 64 (that is to say that lens element $L_1$ is not within cavity 61). Lens element $L_1$ can be affixed to barrel 64, by any appropriate mechanical link, such as an adhesive material.

In other examples, lens elements $L_1$ to $L_i$ (with $1<i<N$) are located outside of barrel 64 (out of cavity 61), and lens elements $L_i$ to $L_N$ are held within cavity 61.

In the example of FIG. 6, since lens element $L_1$ is located outside of cavity 61, the height $H_{L1}$ of lens element $L_1$ can be substantially equal to or larger than the height H of barrel 64 (measured along the axis Y between external surfaces of opposite walls of barrel 64). Heights $H_{L2}$ to $H_{LN}$ of lens element $L_2$ to $L_N$ can be smaller than the height H of barrel 64. A numerical (non-limiting) example for lens 60 may be have the following values: $H_{L1}$=4.82 mm, $H_{L2}$=$H_{L3}$=$H_{L4}$=3.7 mm.

Attention is now drawn to FIG. 7, which depicts another example of an optical lens module 70.

In this example, optical lens module 70 comprises a barrel 74. Barrel 74 comprises a cavity 71 circumvented by walls 72. According to the example illustrated in FIG. 7, lens elements $L_1$ to $L_N$ can be all located within cavity 71.

According to some examples, a height $H_C$ of cavity 71, measured along an axis orthogonal to optical axis 103 (between internal parts 73), is variable along optical axis 103.

In the representation of FIG. 7, height $H_C$ of cavity 71 is measured along axis Y. For each position along the Z axis, height $H_C$ corresponds in this example to the distance between the internal parts 73 of walls 72 along axis Y. For cases in which the cavity barrel is axial symmetric, $H_C$ is the internal diameter of the cavity barrel. In the example of FIG. 7, cavity height $H_C$ is variable along axis Z. In other words, $H_C(Z)$ is not a constant function.

According to some examples, cavity 71 comprises a first portion 76 in which first lens element $L_1$ is located and a second portion 77 in which at least some of the other lens elements ($L_2$ to $L_N$) are located.

According to this example, height $H_C(Z_1)$ of first portion 76 of cavity 71 is greater than height $H_C(Z_2)$ of second portion 77 of cavity 71. As a consequence, first lens element $L_1$ (which is generally of greater dimensions, as mentioned above) is positioned within first portion 76 of cavity 71, and at least some of the other lens elements are positioned within second portion 77 of cavity 71.

According to this example, height $H_C(Z_1)$ of first portion 76 of cavity 77 is designed to fit with the height $H_{L1}$ of first lens element $L_1$, and height $H_C(Z2)$ of the second portion 77 of cavity 71 is designed to fit with height $H_{L2}$, $H_{L3}$ and $H_{L4}$ of the other lens element $L_2$ to $L_4$ (in this example, $H_{L2}$=$H_{L3}$=$H_{L4}$).

The variable height of cavity 71 along optical axis 103 can be obtained e.g. by using walls 72 with a variable thickness. As shown in FIG. 7, walls 72 have a thinner thickness in first portion 76 than in second portion 77. In other examples, walls 72 have a constant thickness but they have a stepped shape.

Various examples (see FIGS. 8 to 13 and 17-19) of an optical lens module comprising a plurality of lens elements $L_1$ to $L_N$ will now be described. These optical lens modules can be used in any of the examples of cameras or of optical designs described above. In these examples (see FIGS. 8 to 13 and 17-19), the relationship between the dimensions of the lens elements can be in accordance with any of the examples described above (see e.g. FIG. 2A to FIG. 5 and Tables 1-6) and are thus not described again.

According to some examples, the height of lens element $L_1$ is greater than the height each of lens elements $L_2$ to $L_N$ (in the examples of FIGS. 8 to 13 and 17-19). Other relationships can be defined, as already explained above (these definitions can rely e.g. on a relationship between the clear apertures and/or the clear heights of the lens elements).

Figure 8:
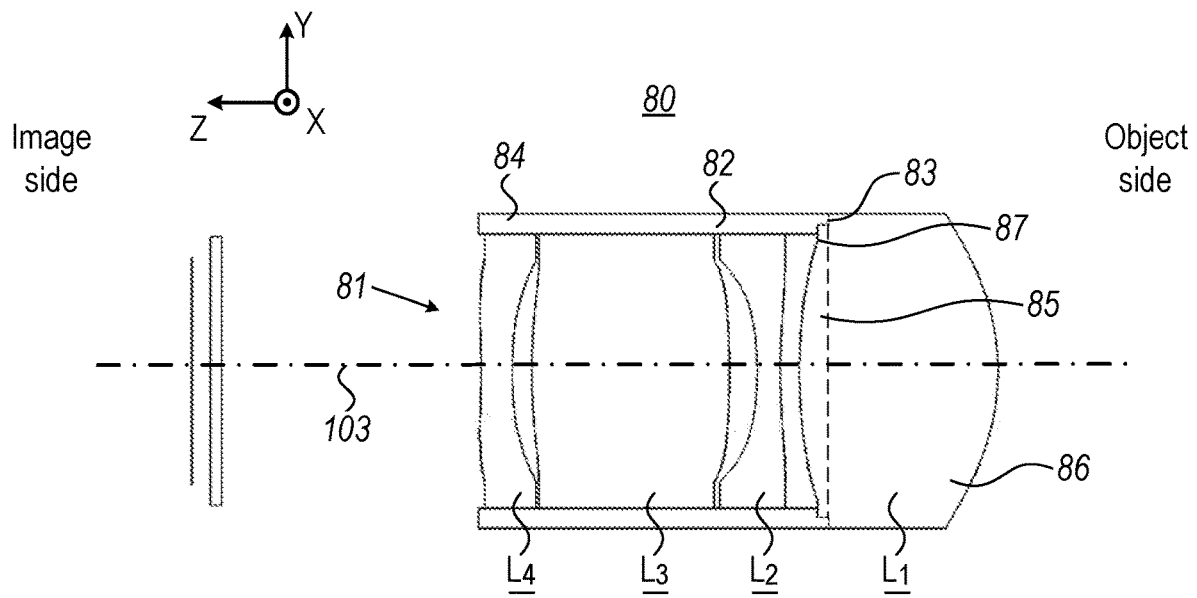
FIG. 8 is a schematic representation of an example of an optical lens module comprising a plurality of lens elements, according to the presently disclosed subject matter.

Attention is now drawn to FIG. 8, which depicts an example of an optical lens module 80 comprising a plurality of lens elements $L_1$ to $L_N$. In this example, four lens elements $L_1$ to $L_4$ are depicted. In this example, optical lens module 80 comprises a barrel 84. Barrel comprises a cavity 81 circumvented by walls 82. At least some of lens elements $L_2$ to $L_N$ are located within cavity 81.

The lens elements which are within cavity 81 have a center which is substantially aligned with optical axis 103. The center of a lens element can be defined as the physical center of the whole lens element (including the optical part and the mechanical part of the lens element, see e.g. in FIG. 11F wherein the physical center can be located at the center of the total height $H_L$ of the lens element), or as the center of only the optical portion of the lens element (see e.g. in FIG. 11F wherein the optical center can be located at the center of the optical height $H_{opt}$ of the lens element). Generally, the physical center of the lens element coincides with the center of the optical part (optical center) of the lens element. For an axial symmetric lens element, $H_{opt}$ is defined as the maximum of clear apertures of front and back surfaces of the respective lens element.

In this example, extremity 83 of walls 82 is shaped so that extremity 83 of walls 82 acts a stop for at least a portion of lens element $L_1$.

In particular, lens element $L_1$ is prevented from moving in the Y-Z plane by extremity 83 of the walls acting as a mechanical stop. By choosing an appropriate shape and appropriate dimensions for extremity 83 of the walls 82, and likewise shaping a part of lens element $L_1$ to fit the shape of extremity 83, the center of lens element $L_1$ can be substantially aligned with optical axis 103.

In the example of FIG. 8, the cross-section of extremity 83 of walls 82 has a stepped shape.

An extremal portion 85 (this portion is part of the thickness of the lens element) of lens element $L_1$ is located within cavity 81. In some examples, extremal portion 85 corresponds to the rear surface of lens element $L_1$.

A main portion 86 (this portion is part of the thickness of the lens element) of lens element $L_1$ is located outside of cavity 81. In some examples, a thickness of extremal portion 85 measured along optical axis 103 is less than a thickness of main portion 86 measured along optical axis 103. Extremal portion 85 of lens element $L_1$ is blocked between walls 82. In particular, the stepped shape of extremity 83 of walls 82 is made to match or to fit a part 87 of extremal portion 85 of lens element $L_1$, wherein part 87 has also a stepped shape in cross-section. As apparent in FIG. 8, the stepped shape of extremity 83 fits together with the stepped shape of part 87 of lens element $L_1$. Therefore, lens element $L_1$ is prevented from moving in the Y-Z plane, and the center of lens element $L_1$ can be maintained in alignment with optical axis 103.

Figure 9A:
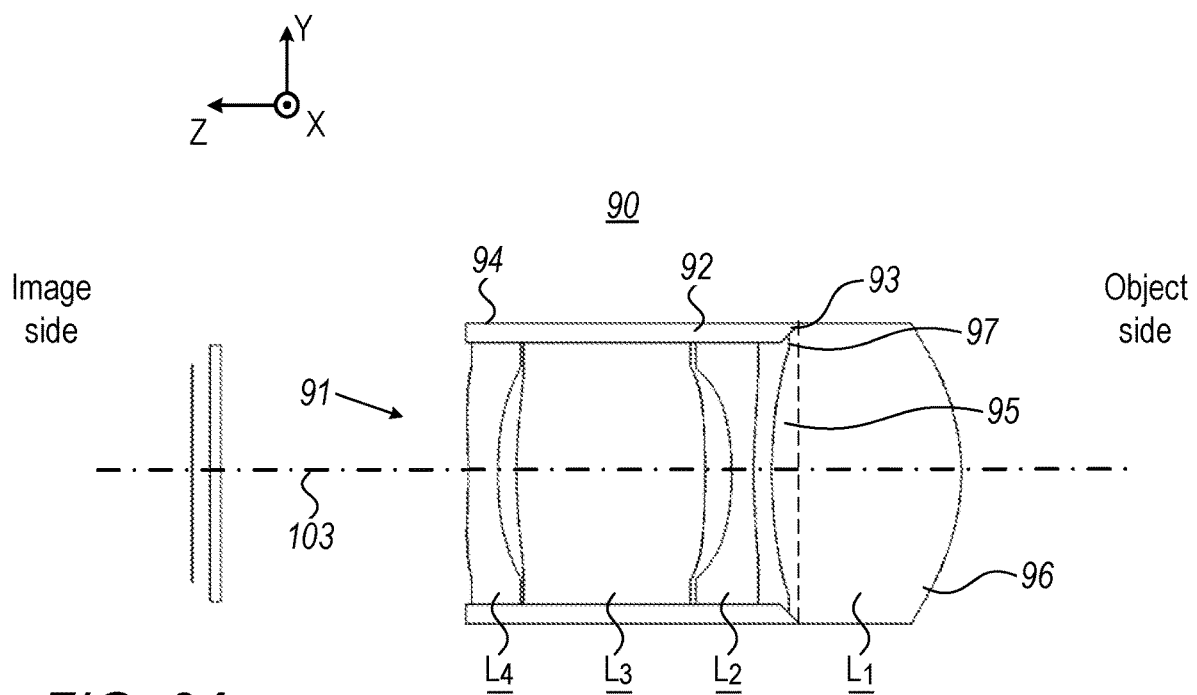
FIG. 9A is a schematic representation of another example of an optical lens module comprising a plurality of lens elements, according to the presently disclosed subject matter.

FIG. 9A describes another example of an optical lens module. In this example, the cross-section of extremity 93 of walls 92 has a sloped shape. In particular, extremity 93 can be shaped as a chamfer. An extremal portion 95 (this portion is considered in the width of the lens element) of lens element $L_1$ is located within a cavity 91 of barrel 94 of optical lens module 90. In some examples, extremal portion 95 corresponds to the rear surface of lens element $L_1$. A main portion 96 (this portion is part of the thickness of the lens element) of lens element $L_1$ is located outside of cavity 91. Extremal portion 95 of lens element $L_1$ is prevented from moving in the Y-Z plane by extremity 93 of walls 92.

In particular, the sloping shape of extremity 93 of walls 92 is made to match or to fit a part 97 of extremal portion 95 of lens element $L_1$, wherein part 97 has also a sloping shape in cross-section. As apparent from FIG. 9A, the sloping shape of extremity 93 fits together with the sloping shape of part 97. Therefore, lens element $L_1$ is prevented from moving in the Y-Z plane, and the center of lens element $L_1$ can be maintained in alignment with optical axis 103.

Figure 9B:
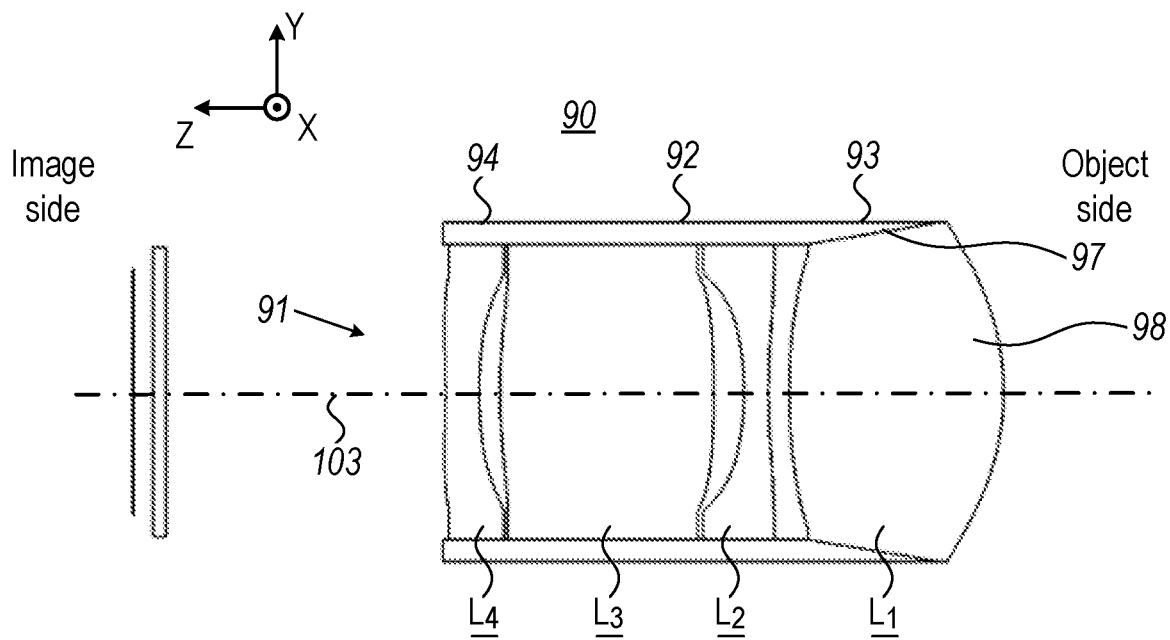
FIG. 9B depicts a variant of the example of FIG. 9A.

FIG. 9B depicts a variant of FIG. 9A. In this example, a portion 98 of lens element $L_1$ is located within cavity. This portion 98 can correspond to a main portion of lens element $L_1$ or to the whole lens element $L_1$. Extremity 93 of walls 92 has a sloping shape in cross-section, as in the example of FIG. 9A, but in this example the slope extends further along the side of lens element $L_1$. A part 97 of portion 98 is in contact with extremity 93 of walls 92, and has also a sloping shape in cross-section, which fits together with the sloping shape of extremity 93. Therefore, portion 98 of lens element $L_1$ is prevented from moving in the Y-Z plane.

Figure 10:
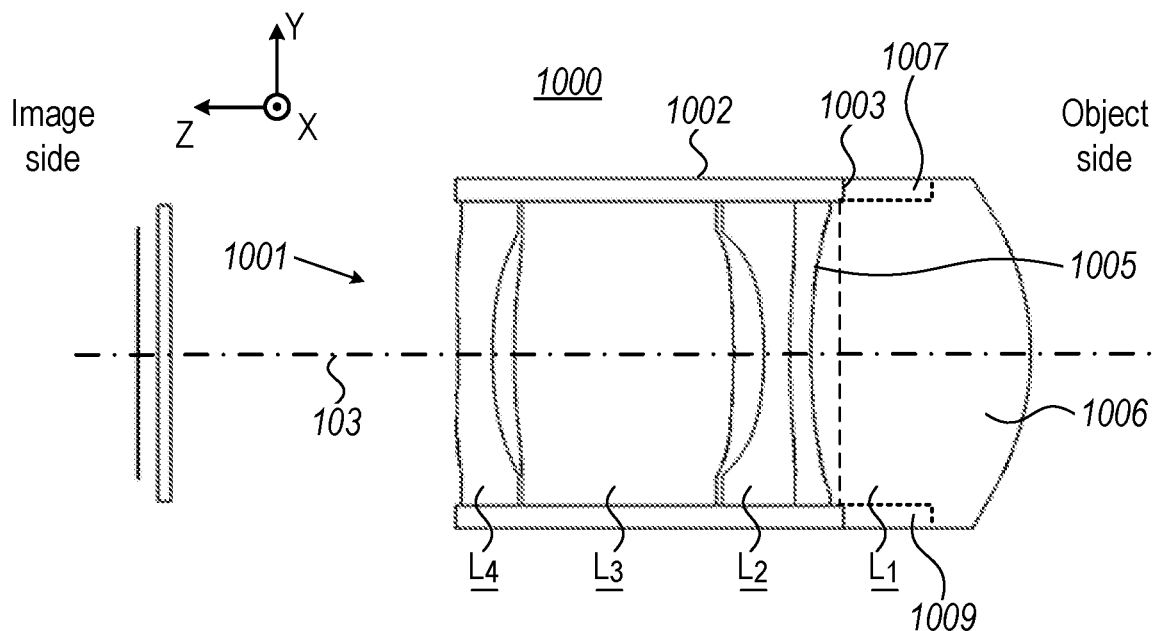
FIG. 10 is a schematic representation of another example of an optical lens module comprising a plurality of lens elements, according to the presently disclosed subject matter.

FIG. 10 describes another example. In this example, an extremal portion 1005 (this portion is part of the width of the lens element) of lens element $L_1$ is located within a cavity 1001, whereas a main portion 1006 (this portion is part of the width of the lens element) of lens element $L_1$ is located outside of cavity 1001. In some examples, extremal portion 1005 corresponds to the rear surface of lens element $L_1$.

In some examples, a thickness of the extremal portion 1005 measured along optical axis 103 is less than a thickness of main portion 1006 measured along optical axis 103.

Extremal portion 1005 of lens element $L_1$ is blocked between walls 1002. In particular, a part 1007 of extremal portion 1005 which is in contact with an extremity 1003 of walls 1002 has a stepped shape. Extremity 1003 of walls 1002 acts as a stop for extremal portion 1005, since part 1007 is blocked by extremity 1003 and is prevented from moving in the Y-Z plane. Therefore, lens element $L_1$ is prevented from moving in the Y-Z plane, and the center of lens element $L_1$ can be maintained in alignment with optical axis 103.

In this example, the shape of walls 1002 can be uniform. In particular, the shape of extremity 1003 of walls 1002 can be identical with the shape of the other portions of walls 1002, contrary to the examples described in FIGS. 8, 9 and 9A, and only a part of the lens element is needed to be shaped in order to fit extremity 1003.

According to some variants of the example of FIG. 10, a main portion of lens element $L_1$ is located within the cavity (and not only an extremal portion as in FIG. 10) and the extremity (see reference 1009 in FIG. 10) of the walls matches a part of lens element $L_1$ which has a stepped shape. Lens element $L_1$ is thus prevented from moving in the Y-Z plane.

Attention is now drawn to FIGS. 11A to 11E.

According to some examples, an optical lens module 1100 can comprise lens elements Li to $L_N$ and a barrel 1114. Barrel 1114 comprises a cavity 1101 surrounded by walls 1102. N lens elements $L_1$ to $L_N$ are located within cavity 1101. In this example, N is equal to four. The optical lens module can further comprise stops 1115, which can be present between each of two adjacent lens elements. Stops 1115 can have an annular shape. These stops 1115 are useful for maintaining the lens elements at their required position and for maintaining the required distance between the lens elements.

A height of barrel 1114, which can be measured, for example, between external surfaces 1103 of opposite walls 1104 of barrel 1114 (e.g. along an axis Y orthogonal to a symmetry axis of barrel 1114) is equal to H. In the examples of FIGS. 11A to 11E, the height $H_{L1}$ of lens element $L_1$ can be substantially equal to H or greater than H. Thus, lens element $L_1$ can have a large height (thus benefiting from an increased optical collection surface) while being located within the optical lens module which provides protection and mechanical support of lens element $L_1$. With this configuration, the center of lens element $L_1$ can be maintained in alignment with optical axis 103.

In addition, a lens element generally has an optical part and a mechanical part. The mechanical part is the part of the lens element which is not used for transmitting rays. This is visible for example in FIG. 11A, in which lens element $L_2$ comprises an optical part 1130 and a mechanical part 1131. This is also illustrated in FIG. 11F.

According to some examples, the ratio between a height of the optical part (see $H_{opt}$ in FIG. 11F) and the height of the lens element (see $H_L$ in FIG. 11F) is greater for lens element $L_1$ than for each of lens elements $L_2$ to $L_N$.

As shown in the figures, barrel 1114 can comprise slots 1110 on two of the opposite walls 1111 of barrel 1114. This allows the lens element $L_1$ to be substantially of the same height as the barrel, or to have a height which is greater than the barrel, and to have a height which is greater than that of the other lens elements. In particular, lens element $L_1$ can be tangent to slots 1110, or at least part of the lens element $L_1$ can protrude through slots 1110.

Figure 11A:
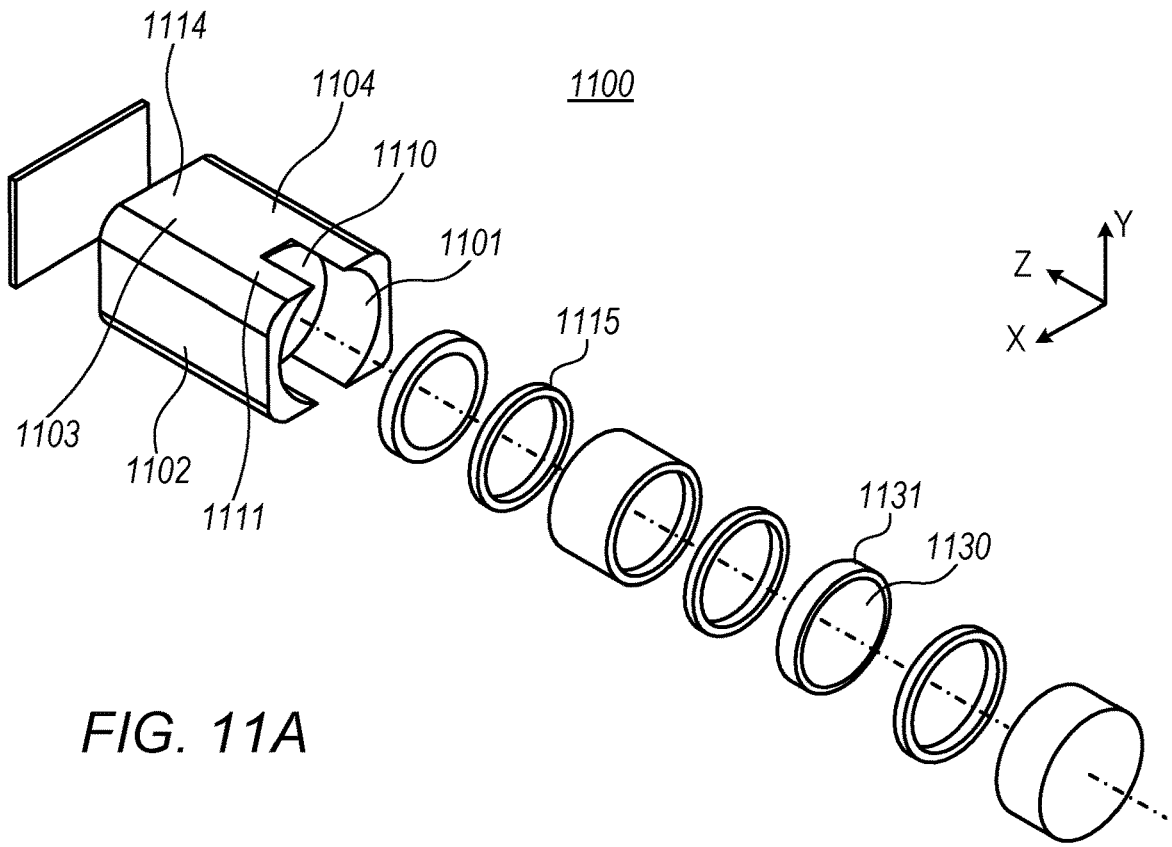
FIG. 11A is a schematic representation of an isometric view of a barrel and of a plurality of lens elements before their insertion into the barrel, according to the presently disclosed subject matter.
Figure 11B:
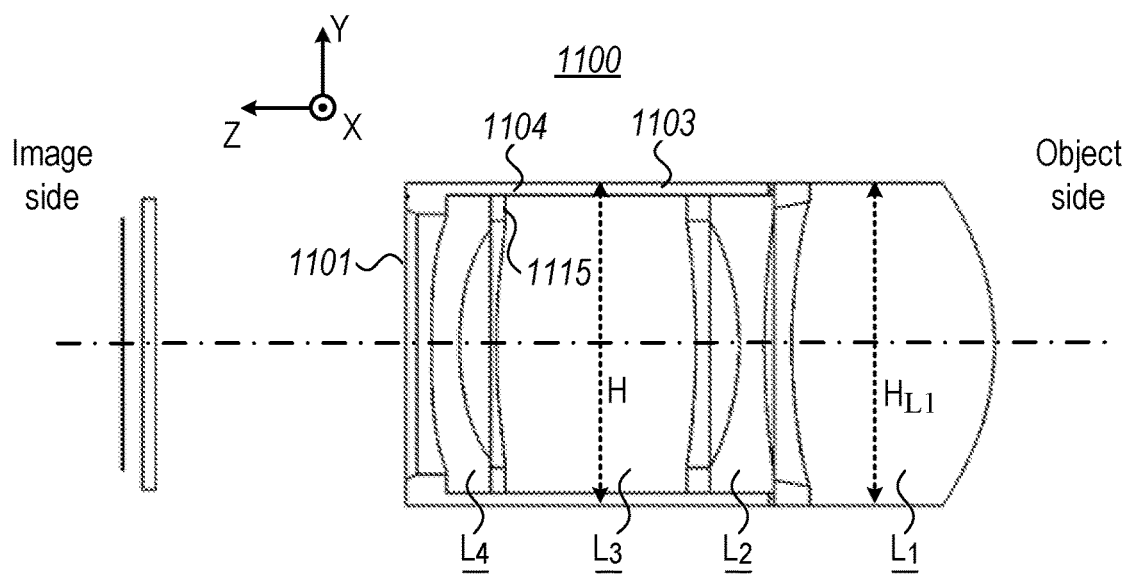
FIG. 11B depicts a cross-section view of the example of FIG. 11A, along plane Y-Z.
Figure 11C:
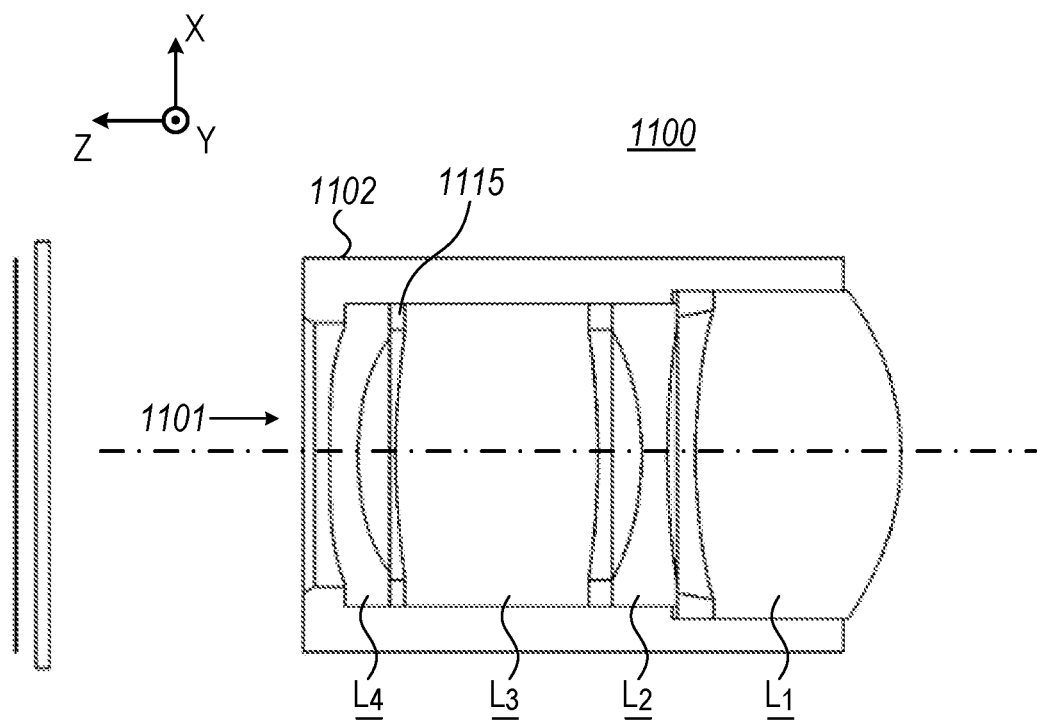
FIG. 11C depicts a cross-section view of the example of FIG. 11A, along plane X-Z.
Figure 11D:
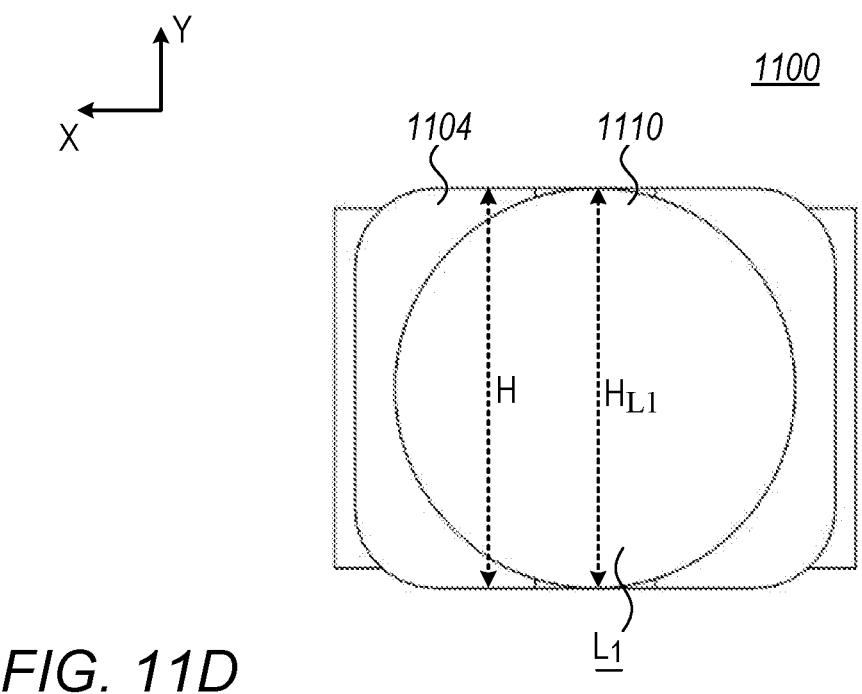
FIG. 11D depicts a front view of the example of FIG. 11A.
Figure 11E:
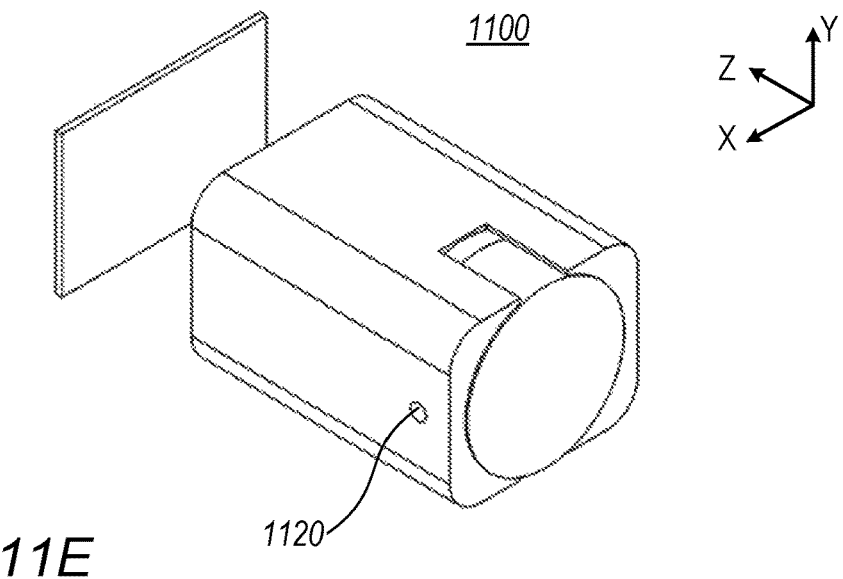
FIG. 11E depicts another isometric view of the example of FIG. 11A after the insertion of the lens elements in the barrel.
Figure 12:
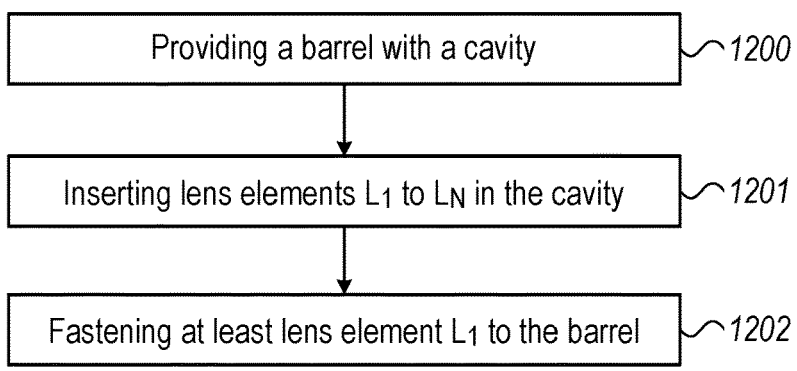
FIG. 12 is a schematic representation of a manufacturing process of the optical lens module of FIG. 11A to FIG. 11E.

Attention is now drawn to FIG. 12 which describes an example of a manufacturing method of the optical lens module of FIGS. 11A to 11E. The method can comprise a step 1200 of providing a barrel comprising walls defining a cavity. The barrel can already comprise slots on at least two opposite walls. Alternatively, the method can comprise creating slots in at least two opposite walls of the barrel.

The method can comprise a step 1201 of inserting lens elements $L_1$ to $L_N$ in the cavity of the barrel. Generally, lens element $L_N$, which is the closest to the image side, is the first lens element to be inserted. Lens element $L_N$ can be fastened to the barrel using a fastening material such as an adhesive, so that it acts as a stop at one side of cavity for the other lens elements.

Figure 11F:
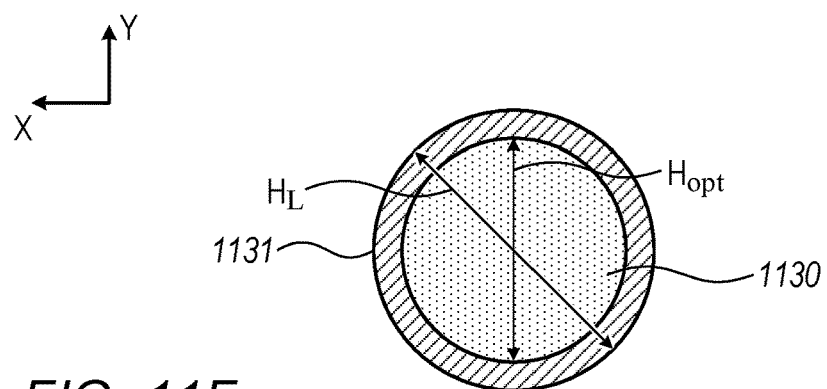
FIG. 11F is a schematic representation of a front view of a lens element.

According to some examples, stops are inserted within cavity, between the lens elements, as already discussed with respect to FIG. 11A. The lens elements are thus stacked within cavity. In order to prevent the lens elements from moving from their position, the method can comprise a step 1202 of fastening at least lens element $L_1$ in order to maintain lens elements $L_1$ to $L_N$ within cavity. This can be performed by injecting a fastening material (e.g. adhesive) within the cavity, e.g. through adapted through-holes 1120 present in the walls of the barrel. The adhesive thus fastens lens element $L_1$ to the internal surfaces of the walls. After these steps, and if necessary, the through holes can then be plugged.

The structure of the lens module as depicted in FIGS. 1A to 11E is thus also advantageous in terms of the manufacturing process, since lens element $L_1$ can be of the height of barrel (or can have a height which is greater than the height of the barrel) and can still be fastened to the internal surfaces of the walls of the barrel (and not as in FIG. 6, where lens element $L_1$ is outside of the barrel and affixed only to an extremity of the walls of the barrel).

Figure 13A:
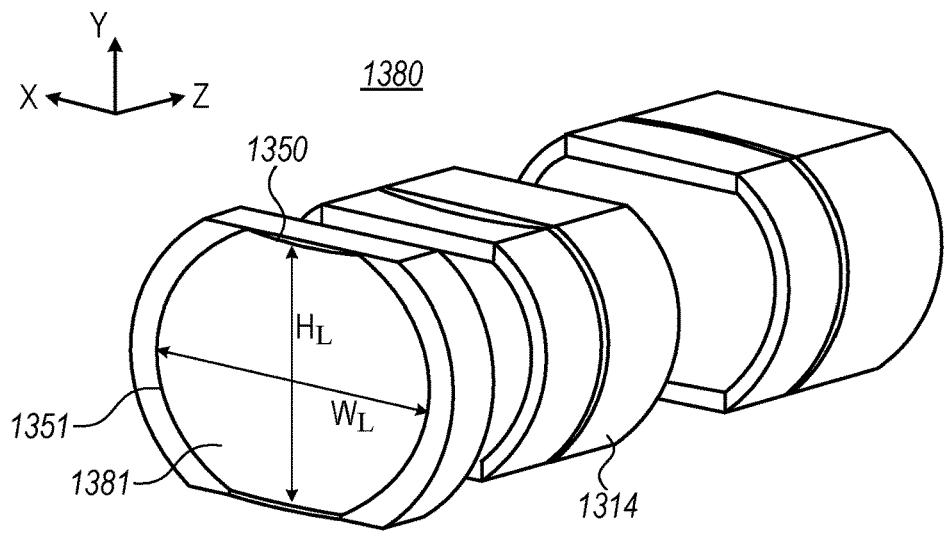
FIG. 13A is a schematic representation of an isometric view of a plurality of lens elements.

Attention is now drawn to FIG. 13A, which depicts an example of an optical lens module 1380 comprising a plurality of lens elements 1381. Optical lens module 1380 comprises a barrel 1314. At least some of the lens elements can be located within barrel 1314.

According to some examples, at least part of the lens elements can have a shape (profile) in cross-section (in plane X-Y, which is orthogonal to the optical lens module and which generally coincides with the optical axis) which is not circular. In particular, as shown e.g. in FIG. 13A, at least some of the lens elements can have a width $W_L$ (measured along axis X) which is greater than their height $H_L$ (measured along axis Y). The height $H_L$ can correspond to the total height of the lens element (including the mechanical part). In some embodiments, a lens element in lens module 1380 may have a symmetry about axis Y and/or about axis X.

According to some examples, $W_L$ is substantially greater than $H_L$ (for example, by at least a percentage which is equal or greater than 10%, these values being not limiting).

According to some examples, at least part of the lens elements is shaped so as their profile in cross-section comprises sides with straight portions. Other sides of the profile can be e.g. curved. This can be seen e.g. in FIG. 13A, wherein sides 1350 (in this example two sides) of the profile of these lens elements in cross-section are substantially straight lines along axis X. As a consequence, at least some of the sides of these lens elements are flat surfaces (in plane X-Z). In FIG. 13A, the two other sides 1351 of the profile of these lens elements in cross-section are curved lines.

According to some examples, barrel 1314 is shaped to fit with the shape of the lens elements. Thus, barrel 1314 can have walls which have a profile in cross-section which is similar to the profile of the lens elements (located in barrel) in cross-section.

It is to be noted that other shapes and profiles can be used for the lens elements (and thus for barrel), such as (but not limited to) an elliptic profile.

The configuration described with reference to FIGS. 13A to 13C allows in particular to increase the quantity of light received by the image sensor, for a given height of barrel.

Figure 13B:
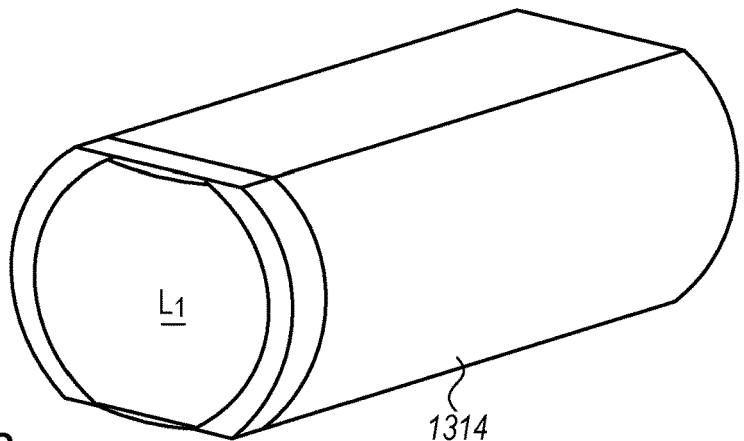
FIG. 13B is a schematic representation of an isometric view of an optical lens module comprising the plurality of lens elements of FIG. 13A and a barrel.

In the example depicted in FIG. 13B, lens element $L_1$, which is the closest lens element to the object side, is located outside of barrel 1314. Examples wherein lens element $L_1$ is positioned outside of barrel have been described e.g. with reference to FIG. 6, and examples wherein a main portion (measured along the thickness of the lens element) of lens element Li is located outside of barrel 1314 have been described above (see e.g. FIGS. 8 to 11E). At least part of the features described with reference to these examples can be used in the example of FIG. 13B and are not described again.

Figure 13C:
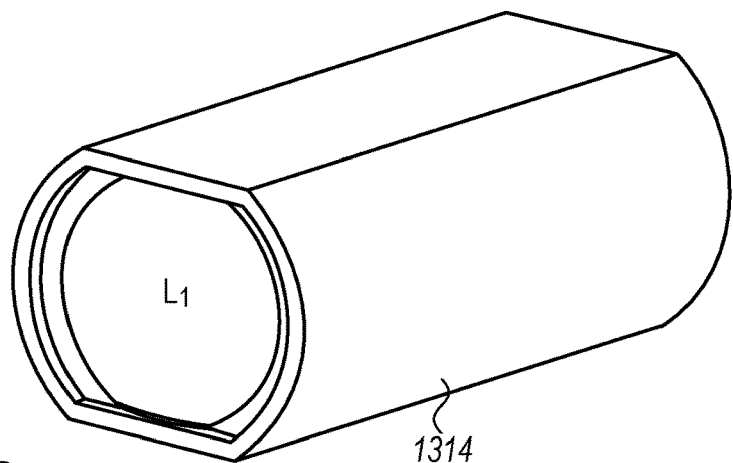
FIG. 13C is yet another schematic representation of an isometric view of an optical lens module comprising the plurality of lens elements of FIG. 13A and a barrel.

In the example depicted in FIG. 13C, lens element $L_1$, which is the closest lens element to the object side, is also located within barrel 1314. Examples wherein lens element $L_1$ is positioned within the barrel have been described e.g. with reference to FIG. 7, and examples wherein a main portion (measured along the thickness of the lens element) of lens element Li is located within the barrel have been described above (see e.g. the description of FIGS. 8, 9A and 10). At least part of the features described with reference to these examples can be used in the examples of FIG. 13A and FIG. 13C and are not described again.

Figure 17A:
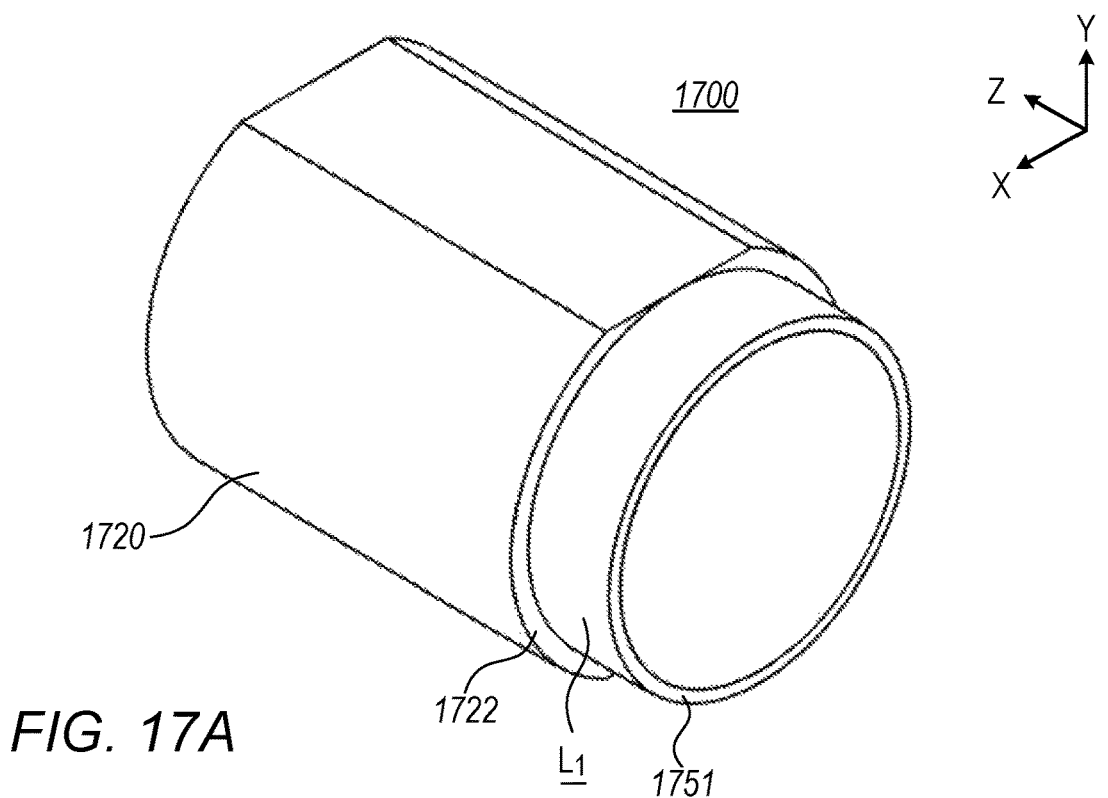
FIG. 17A shows an isometric view of another embodiment of a barrel with lens elements, according to the presently disclosed subject matter.
Figure 17B:
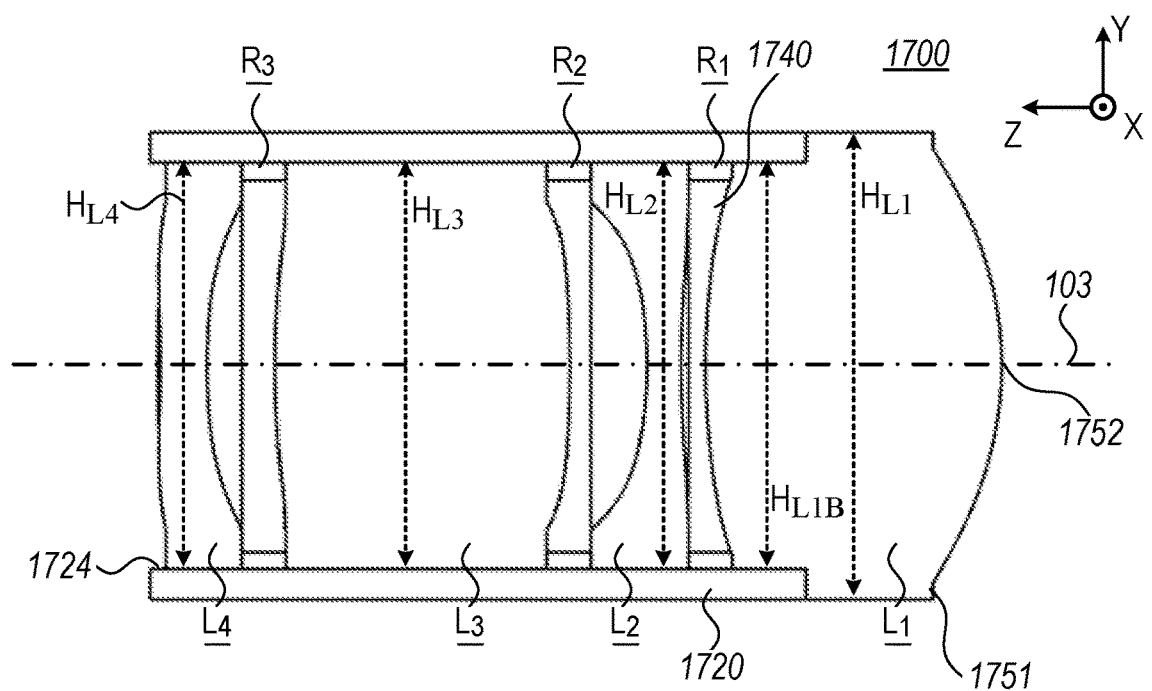
FIG. 17B shows a side cut of the barrel and lens elements of FIG. 17A.
Figure 17C:
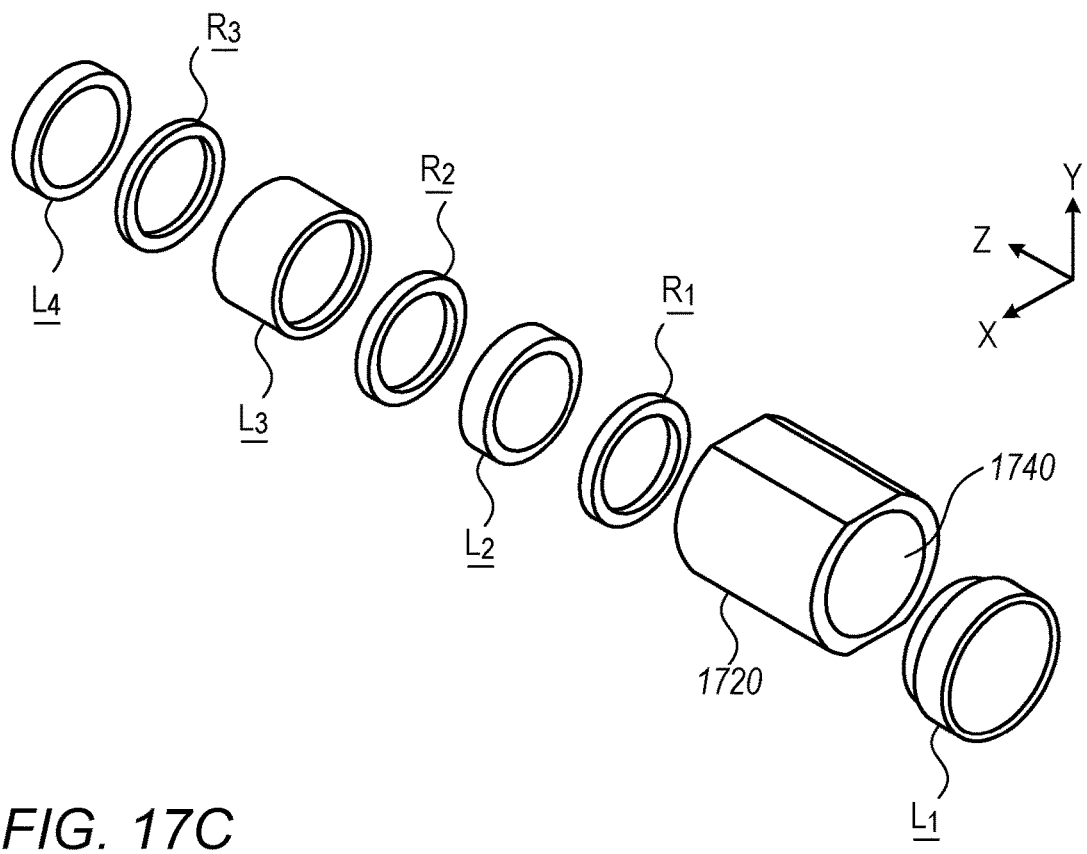
FIG. 17C shows an exploded view of the lens elements of FIG. 17B.

Attention is now drawn to FIGS. 17A to 17D. FIG. 17A shows an isometric view of a lens module 1700. FIG. 17B shows a side view of lens module 1700. FIG. 17C shows an exploded view of lens 1700. Lens module 1700 may have an optical design similar to lens 200. Lens module 1700 includes a barrel 1720. Lens module 1700 further includes lens elements Li to $L_N$. N is normally in the range of 3-7, similar to lens module 200. In the non-limiting example of lens module 1700, N=4. Lens module 1700 has the first lens element $L_1$ partially positioned or placed outside of barrel 1720, while lens elements $L_2$ to $L_N$ are placed completely inside the barrel. $L_1$ is clearly seen in FIG. 17A, while other lens elements are not seen in this view but can be seen in FIG. 17B. Lens module 1700 has an optical axis 103 which serves as an axial symmetry axis for all lens element $L_1$ to $L_N$. Each lens element $L_1$ has a height HU defined along the Y axis. Lens element $L_1$ may have a "stepped" shape, i.e. it has a front part with height $H_{L1}$ and a back part with height $H_{L1B}$, such that $H_{L1} > H_{L1B}$. Lens module 1700 may further include spacers $R_1$ to $R_{N-1}$. Each spacer $R_1$ is positioned between lens elements $L_1$ and $L_{i+1}$. In some embodiments, one or more of spacers $R_1$ to $R_{N-1}$ may be used as an aperture stop(s).

Barrel 1720 may be made for example from opaque plastic using plastic injection molding, as known in the art. Barrel 1720 has a cavity 1740 that may be axial-symmetric along optical axis 103. Cavity 1740 may have a shape of cylinder as in embodiment 1700 (FIG. 17B). In other embodiments, cavity 1740 may have other axial symmetric shapes, such as a cone, a series of cylinders, etc. (see FIG. 17D). The axial symmetry accuracy of cavity 1740 is important for the assembling accuracy, as known in the art. In some embodiments, the tolerance for axial symmetry distortion may be smaller than 10 μm, 5 μm or 1 μm.

Lens elements $L_i$ may be made by plastic injection molding, as known in the art. Lens elements $L_i$ may be made from glass, as known in the art. Each lens element $L_i$ has front surface ($S_{2i-1}$) and back surface ($S_{2i}$) as defined above for embodiment 200. Each surface $S_k$ ($3 \leq k \leq 2N$) may have an optically active part and a mechanical part which is a non-active optical part (as described in FIG. 11F). A mechanical part may be used to handle the lens element during the molding and assembly stages. In some examples the mechanical part size may be on the order of 100 μm-500 μm. For example, the mechanical part of $S_1$ is marked with numeral 1751. The closest point of $L_1$ to the object side is marked with numeral 1752.

Figure 17D:
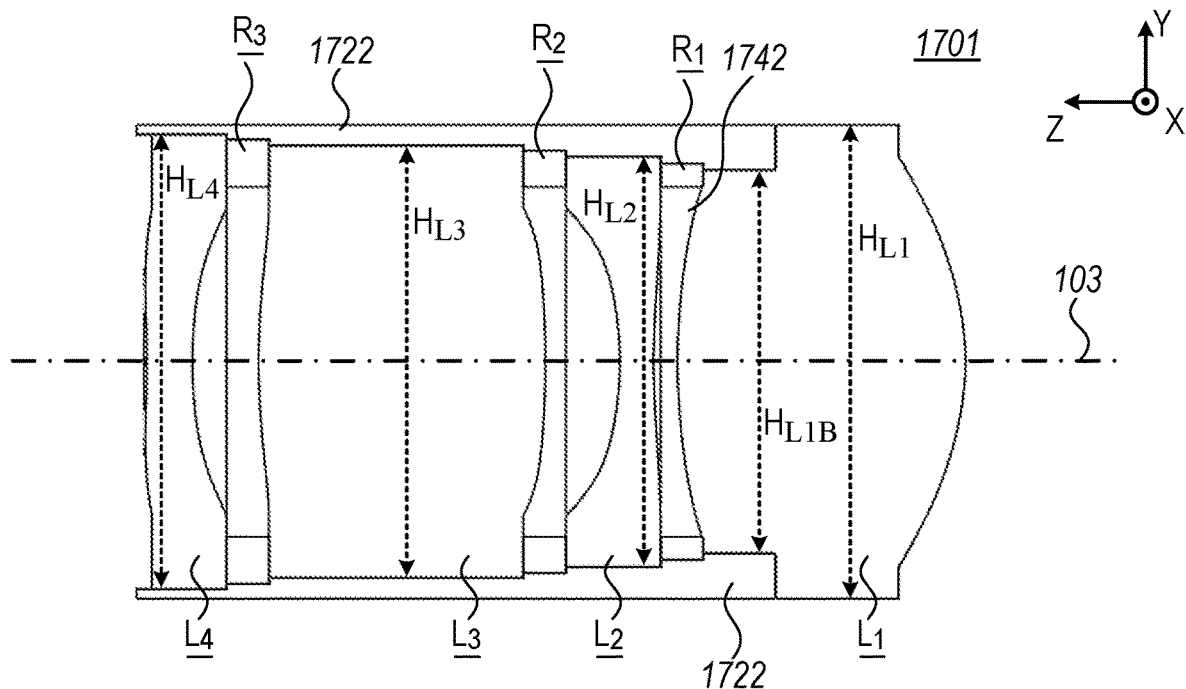
FIG. 17D shows a side cut of another barrel with lens elements, according to the presently disclosed subject matter.

FIG. 17D shows a lens module 1701 which is similar to lens module 1700 with a single difference: barrel 1722 with cavity 1742 replaces barrel 1720 with cavity 1740. Cavity 1742 has a shape of a series of cylinders in increasing sizes for each lens element; as can be seen in FIG. 17D, $H_{L1B} \leq H_{L2} \leq H_{L3} \leq H_{L4} < H_{L1}$. This feature may allow easier molding of barrel 1720 and/or easier assembly of lens elements $L_1$ to $L_4$ and spacers $R_1$ to $R_3$. In other embodiment the number of lens elements may differ from 4 as mentioned above. A numerical (non-limiting) example for lens module 1700 may be have the following values: $H_{L1}$=4.9 mm, $H_{L1B}$=3.65 mm, $H_{L2}$=3.7 mm, $H_{L3}$=3.8 mm, $H_{L4}$=3.9 mm.

The assembly of lens module 1700 (or 1701) may be done in the following steps:
1. Insertion of lens element $L_1$ from the object side of barrel 1720. $L_1$ may be aligned to barrel 1720 due to the axial symmetry of both elements.
2. Gluing of $L_1$ to barrel 1720. Gluing may be done using glue on surface 1722, which is the front-most surface of barrel 1722.
3. Insertion of other elements from the image side of barrel in the following order: $R_1, L_2 \ldots R_{N-1}, L_N$. $L_2$ to $L_N$ and $R_1$ to $R_{N-1}$ may be aligned to barrel 1720 due to the axial symmetry of all elements.
4. Gluing lens element $L_N$ to barrel 1720, for a non-limiting example on surface 1724 which is the inner surface of barrel 1722.

Figure 18A:
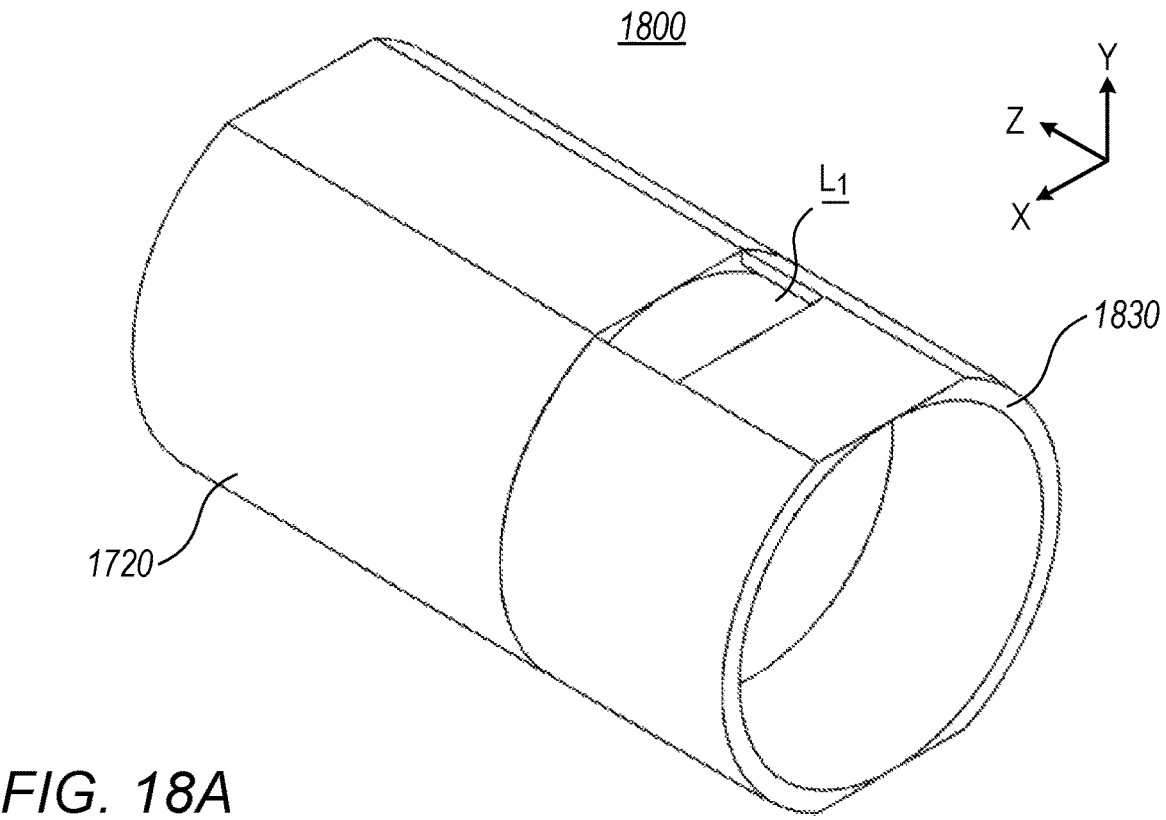
FIG. 18A shows an isometric view of yet another embodiment of a lens module with a barrel and lens elements, according to the presently disclosed subject matter.
Figure 18B:
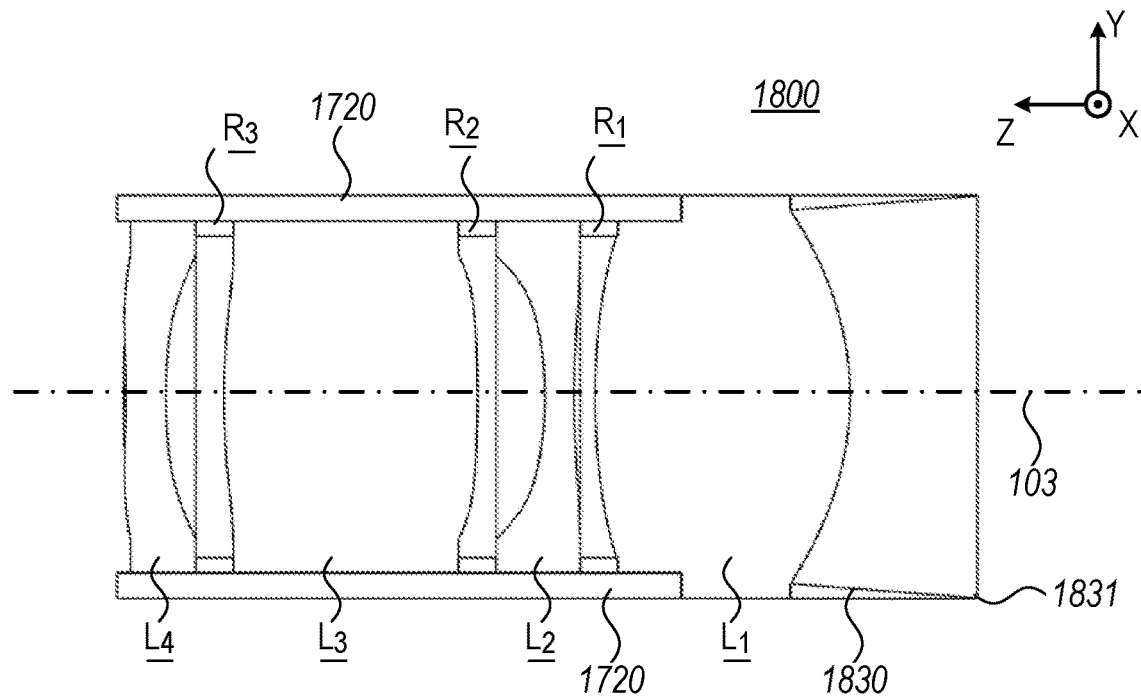
FIG. 18B shows a side cut of the lens module of FIG. 18A.
Figure 18C:
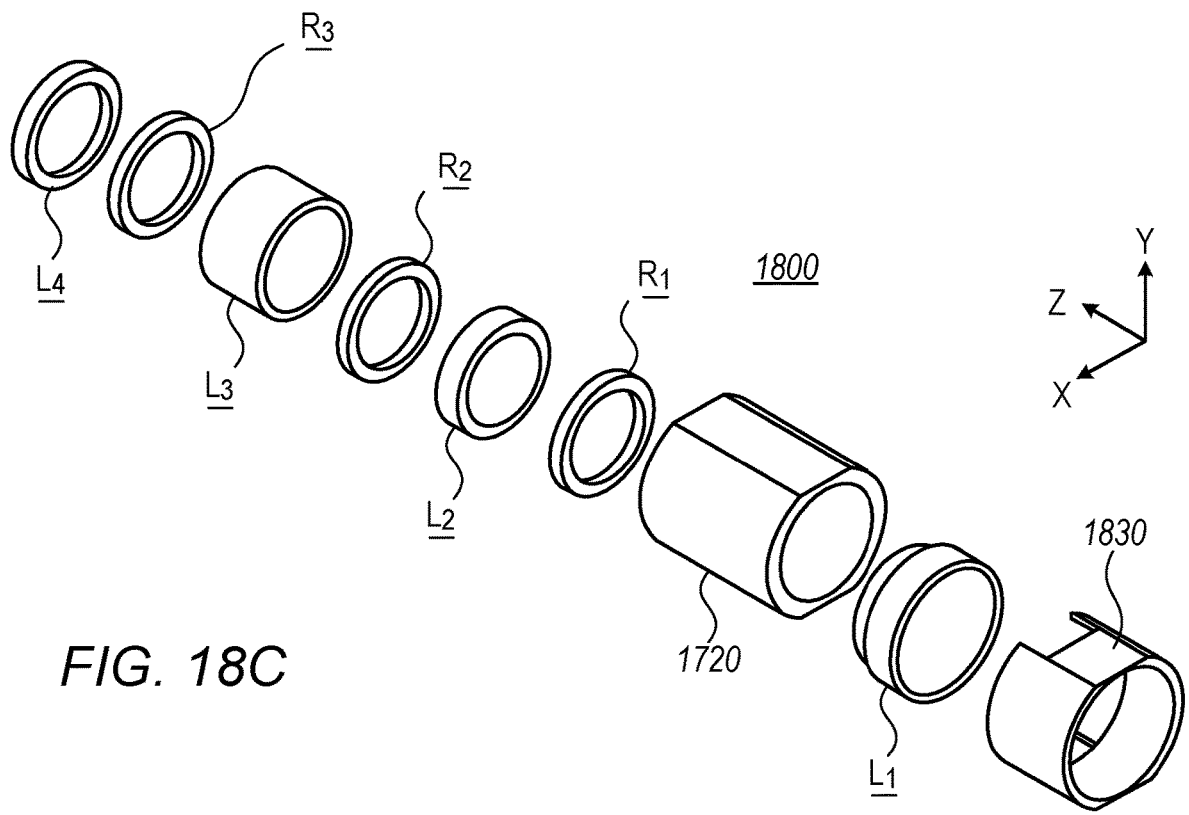
FIG. 18C shows an exploded view of the lens module of FIG. 18B.

Attention is now drawn to FIGS. 18A to 18C. FIG. 18A shows an isometric view of lens module 1800 which is similar to lens module 1700, except that it has an added cover 1830. All other parts (barrel, lens elements, optical axis) are as in lens module 1700 and have the same numbering and names. FIG. 18B shows a side cut of lens module 1800. FIG. 18C shows an exploded view of lens module 1800. Cover 1830 may be made from opaque plastic, e.g. by plastic injection molding. Cover 1830 is positioned on top of lens element $L_1$. In some embodiments, cover 1830 may optically cover mechanical part 1751 such that cover 1830 prevents any optical ray of light arriving from the OPFE from reaching mechanical part 1751. In some embodiments, cover 1830 may have a point 1831 which is closer to the object than point 1752 on $L_1$. This feature is important in order to protect lens module 1800 while handling and assembling, such that the risk of having lens element $L_1$ touching accidently another object is minimized.

The assembly process of lens module 1800 may be similar to the assembly process of lens module 1700 above with an addition of a fifth step:
5. Positioning of cover 1830 and gluing it to barrel 1720 or to $L_1$. In one example gluing may be done on surface 1724.

Figure 19A:
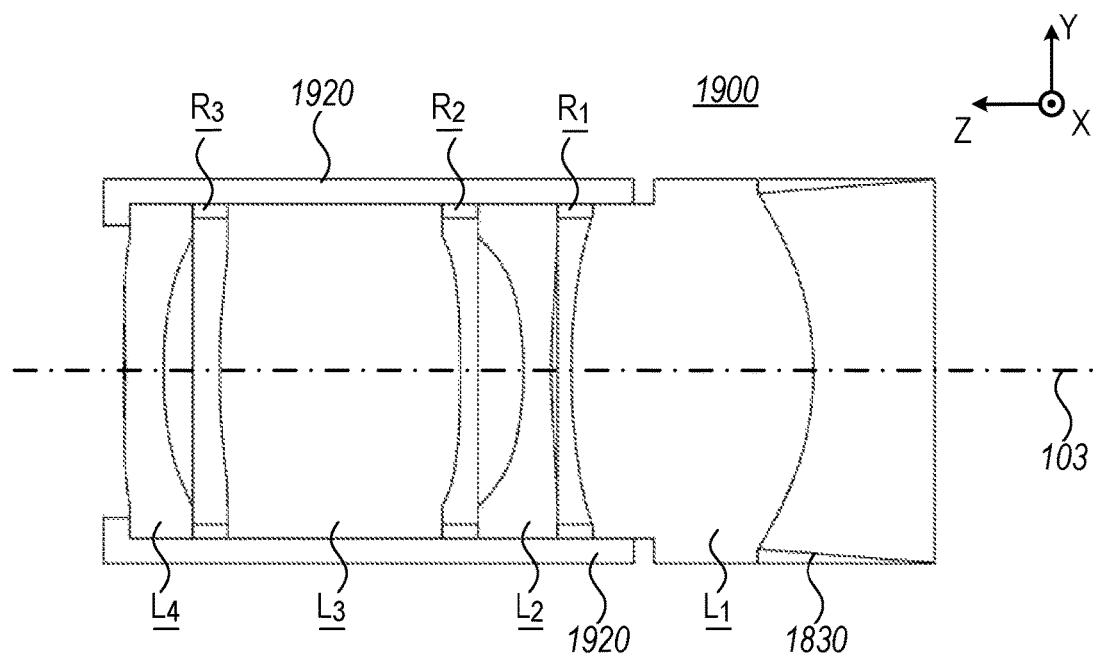
FIG. 19A shows a side cut of yet another embodiment of a lens module with a barrel and lens elements, according to the presently disclosed subject matter.
Figure 19B:
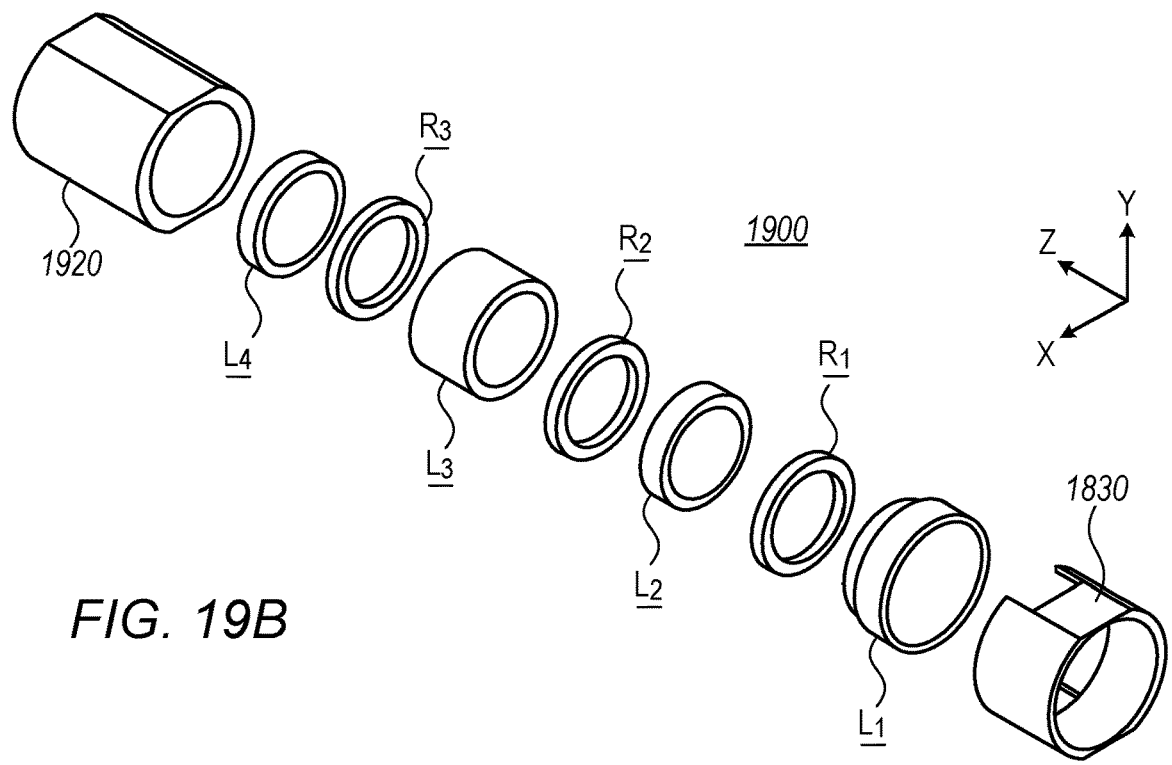
FIG. 19B shows the lens module of FIG. 19A in an exploded view.

Attention is now drawn to FIGS. 19A and 19B, which show a lens module 1900 similar to lens module 1800, except that a barrel 1920 replaces barrel 1720. The change to barrel 1920 allows a different assembly process (relative to lens module 1800), detailed below. FIG. 19A shows a side cut of lens 1900 and FIG. 19B shows lens module 1900 in an exploded view, according to the different assembly direction.

The assembly of lens module 1900 may be done in the following steps:
1. Insertion of lens element $L_N$ from the object side of barrel 1820.
2. Insertion of other elements from the object side of barrel in the following order: $R_{N-1}, L_{N-1}, \ldots R_1, L_1$
3. Gluing lens element $L_1$ to barrel 1820 for a non-limiting example on surface 1724.
4. Positioning of cover 1730 and gluing it to barrel 1820 or to $L_1$. In one example gluing may be done on surface 1724.

The presently disclosed subject matter also contemplates a method of forming an image on an image sensor, using any of the examples described above.

The presently disclosed subject matter also contemplates a method of producing an optical lens module according to the specifications as described by any of the examples above.

According to some examples, the digital camera can be integrated inside a housing of a mobile electronic device (such as, but not limited to, a smartphone, a portable computer, a watch, eyewear, etc.).

According to some examples, the optical lens module, associated with the lens elements, (as described in the various examples above), can be integrated in a digital camera, or in a Tele sub-camera or in a plurality of Tele sub-cameras of a digital camera. This digital camera can in addition comprise one or more Wide sub-cameras.

A folded camera can be used to reduce the height of elements of the camera. As mentioned above, this can e.g. facilitate the integration of the camera when only limited space is available.

According to at least some of the examples described above, the proposed solution can increase image quality by increasing the incoming light through the camera aperture. This can be achieved notwithstanding an increase of the distance (along Z axis) between the first lens element (at the object side) and the image sensor, as a result of a longer EFL used for obtaining an increased zoom factor.

In addition, according to at least some of the examples described above, the proposed solution can offer an optical lens module which can firmly hold the lens elements while complying with the limited available height.

In addition, according to at least some of the examples described above, the quantity of light which is collected by the sensor is increased for a given height of barrel of the optical lens module.

As explained above, using a lens element $L_1$ incorporated in a lens module (the lens module comprising a plurality of lens elements, each having a front surface and a read surface) with a front surface that has a greater CH (clear height) value or greater CA (clear aperture) value with respect to the other surfaces helps to increase the incoming light which enters the lenses barrel and can be sensed by an image sensor of the camera (e.g. Tele sub-camera in a dual aperture camera). As more light can reach the sensor such configuration enables to increase the focal length of the lens module.

It is known that a negative correlation exists between the focal length and a respective field of view, where the field of view becomes smaller as the focal length increases. Thus, while an increase to a given focal length in a given camera enables to increase image resolution, the higher resolution image is formed on a smaller area of the camera sensor. In other words, when capturing an image of the same object from the same distance with two lenses, one having a focal length longer the other, the lens module with the longer focal length produces on the sensor a smaller image with higher spatial resolution as compared to the one with the shorter focal length. Thus, the advantages of a larger focal length are accompanied with the disadvantage of a smaller size image.

Accordingly, some examples of the presently disclosed subject matter include a digital camera as disclosed above comprising:

N lens elements $L_1$ (lens module) having a symmetry along a first optical axis, each lens element comprising a respective front surface $S_{2i-1}$ and a respective rear surface $S_{2i}$, where i is between 1 and N, and N is equal to or greater than 3; wherein a clear height value of surface $S_1$ or a clear aperture value of surface $S_1$ is greater than a clear height value or a clear aperture value of each of surfaces $S_2$ to $S_{2N}$;

The digital camera further comprises an image sensor and a rotating reflecting element or OPFE (such as a mirror or prism). The rotating reflecting element is inclined with respect to the first optical axis, so as to provide a folded optical path between an object and the lens elements and is capable of being rotated around one or two axes.

An example of such rotating reflecting element is disclosed, by way of example in co-owned international patent application PCT/IB2017/052383, which describes an actuator of a digital camera designed to enable the rotation of a reflecting element around two axes. See for example FIG. 1A to FIG. 1F, FIG. 2 and FIG. 3 and the respective description in PCT/IB2017/052383 showing the design of an actuator which allows the rotation of a prism around one or two axes.

Rotation of the reflecting element around one or two axes moves the position of the camera FOV, wherein in each position a different portion a scene is captured in an image having the resolution of the digital camera. In this way a plurality of images of adjacent non-overlapping (or partially overlapping) camera FOV are captured and stitched together to form a stitched (also referred to as "composite") image having an overall image area of an FOV greater than digital camera FOV.

In some examples the digital camera can be a folded Tele camera configured to provide a Tele image with a Tele image resolution, the folded Tele camera comprising a Tele image sensor and its Tele lens assembly is characterized with a Tele field of view ($FOV_T$).

According to some examples, the folded Tele camera is integrated in a multiple aperture digital camera comprising at least one additional upright Wide camera configured to provide a Wide image with a Wide image resolution, being smaller than the Tele image resolution, the Wide camera comprising a Wide image sensor and a Wide lens module with a Wide field of view ($FOV_W$); wherein $FOV_T$ is smaller than $FOV_W$. Wherein rotation of the rotating reflecting element moves $FOV_T$ relative to $FOV_W$.

The description of co-owned international patent applications PCT/IB2016/056060 and PCT/IB2016/057366 includes a Tele camera with an adjustable Tele field of view. As described in PCT/IB2016/056060 and PCT/IB2016/057366, rotation of the reflecting element around one or two axes moves the position of Tele FOV ($FOV_T$) relative to the Wide FOV ($FOV_W$), wherein in each position a different portion a scene (within $FOV_W$) is captured in a "Tele image" with higher resolution. According to some examples, disclosed in PCT/IB2016/056060 and PCT/IB2016/057366, a plurality of Tele images of adjacent non-overlapping (or partially overlapping) Tele FOVs are captured and stitched together to form a stitched (also referred to as "composite") Tele image having an overall image area of an FOV greater than $FOV_T$. According to some examples, the stitched Tele image is fused with the Wide image generated by the Wide camera.

According to some examples, the digital camera further comprises or is otherwise operatively connected to a computer processing device, which is configured to control the operation of the digital camera (e.g. camera CPU). The digital camera can comprise a controller operatively connected to the actuator of the rotating reflecting element and configured to control its operation for rotating the rotating reflecting element.

The computer processing device can be responsive to a command requesting an image with a certain zoom factor and control the operation of the digital camera for providing images having the requested zoom. As mentioned in applications PCT/IB2016/056060 and PCT/IB2016/057366, in some examples a user interface (executed for example by the computer processing device) can be configured to allow input of user command being indicative of a requested zoom factor. The computer processing device can be configured to process the command and provide appropriate instructions to the digital camera for capturing images having the requested zoom.

In some cases, if the requested zoom factor is a value between the $FOV_W$ and $FOV_T$ the computer processing device can be configured to cause the actuator of the reflecting element to move the reflecting element (by providing instruction to the controller of the actuator) such that a partial area of the scene corresponding to the requested zoom factor is scanned and a plurality of partially overlapping or non-overlapping Tele images, each having a Tele resolution and covering a portion of the partial area, are captured. The computer processing device can be further configured to stitch the plurality of captured imaged together in order to form a stitched image (composite image) having Tele resolution and an FOV greater than the $FOV_T$ of the digital camera. Optionally the stitched image can then be fused with the Wide image.

Figure 14:
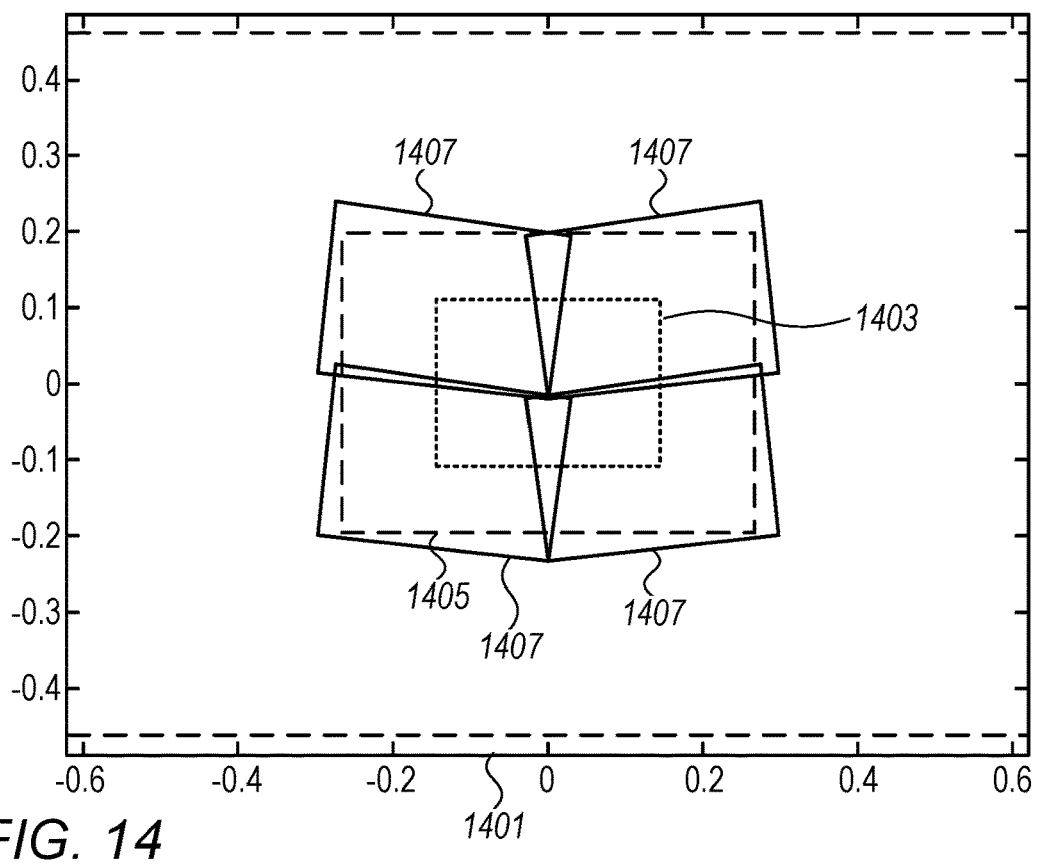
FIG. 14 is a schematic illustration of a stitched image generated by capturing and stitching together 4 Tele images, according to some examples of the presently disclosed subject matter.

FIG. 14 is a schematic illustration of an example of a stitched image generated by capturing and stitching together 4 Tele images. In FIG. 14, 1401 denotes $FOV_W$, 1403 denotes $FOV_T$ at the center of $FOV_W$ and 1405 indicates the size of the requested zoom factor. In the illustrated example, four partially overlapping Tele-images (1407) are captured.

Notably, the overall area of the captured Tele-images (1407) is greater than the area of the requested zoom image (1405). The central part of the captured Tele-images is extracted (e.g. by the computer processing device as part of the generation of the stitched image) for generating the stitched image 1405. This helps to reduce the effect of image artefacts resulting from transition from an image area covered by one image to an image area covered by a different image.

Figure 15:
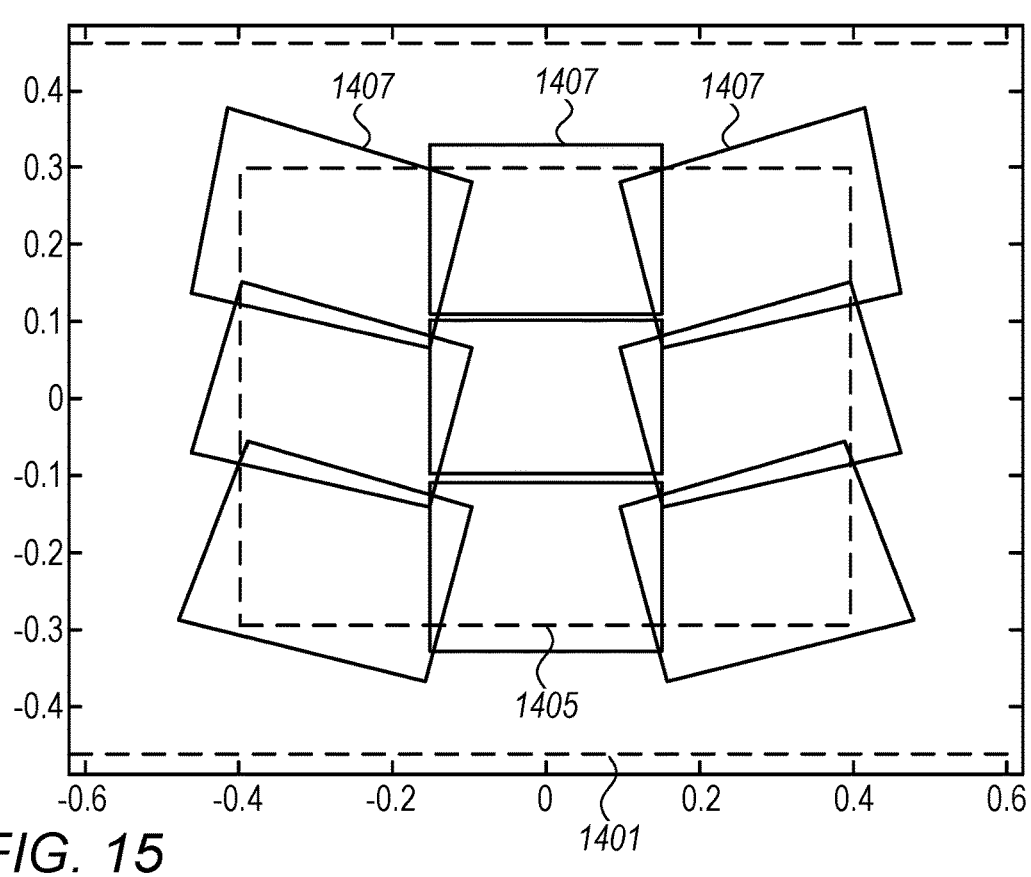
FIG. 15 is a schematic illustration of a stitched image generated by capturing and stitching together 6 Tele images, according to some examples of the presently disclosed subject matter.
Figure 16:
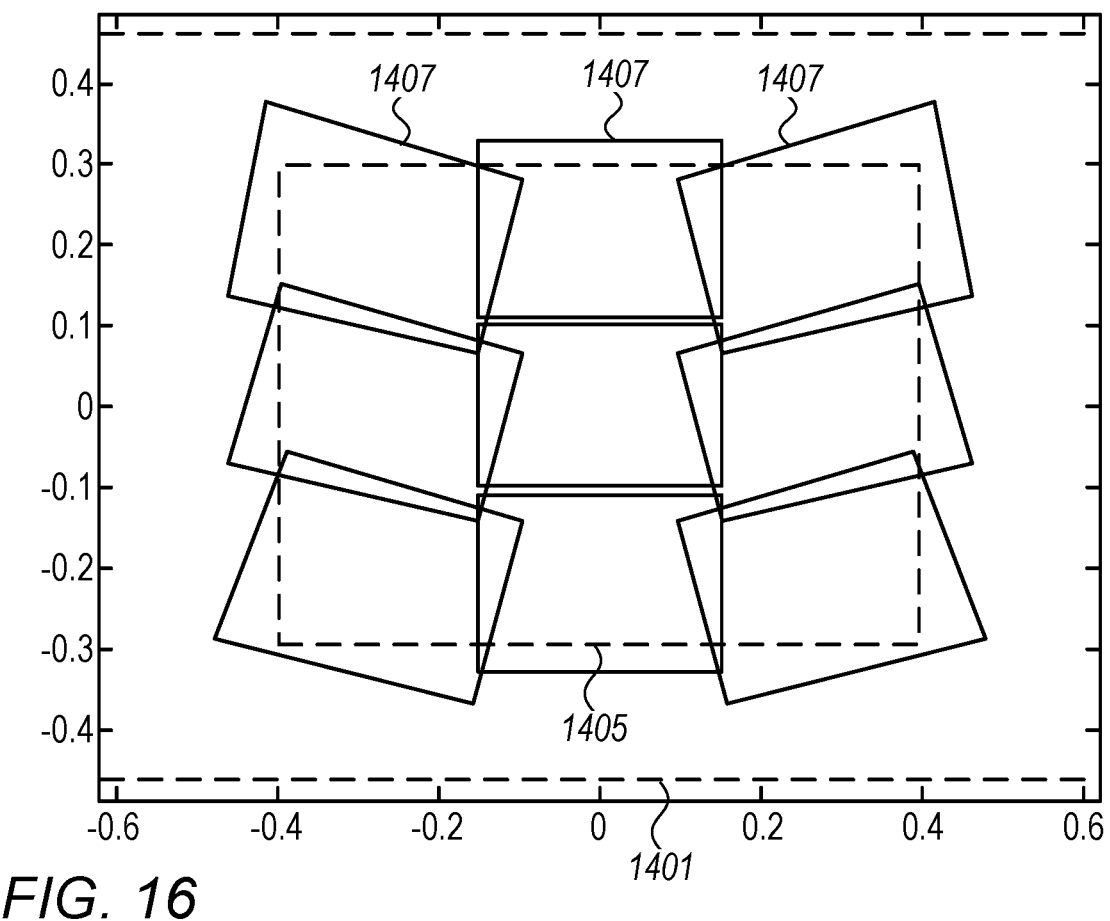
FIG. 16 is a schematic illustration of a stitched image generated by capturing and stitching together 9 Tele images, according to some examples of the presently disclosed subject matter.

FIG. 15 is a schematic illustration of an example of a stitched image generated by capturing and stitching together 6 Tele images. FIG. 16 is a schematic illustration of an example of a stitched image generated by capturing and stitching together 9 Tele images. The same principles described with reference to FIG. 14 apply to FIGS. 15 and 16. Notably, the output image resulting from the stitching can have a different width to height proportion than the single image proportion. For example, as illustrated in FIG. 15, a single image can have 3:4 proportion and the output stitched image can have a 9:16 proportion.

It is noted that image stitching per se is well known in the art and therefore it is not explained further in detail.

FIG. 20 shows another exemplary embodiment of a lens module numbered 2000 which includes N lens elements $L_i$ (where "i" is an integer between 1 and N). In the example of FIG. 20, N is equal to 5. For example, $L_1$ is made of glass. The description above referring to lens module 200 holds also for lens module 2000, with the necessary change of N from 4 to 5.

In some cases, both the first and last lens elements can be of increased dimensions in order to increase light impinging on the sensor. Examples of an optical lens module which is designed to deal with such a case is given in FIGS. 21-26.

FIG. 21A-B show another exemplary embodiment of a lens module numbered 2100 which includes N lens elements $L_i$. In the example of FIG. 21A-B, N is equal to 5. Lens module 2100 has the property of $H_{L1}=H_{LN}$. In FIGS. 21A-B, lens module 2100 is shown without a lens barrel. FIG. 21A shows light ray tracing of lens module 2100 while FIG. 21B shows only the lens elements for more clarity. In addition, both figures show image sensor 202 and optical element 205.

Figure 22:
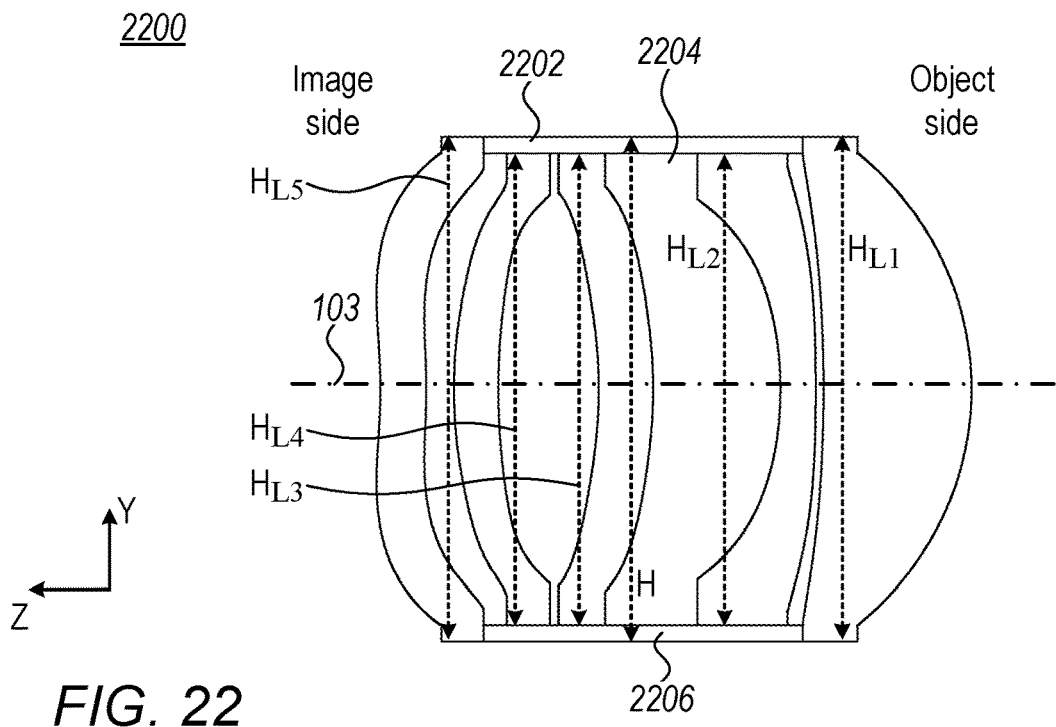
FIG. 22 is a schematic representation of a side view of optical lens module for holding the lens elements of FIGS. 21A, 21B.

FIG. 22 shows schematically in a side view an exemplary lens module numbered 2200 for holding the lens elements of lens module 2100. Lens module 2200 comprises a barrel 2202 having a cavity 2204 surrounded by walls 2206. In lens module 2200, a first subset of the lens elements is held inside the cavity, and a second subset of the lens elements is located externally to (outside) the barrel. Specifically, lens elements $L_2$ to $L_{N-1}$ are held within cavity 2204 and lens elements $L_1$ and $L_N$ are located outside of barrel 2202 (i.e. lens elements $L_1$ and $L_N$ are not within cavity 2204). Lens element $L_1$ and $L_N$ can be affixed (fixedly attached) to barrel 2202 by any appropriate mechanical link, such as an adhesive material.

In lens module 2200, since lens elements $L_1$ and $L_N$ are located outside of cavity 2204, the height $H_{L1}$ and $H_{LN}$ of, respectively, lens elements $L_1$ and $L_N$ can be substantially equal to the height of barrel 2202 (measured along the axis Y between external surfaces of opposite walls of barrel 2202). Heights $H_{L2}$ to $H_{LN-1}$ of lens element $L_2$ to $L_{N-1}$ can be smaller than the height of barrel 2202, marked with H. A numerical (non-limiting) example for lens module 2200 may be have the following values: $H_{L1}=H_{L5}=4$ mm, $H_{L2}=H_{L3}=H_{L4}=3.6$ mm.

Figure 23:
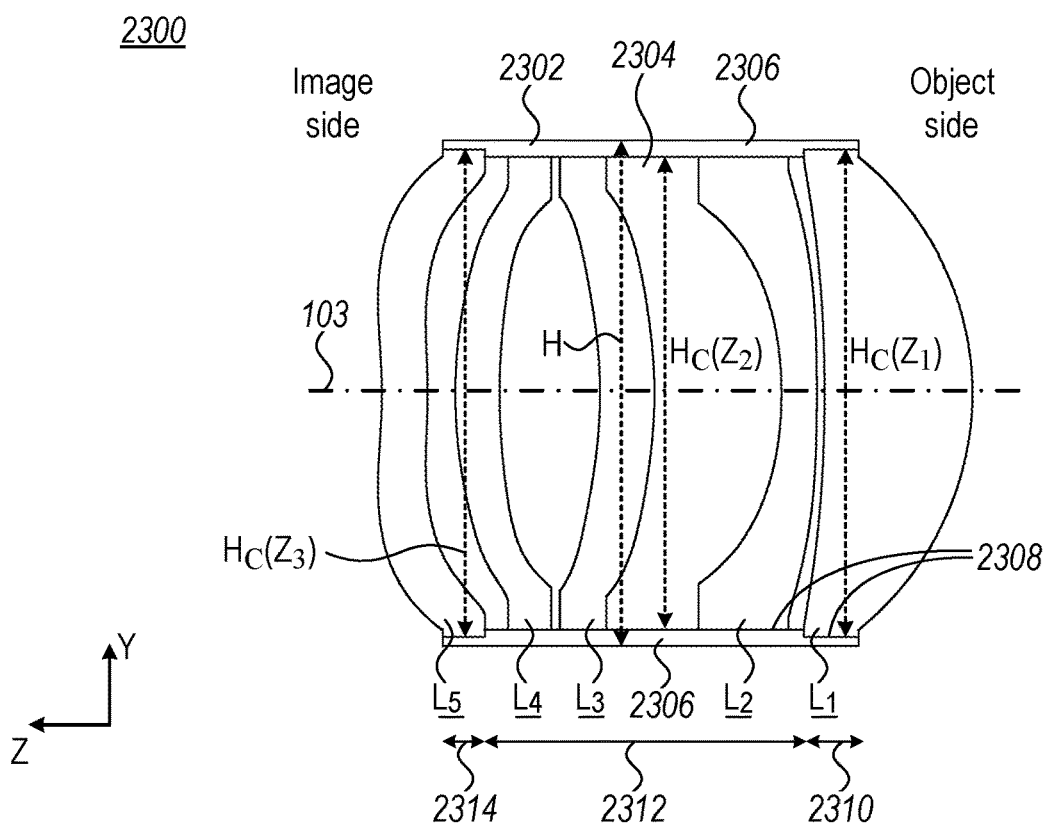
FIG. 23 is a schematic representation of a side view of another optical lens module for holding the lens elements of FIGS. 21A, 21B.

FIG. 23 is a schematic representation of a side view of another optical lens module numbered 2300 for holding the lens elements of FIGS. 21A, 21B. Lens module 2300 comprises a barrel 2302 having a cavity 2304 surrounded by walls 2306. In lens module 2300, all the lens elements $L_1$ and $L_N$ are held (located) inside the cavity. Exemplarily, in lens module 2300, a height $H_C$ of cavity 2304, measured along an axis Y orthogonal to optical axis 103, is variable along optical axis 103 (i.e. the Z axis). For each position along the Z axis, cavity height $H_C$ corresponds in this example to the distance between the internal parts 2308 of walls 2306 along axis Y. In other words, $H_C(Z)$ is not a constant function.

According to the example shown, cavity 2304 comprises a first portion 2310 in which first lens element $L_1$ is located, a second portion 2312 in which the other lens elements ($L_2$ to $L_{N-1}$) are located and a third portion 2314 in which last lens element $L_N$ is located. According to this example, heights $H_C(Z_1)$ of first portion 2310 and $H_C(Z_3)$ of third portion 2314 are greater than height $H(Z_2)$ of second (middle) portion 2312. As a consequence, first lens element $L_1$ and last lens element $L_N$ (which are generally of greater dimensions, as mentioned above) are positioned respectively within first portion 2310 and third portion 2314 (respectively) of cavity 2304, and at least some of the other lens elements are positioned within second portion 2312 of cavity 2304.

According to this example, height $H_C(Z_1)$ of first portion 2310 is designed to fit with the height $H_{L1}$ of first lens element $L_1$, height $H_C(Z_2)$ of second portion 2312 is designed to fit with height $H_{L2}$, $H_{L3}$ and $H_{L4}$ of lens elements $L_2$ to $L_4$ (in this example, $H_{L2}=H_{L3}=H_{L4}$) and height $H_C(Z_3)$ of third portion 2314 is designed to fit with the height $H_{L5}$ of last lens element $L_5$.

The variable height of cavity 2304 along optical axis 103 can be obtained e.g. by using walls 2306 with a variable thickness. As shown in FIG. 23, walls 2306 have a thinner thickness in first portion 2310 and third portion 2314 than in second portion 2312. In other examples, walls 2306 may have a constant thickness but may have a stepped shape.

Figure 24:
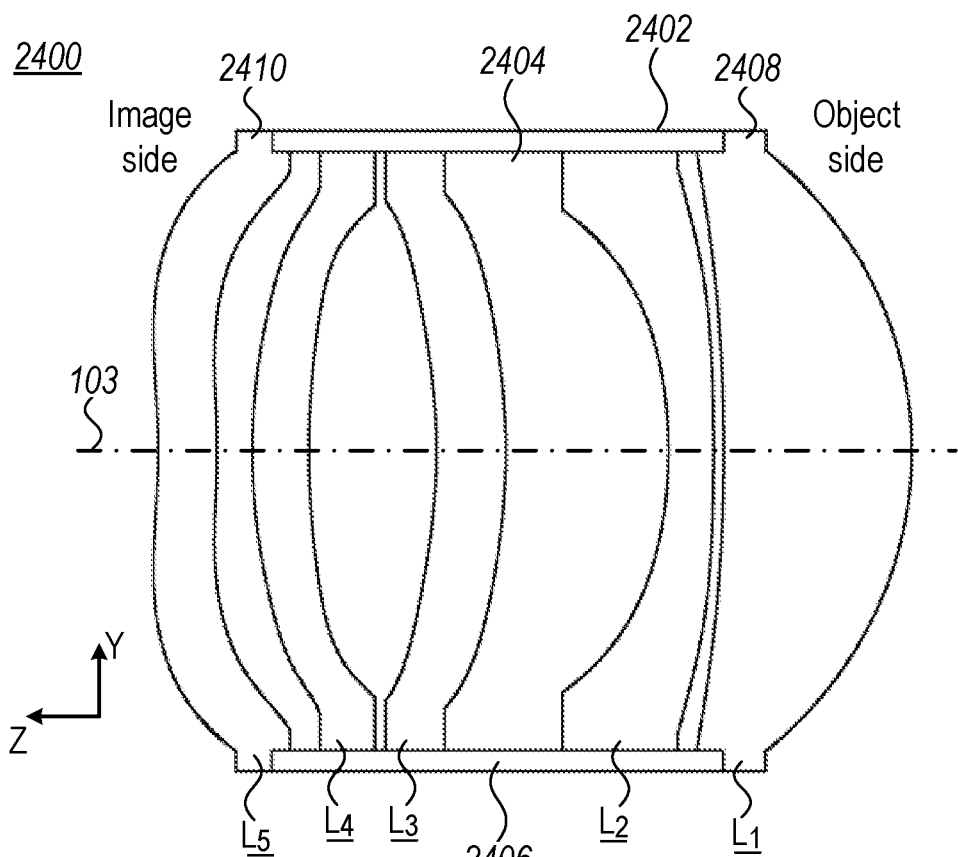
FIG. 24 is a schematic representation of yet another example of an optical lens module comprising a plurality of lens elements, according to the presently disclosed subject matter.

FIG. 24 is a schematic representation of a side view of another exemplary optical lens module numbered 2400 for holding the lens elements of FIGS. 21A, 21B. Lens module 2400 comprises a barrel 2402 having a cavity 2404 surrounded by walls 2406. In this example, lens elements $L_2$ to $L_{N-1}$ are located within cavity 2404. Lens elements $L_1$ and $L_N$ have a first part located inside cavity 2404 and a second part located outside of cavity 2404; this is similar to lens element $L_1$ of FIG. 10A. An edge 2408 of lens element $L_1$ and an edge 2410 of lens element $L_N$ has a stepped shape. Walls 2406 align edges 2408 and 2410 such that the center of lens elements $L_1$ and $L_N$ can be maintained in alignment with optical axis 103.

Attention is now drawn to FIGS. 25A to 25D.

Figure 25A:
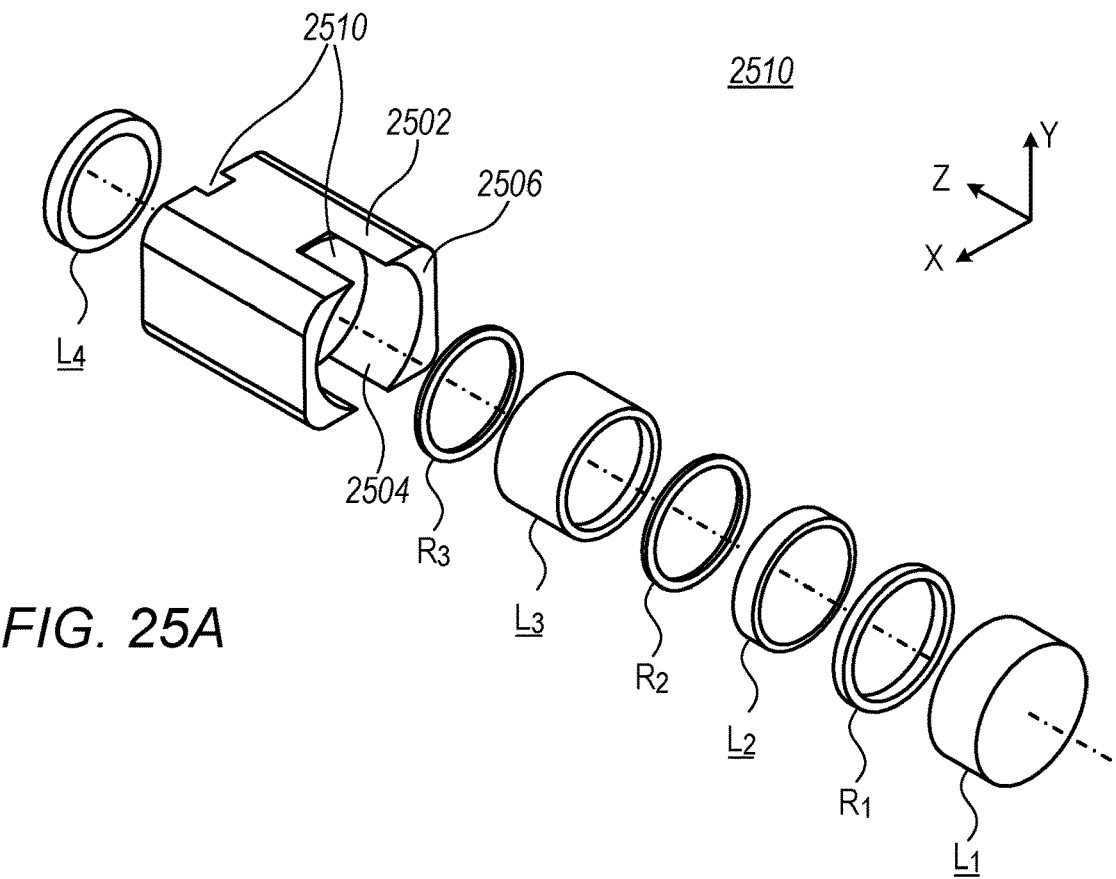
FIG. 25A is a schematic representation of an isometric view of another optical lens module, according to the presently disclosed subject matter.
Figure 25B:
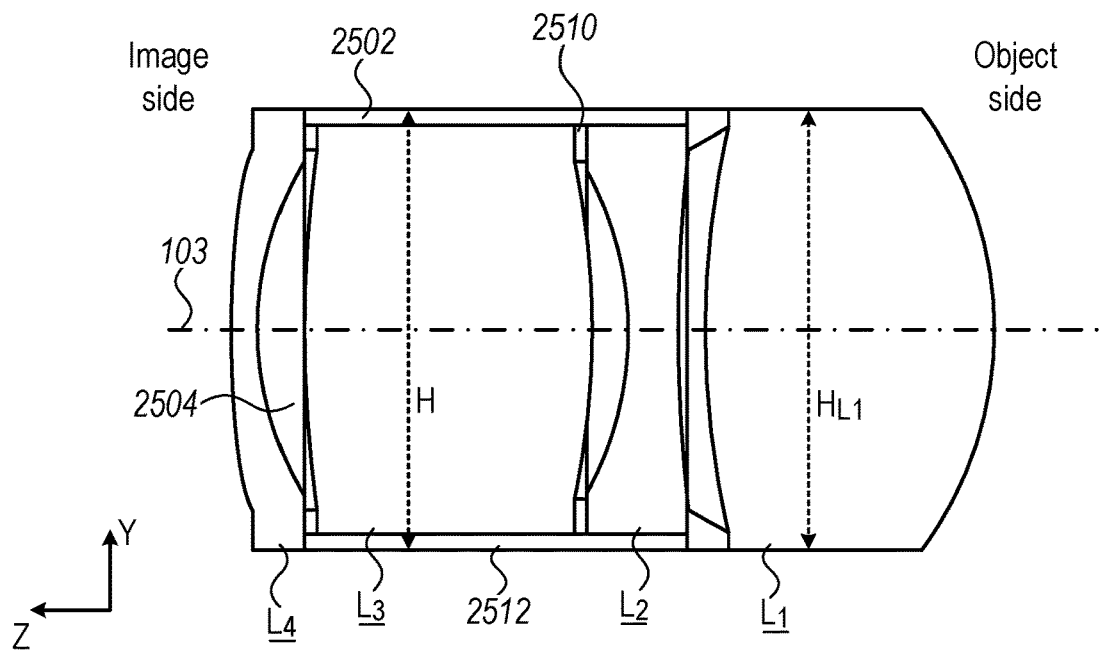
FIG. 25B depicts a cross-section view of the lens module of FIG. 25A, along plane Y-Z.
Figure 25C:
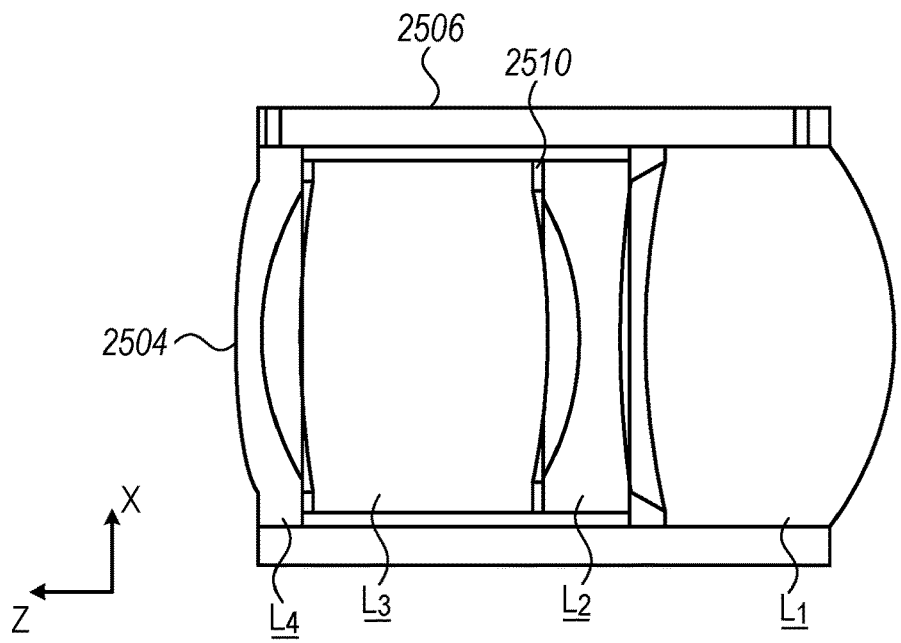
FIG. 25C depicts a cross-section view of the lens module of FIG. 25A, along plane X-Z.
Figure 25D:
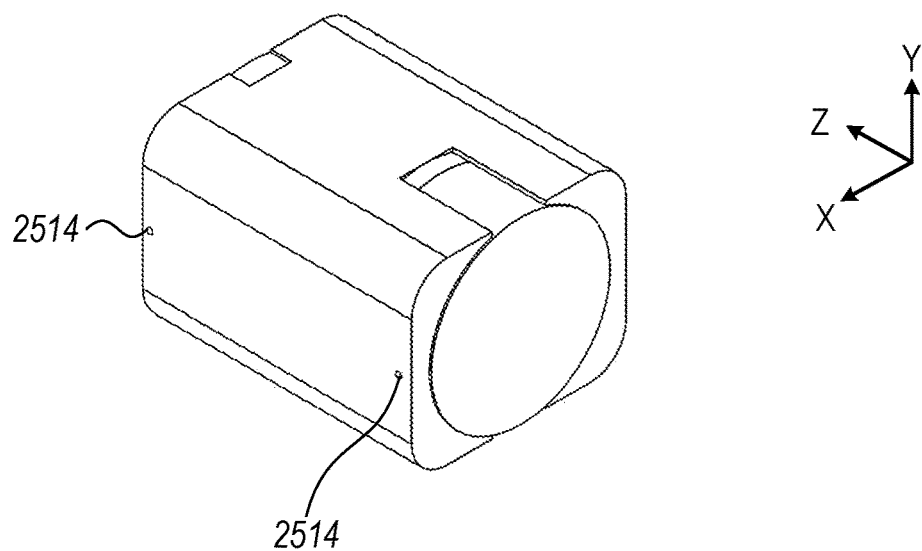
FIG. 25D depicts another isometric view of the lens module of FIG. 25A after the insertion of the lens elements into the barrel.

FIG. 25A is a schematic representation of an exploded isometric view of another exemplary optical lens module numbered 2500 having a lens barrel 2502 and of a plurality of lens elements $L_1$ to $L_N$ (in this example N=4) before their insertion into the barrel. FIG. 25B depicts a cross-section view of lens module 2500 along plane Y-Z, FIG. 25C depicts a cross-section view of lens module 2500 along plane X-Z, and FIG. 25D depicts another isometric view of lens module 2500 after the insertion of the lens elements into the barrel.

Barrel 2502 comprises a cavity 2504 surrounded by walls 2506. Lens elements $L_1$ to $L_N$ are located within cavity 2504. Lens module 2500 may further include spacers $R_1$ to $R_{N-1}$. Each spacer $R_i$ is positioned between lens elements $L_i$ and $L_{i+1}$. In some embodiments, one or more of spacers $R_1$ to $R_{N-1}$ may be used as an aperture stop(s). Spacers $R_1$ to $R_{N-1}$ can have an annular shape.

A height H of barrel 2502 is measured for example between external surfaces of opposite walls 2512 of barrel 2502 (e.g. along an axis Y orthogonal to optical axis 103). In the examples of FIGS. 25A to 25D, a height $H_{L1}$ of lens element $L_1$ and a height $H_{LN}$ of lens element $L_N$ can be substantially equal to H or greater than H. Thus, lens elements $L_1$ and $L_N$ can have a large height (therefore benefiting from an increased optical collection surface) while being located within the optical lens module which provides protection and mechanical support for lens elements $L_1$ and $L_N$. With this configuration, the center of lens elements $L_1$ and $L_N$ can be maintained in alignment with optical axis 103.

Similar to FIGS. 11A-11F above, each lens element has an optical part and a mechanical part. According to some examples, the ratio between a height of the optical part (see $H_{opt}$ in FIG. 11F) and the height of the lens element (see $H_L$ in FIG. 11F) is greater for lens elements $L_1$ and $L_N$ than for each of lens elements $L_2$ to $L_{N-1}$.

As shown in the figures, barrel 2502 can comprise slots 2510 on the top and bottom wall of barrel 2502 on its two endings: close to the object side and close to the image side. This allows lens elements $L_1$ and/or $L_N$ to be substantially of the same height as the barrel, or to have a height which is greater than the barrel height, and to have a height which is greater than that of the other lens elements. In particular, lens elements $L_1$ and/or $L_N$ can be tangent to slots 2510, or at least parts of the lens elements $L_1$ and/or $L_N$ can protrude through slots 2510.

The structure of the lens as depicted in FIGS. 25A to 25D is thus also advantageous in terms of the manufacturing process, since lens elements $L_1$ and $L_N$ can be of the height of the barrel (or can have a height which is greater than the height of the barrel) and can still be fastened to the internal surfaces of the walls of the barrel.

The assembly of lens module 2500 may be done using the following steps:
1. Insertion of lens element $L_N$ from the image side of barrel 2502. $L_N$ may be aligned to barrel 2502 due to the axial symmetry of both elements.
2. Fixedly attaching (e.g. gluing) $L_1$ to barrel 2502.
3. Insertion of other elements from the object side of barrel 2502 in the following order: $R_{N-1}$, $L_{N-1}$ ... $R_2$, $L_1$. $L_1$ to $L_{N-1}$ and $R_1$ to $R_{N-1}$ may be aligned to barrel 2502 due to the axial symmetry of all elements.
4. Fixedly attaching (e.g. gluing) $L_N$ to barrel 2502.

In one example, holes 2514 (FIG. 25D) in barrel 2502 may be used to insert the glue to fasten lens elements $L_1$ and $L_N$ in steps 2 and 4.

Figure 26A:
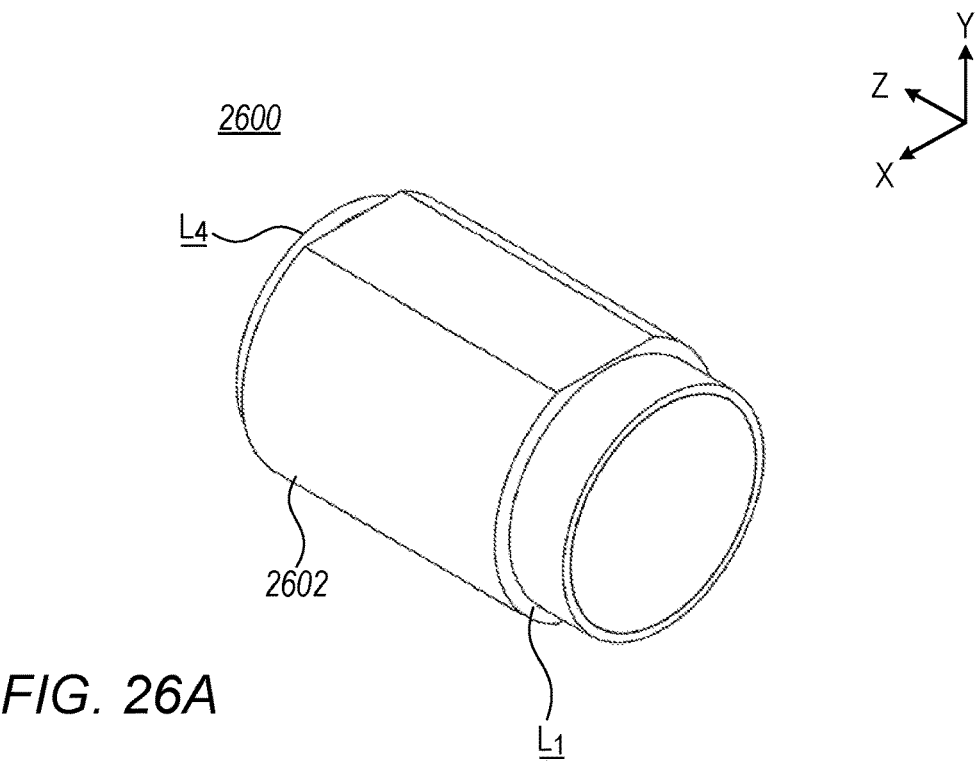
FIG. 26A shows an isometric view of yet another embodiment of a lens module with a barrel and lens elements, according to the presently disclosed subject matter.
Figure 26B:
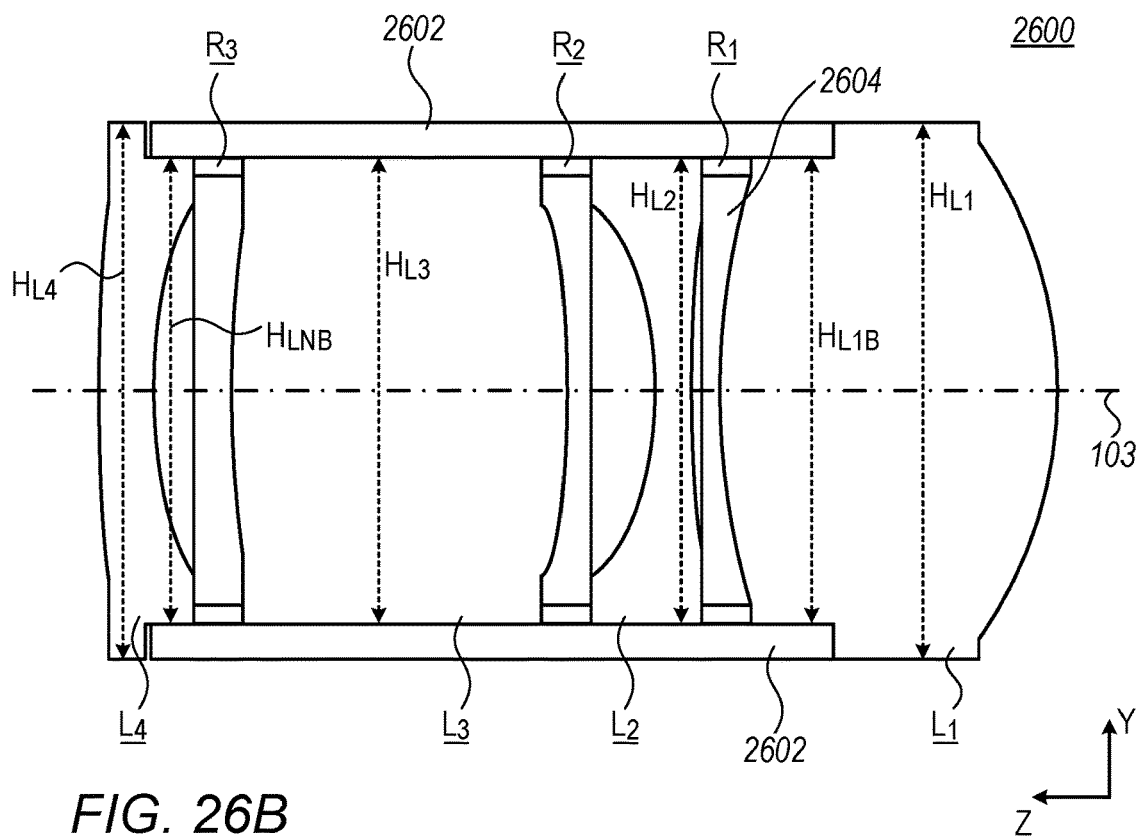
FIG. 26B shows a side cut of lens module of FIG. 26A.
Figure 26C:
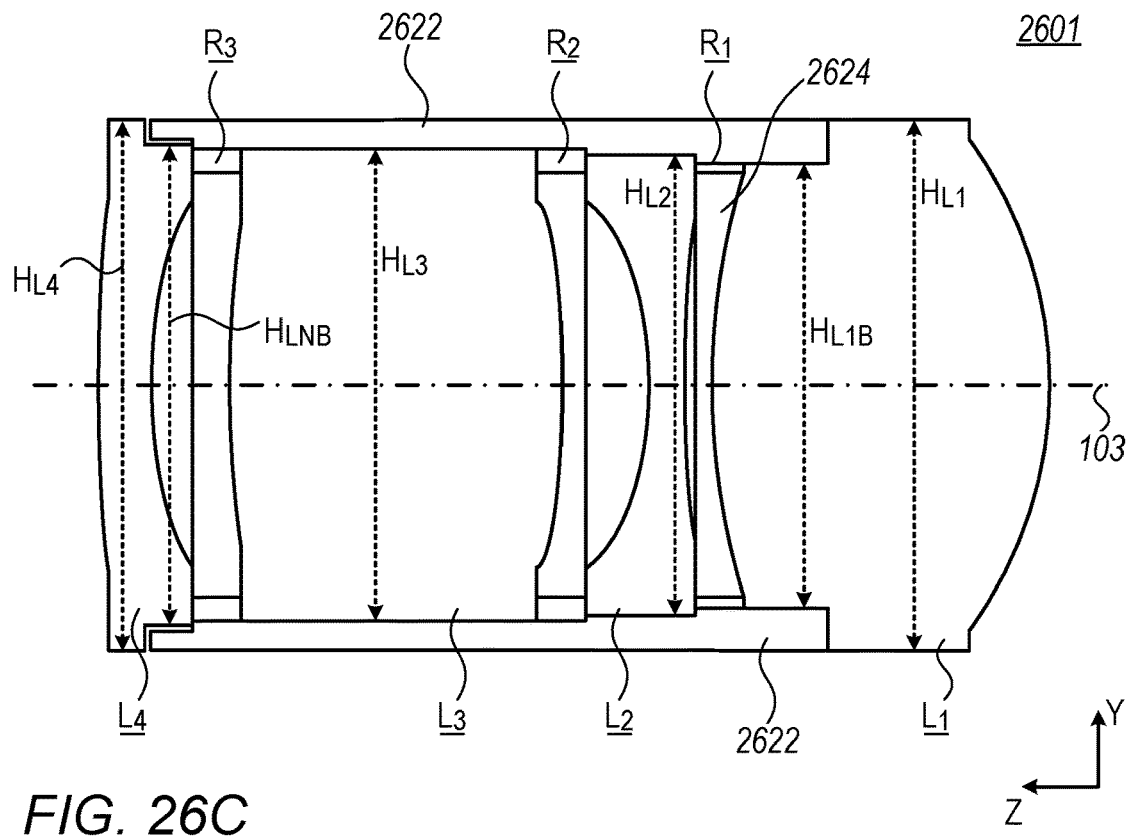
FIG. 26C shows an exploded view of the lens module of FIG. 26B.

Attention is now drawn to FIGS. 26A to 26C. FIG. 26A shows an isometric view of another exemplary lens module numbered 2600. FIG. 26B shows a side view of lens module 2600. Lens module 2600 comprises a barrel 2602 having a cavity 2604, and a plurality of lens elements $L_1$ to $L_N$. N is normally in the range of 3-7. In the non-limiting example of lens 2600, N=4. Lens module 2600 has the first lens elements $L_1$ and $L_N$ partially positioned or placed outside of barrel 2602, while lens elements $L_2$ to $L_{N-1}$ are placed completely inside the barrel. $L_1$ and $L_N$ are clearly seen in FIG. 26A, while other lens elements are not seen in this view but can be seen in FIG. 26B. As in previous examples, optical axis 103 serves as an axial symmetry axis for all lens elements $L_1$ to $L_N$. Each lens element $L_i$ has a height $H_{Li}$ defined along the Y axis. Lens elements $L_1$ and $L_N$ may have a "stepped" shape, i.e. it has a front part with height $H_{L1}$ ($H_{LN}$) and a back part with height $H_{L1B}$ ($H_{LNB}$), such that $H_{L1} > H_{L1B}$ and $H_{LN} > H_{LNB}$. Lens module 2600 may further include spacers $R_1$ to $R_{N-1}$. Each spacer $R_i$ is positioned between lens elements $L_i$ and $L_{i+1}$. In some embodiments, one or more of spacers $R_1$ to $R_{N-1}$ may be used as an aperture stop(s). In some embodiments some adjacent lens elements may not have a spacer therebetween.

Cavity 2604 may be made for example from opaque plastic and may be axial symmetric along optical axis 103, like cavity 1720 in FIGS. 17A-17E. In an exemplary embodiment, cavity 2604 may have a shape of cylinder as in embodiment 1700 (FIG. 17B). In other exemplary embodiments, cavity 2604 may have other axial symmetric shapes, such as a cone, a series of cylinders.

FIG. 26C shows a lens module 2601 which is similar to lens module 2600 with a single difference: barrel 2622 with cavity 2624 replaces barrel 2602 with cavity 2624. Cavity 2624 has a shape of a series of cylinders in increasing sizes for each lens element; as can be seen in FIG. 17D, $H_{L1B} \leq H_{L2} \leq H_{L3} \leq H_{L4} \leq H_{LNB} < H_{L1} = H_{LN}$. This feature may allow easier molding of barrel 2620 and/or easier assembly of lens elements $L_1$ to $L_4$ and spacers $R_1$ to $R_3$. In other embodiments, the number of lens elements may differ from four, as mentioned above.

The assembly of lens module 2400 (or 2401), and in particular the order of lens element insertion into the barrel, may be similar to the assembly steps of lens module 1700 above (FIGS. 17A-17D).

Figure 27:
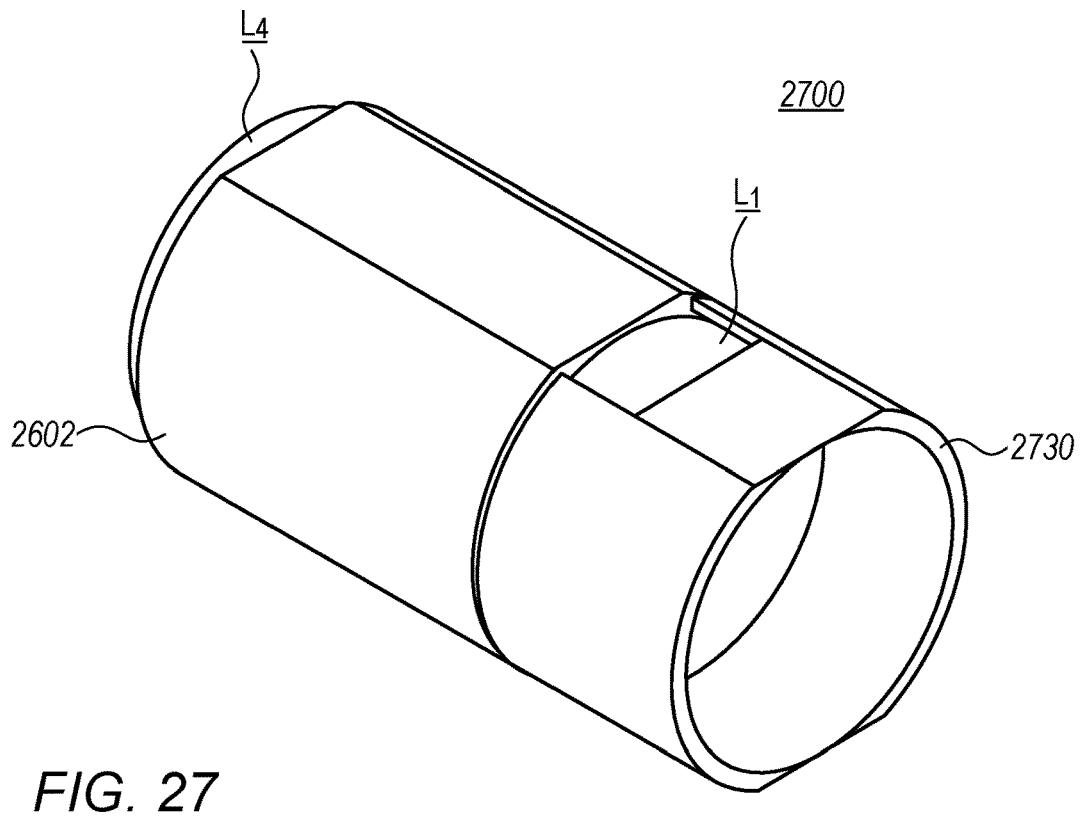
FIG. 27 shows an isometric view of yet another embodiment of a lens module, according to the presently disclosed subject matter.

Attention is now drawn to FIG. 27. FIG. 27 shows an isometric view of a lens module 2700 which is similar to lens module 2500, except that it has an added cover 2730 similar to cover 1830 of lens 1800, with similar assembly steps.

Unless otherwise stated, the use of the expression "and/or" between the last two members of a list of options for selection indicates that a selection of one or more of the listed options is appropriate and may be made.

It should be understood that where the claims or specification refer to "a" or "an" element, such reference is not to be construed as there being only one of that element.

All patents and patent applications mentioned in this specification are herein incorporated in their entirety by reference into the specification, to the same extent as if each individual patent or patent application was specifically and individually indicated to be incorporated herein by reference. In addition, citation or identification of any reference in this application shall not be construed as an admission that such reference is available as prior art to the present disclosure.

What is claimed is:

1. A mobile device, comprising:
   a first camera having a first field-of-view (FOV1) and a first image sensor; and
   a second camera having a second field-of-view (FOV2), an optical lens module including N lens elements $L_1$-$L_N$, a first reflecting element, and a second image sensor,
   wherein FOV2<FOV1,
   wherein the N lens elements are arranged along an optical axis such that lens element $L_N$ is a last lens element facing the second image sensor,
   wherein the first image sensor is configured to receive a first light from a first direction through a first optical path between an object and the first image sensor,
   wherein the second image sensor is configured to receive a second light from the first direction through a second optical path between the object and the second image sensor,
   wherein the first reflecting element is disposed in the second optical path between the optical lens module and the second image sensor,
   wherein the second camera has a F-number≤3,
   wherein each lens element is denoted $L_i$ where 1≤i≤N,
   wherein each lens element comprises a respective front surface $S_{2i-1}$ and a respective rear surface $S_{2i}$, the lens element surfaces marked $S_k$ where 1≤k≤2N, and
   wherein each lens element surface has a clear aperture value $CA(S_k)$, and
   wherein a clear aperture value $CA(S_1)$ of surface $S_1$ is greater than a clear aperture value of each of surfaces $S_2$ to $S_{2N}$.

2. The mobile device of claim 1, wherein 3≤N≤7.

3. The mobile device of claim 2, further comprising a second reflecting element in the second optical path.

4. The mobile device of claim 1, wherein the second image sensor has a sensor diagonal SD, and wherein a ratio $CA(S_{2N})/SD$ between a clear aperture value $CA(S_{2N})$ of surface $S_{2N}$ and SD is smaller than 0.8.

5. The mobile device of claim 4, wherein $CA(S_{2N})/SD$<0.7.

6. The mobile device of claim 4, wherein $CA(S_{2N})/SD$<0.65.

7. The mobile device of claim 2, wherein N=5.

8. The mobile device of claim 2, wherein N=3.

9. The mobile device of claim 1, wherein the second camera has an effective focal length EFL in the range of 8 mm to 16 mm.

10. The mobile device of claim 1, wherein the second camera has an effective focal length EFL in the range of 11 mm to 16 mm.

11. The mobile device of claim 1, wherein the second camera has a F-number≤2.76.

12. The mobile device of claim 1, wherein the mobile device is a smartphone.

* * * * *